(12) United States Patent
Krenik

(10) Patent No.: US 9,955,795 B2
(45) Date of Patent: May 1, 2018

(54) AUTOMATED BED AND METHOD OF OPERATION THEREOF

(71) Applicant: Matthew W. Krenik, Garland, TX (US)

(72) Inventor: Matthew W. Krenik, Garland, TX (US)

( * ) Notice: Subject to any disclaimer, the term of this patent is extended or adjusted under 35 U.S.C. 154(b) by 209 days.

(21) Appl. No.: 14/730,666

(22) Filed: Jun. 4, 2015

(65) Prior Publication Data

US 2015/0351982 A1 Dec. 10, 2015

Related U.S. Application Data

(60) Provisional application No. 62/008,348, filed on Jun. 5, 2014.

(51) Int. Cl.
| | |
|---|---|
| *A47B 7/02* | (2006.01) |
| *A47C 27/14* | (2006.01) |
| *A61G 7/018* | (2006.01) |
| *A47C 23/00* | (2006.01) |
| *A47C 23/06* | (2006.01) |
| *A61G 7/057* | (2006.01) |

(52) U.S. Cl.
CPC ............ *A47C 27/14* (2013.01); *A47C 23/002* (2013.01); *A47C 23/06* (2013.01); *A61G 7/018* (2013.01); *A61G 7/0573* (2013.01); *A61G 7/05784* (2016.11); *A61G 2203/32* (2013.01); *A61G 2203/34* (2013.01); *A61G 2203/36* (2013.01); *A61G 2203/42* (2013.01); *A61G 2203/44* (2013.01); *Y10T 29/49119* (2015.01)

(58) Field of Classification Search
CPC ....... A47C 27/14; A47C 23/06; A47C 23/002; A47C 20/042; A47C 1/03222; A47C 1/0246; A61G 7/05784; A61G 7/0573; A61G 7/018; A61G 2203/32; A61G 2203/36; A61G 2203/44; A61G 2203/42; A61G 2203/34; Y10T 29/49119
USPC .......................... 5/236.1, 239, 241, 245, 934
See application file for complete search history.

(56) References Cited

U.S. PATENT DOCUMENTS

| | | | | | |
|---|---|---|---|---|---|
| 218,927 | A | * | 8/1879 | Bury | A47C 23/002 |
| | | | | | 152/262 |
| 2,532,425 | A | * | 12/1950 | Schenker | A47C 31/123 |
| | | | | | 5/401 |
| 5,058,224 | A | * | 10/1991 | Aschwanden | A47C 23/066 |
| | | | | | 5/236.1 |
| 5,075,912 | A | * | 12/1991 | Elmalek | A47C 23/067 |
| | | | | | 5/11 |

(Continued)

*Primary Examiner* — David E Sosnowski
(74) *Attorney, Agent, or Firm* — Richard G. Eldredge; Eldredge Law Firm

(57) ABSTRACT

Disclosed herein are embodiments of beds and components thereof. In one embodiment, a bed comprises a frame; a plurality of adjustable members, each coupled to the frame, and each of the plurality of adjustable members adjustable to individual positions; one or more sensors coupled to one or more of the adjustable members; and a controller, the controller configured for receiving input from the one or more sensors and determining at least one adjusted sleep setting for the occupant. The controller is further configured to control the plurality of adjustable members and adjust each of the plurality of adjustable members according to the at least one adjusted sleep setting. The adjustable members may comprise struts, slats, or a combination thereof.

20 Claims, 32 Drawing Sheets

(56) References Cited

U.S. PATENT DOCUMENTS

| | | | | |
|---|---|---|---|---|
| 5,109,558 | A * | 5/1992 | Di Blasi | A61G 7/0573 |
| | | | | 5/236.1 |
| 5,862,550 | A * | 1/1999 | Cosani | A61G 7/0573 |
| | | | | 5/238 |
| 6,447,442 | B1 * | 9/2002 | Richards | A61G 11/00 |
| | | | | 318/430 |
| 2007/0239370 | A1 * | 10/2007 | Block | A47C 23/002 |
| | | | | 702/41 |
| 2008/0052837 | A1 * | 3/2008 | Blumberg | A47C 23/002 |
| | | | | 5/727 |
| 2008/0169931 | A1 * | 7/2008 | Gentry | A61B 5/1113 |
| | | | | 340/573.1 |
| 2009/0094745 | A1 * | 4/2009 | Benzo | A61G 7/015 |
| | | | | 5/608 |
| 2012/0137444 | A1 * | 6/2012 | Wong | A47C 19/025 |
| | | | | 5/722 |
| 2012/0277637 | A1 * | 11/2012 | Vahdatpour | A47C 31/123 |
| | | | | 600/595 |
| 2014/0041127 | A1 * | 2/2014 | Codos | A47C 27/083 |
| | | | | 5/713 |
| 2015/0335507 | A1 * | 11/2015 | Emmons | A61G 7/0509 |
| | | | | 5/615 |

* cited by examiner

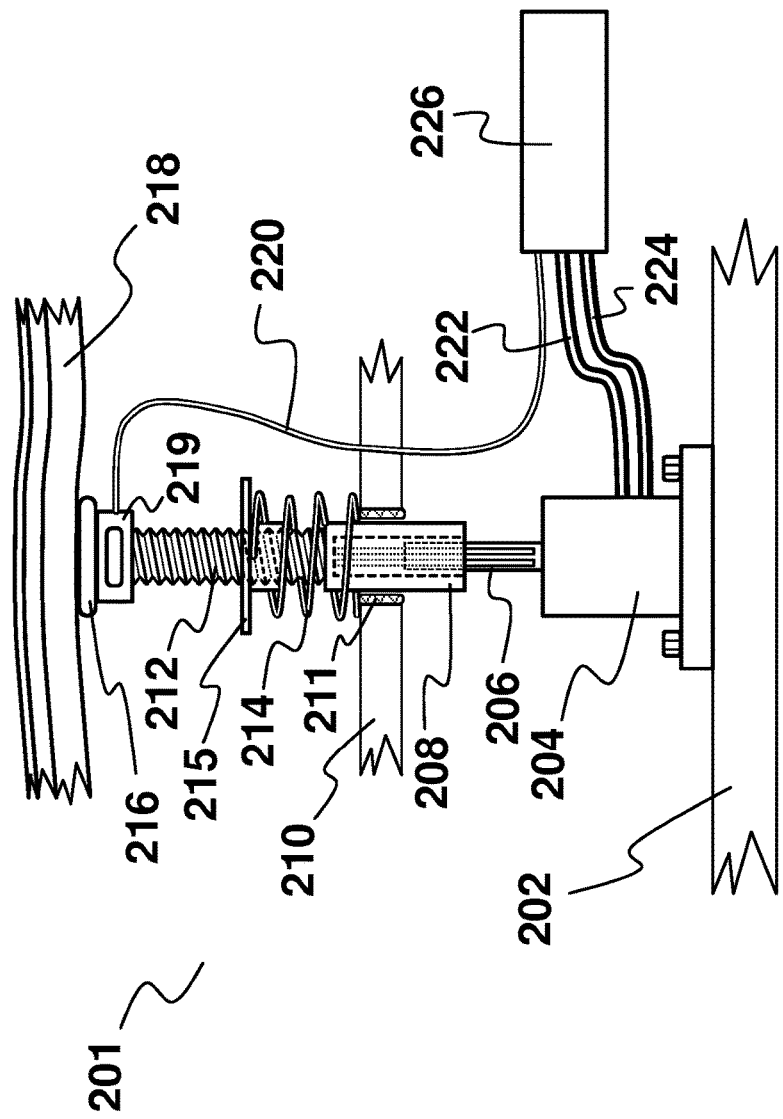

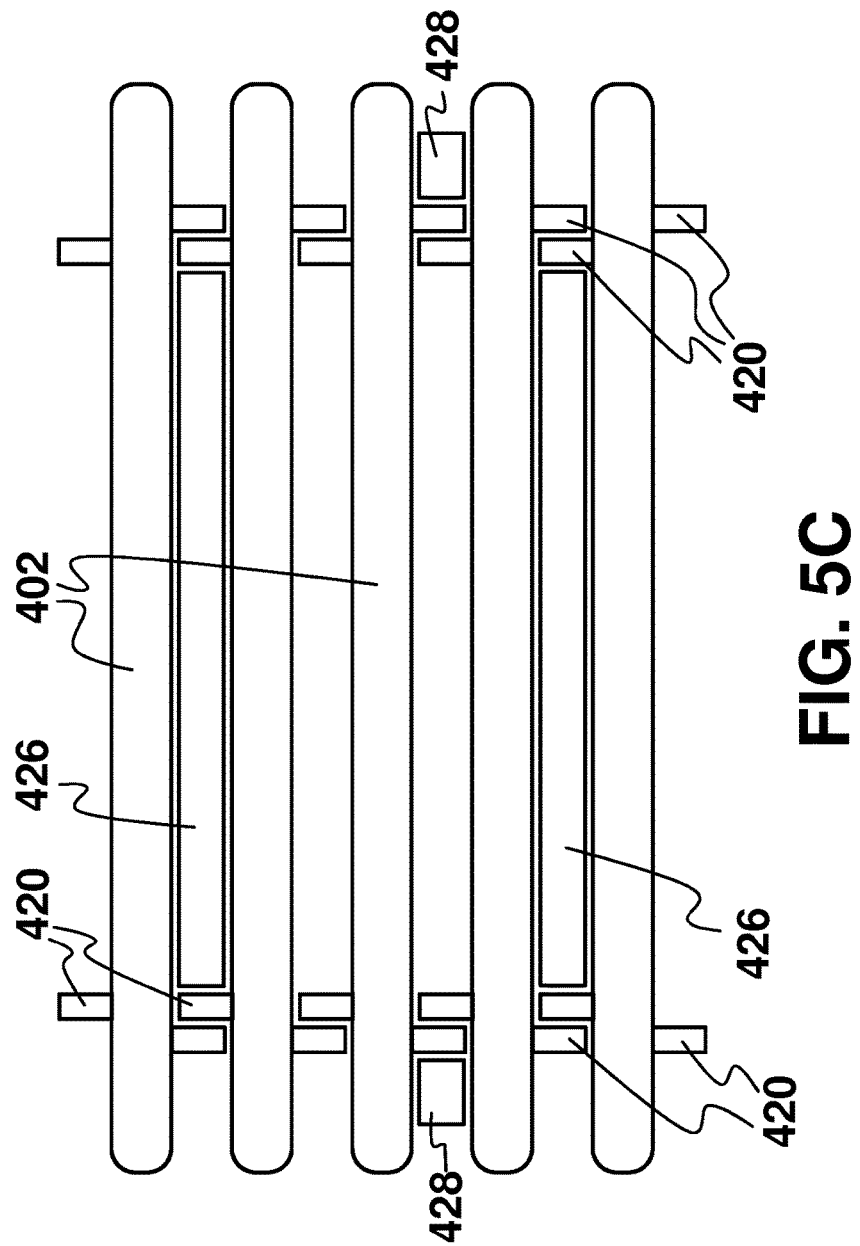

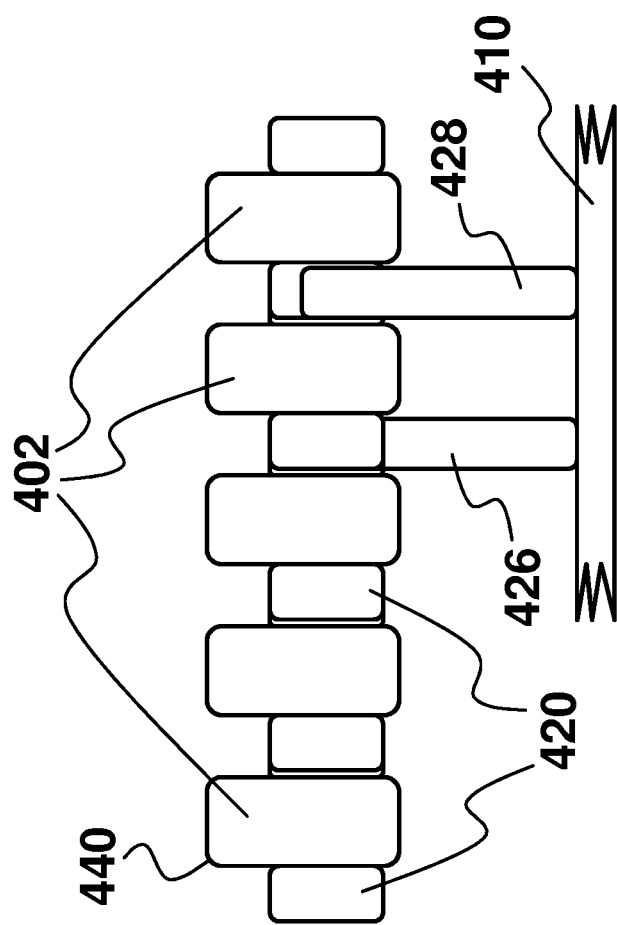

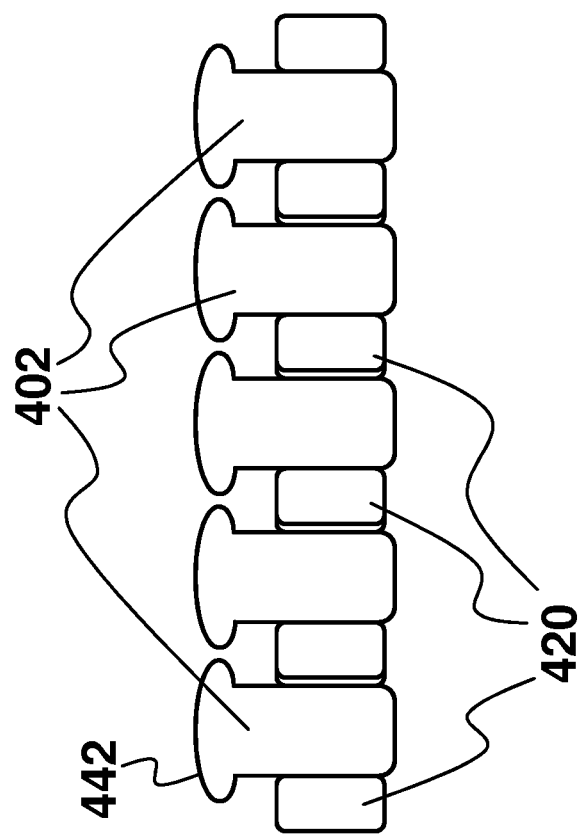

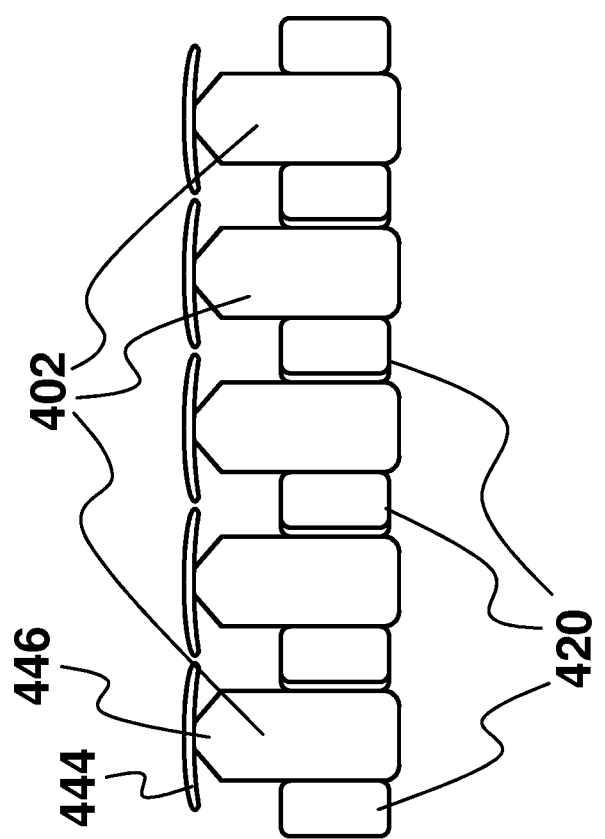

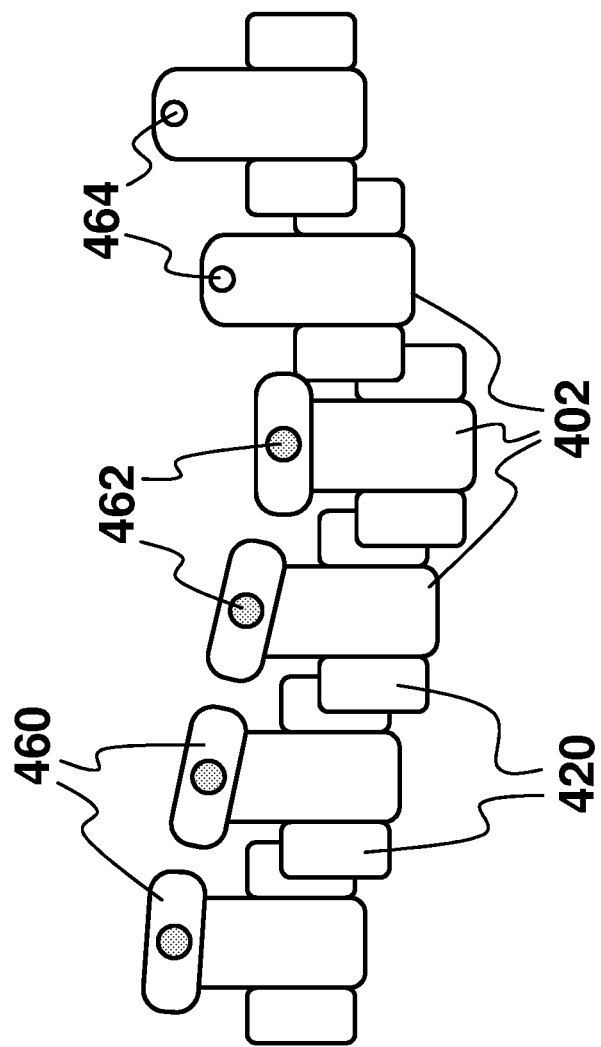

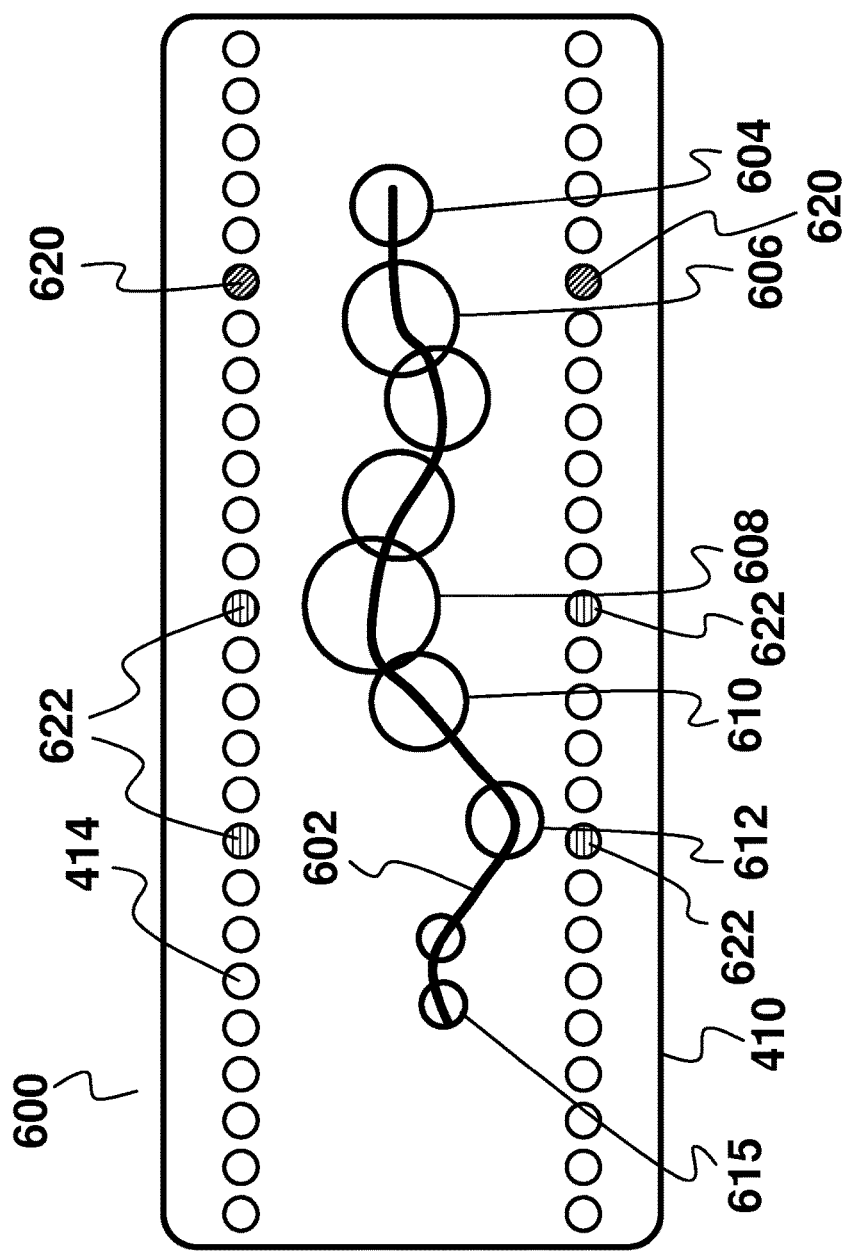

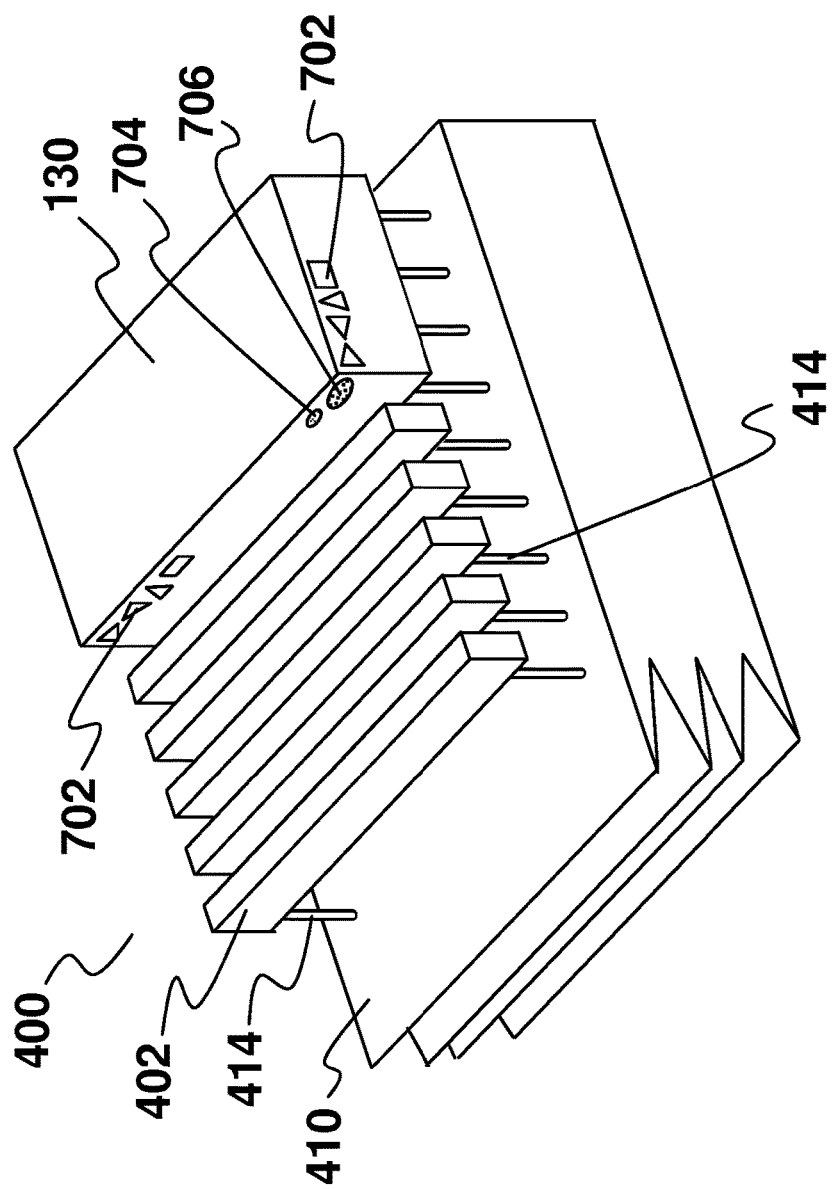

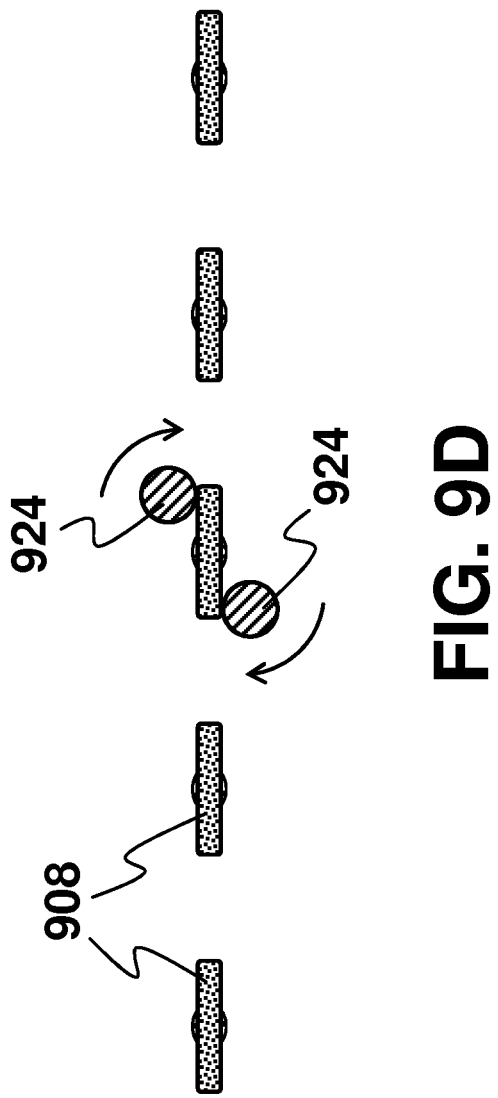

AUTOMATED BED AND METHOD OF OPERATION THEREOF

CROSS REFERENCE TO RELATED APPLICATION

This application claims the benefit of U.S. Provisional Application Ser. No. 62/008,348, filed by Matthew W. Krenik on Jun. 5, 2014 and entitled "Automated Bed and Method of Operation Thereof", commonly owned with this application and incorporated herein by reference.

FIELD OF THE DISCLOSURE

Embodiments of this disclosure relate to beds, and more specifically, to a bed which provides an adjustable surface responsive to inputs from sensors incorporated in the bed.

BACKGROUND

Quality of sleep is essential to good human health and well-being. Many types of beds have been developed, including mattresses and box springs, water beds, air mattresses, and memory foam mattresses, e.g. Mattresses and box springs comprising spring systems with coverings of pliable foam layers and possibly other materials have been in use for many years and are widely available. Many approaches and enhancements to beds and bedding have also been developed including mattress top coverings that include specially formed materials and foam to improve comfort. A wide range of materials, coverings, and configurations of blankets, sheets, pillows, and other bedding accessories are available.

In spite of a wide diversity of beds that are available, serious problems exist for substantially all types and configurations. Mattresses including spring systems sag over time and bugs (especially bed bugs), mites, human secretions, and other infestations and contaminants build up. Hence, many bed systems are not hygienic because there is no convenient way to launder, clean, or otherwise restore them. While a mattress with heavy coverings may be warm and cozy in the winter months, a lighter mattress covering that allows air to pass may be far more comfortable in the heat of summer. Conventional spring mattresses are also large and bulky, making them hard to store and move.

Water beds are heavy, create damage if a leak or rupture occurs, and some persons have difficulty sleeping in them due to the motion of the water. Water beds normally include a heating system to warm the water in them that normally takes several hours to establish a requested temperature. Hence, while the water bed temperature is usually adjustable, a person may find a given temperature not comfortable and would need to wait several hours for the water bed to adjust. For at least the foregoing reasons, water beds are generally impractical for use in hotels.

Air mattresses are normally not preferred for bedding as they don't allow air to pass, resulting in a warm and sweaty sleeping environment. In addition, some persons are unable to find comfortable sleeping positions on air mattresses.

Some mattresses include viscoelastic foam. Viscoelasticity provides both viscous and elastic properties that enable a mattress to conform and support a person sleeping on it. The viscous nature of the material is sensitive to temperature and is normally configured so that the warmth of a person's body causes the viscoelastic foam to yield and conform; however, air does not easily pass through, making the mattress too warm for some persons, and viscoelastic mattresses are also susceptible to contaminations and infestations. Further, viscoelastic foam mattresses are generally heavy and also expensive relative to a conventional spring mattress.

A key problem with all existing types of mattresses and beds is that while they may be tailored to persons of specific heights, weights, body shapes, and other personal aspects; it is impossible for them to be optimized for all persons. Hence, a mattress that provides stiffer springs in the region of a person's back for better back support of larger and heavier persons cannot help but generate an uncomfortably too stiff feeling for other persons who are smaller and lighter. Adjustable beds may provide some accommodations for certain sleeping positions, but if a person changes position the bed may need to be re-adjusted. Accordingly, adjustable beds substantially retain the issues with the various types of mattresses that they may be used with, and also tend to be heavy and expensive to produce.

SUMMARY

Disclosed herein are various embodiments of a bed and adjustable bed members comprising a bed system. In one embodiment, a bed comprises a frame; a plurality of adjustable members, each coupled to the frame, and each of the plurality of adjustable members adjustable to individual positions; one or more sensors coupled to one or more of the adjustable members; and a controller. The controller is configured for receiving input from the one or more sensors and determining at least one adjusted sleep setting for an occupant. The controller is further configured to control the plurality of adjustable members and adjust each of the plurality of adjustable members according to the at least one adjusted sleep setting.

In another embodiment, a system of adjustable bed members supported by a bed frame is disclosed. Each adjustable bed member comprises a top surface and a bottom surface, the bottom surface coupled onto a support base; one or more sensors positioned proximal the top surface; at least one rotatable jack screw, the at least one rotatable jack screw connected with a motor. The one or more sensors is connected with a controller, the controller configured for receiving inputs from the one or more sensors and determining an adjusted position for each adjustable bed member.

In yet another embodiment, a method for assembling a bed is disclosed. The method comprises placing and connecting frame members to form a bed base, said base comprising a bed frame and a plurality of struts; installing and connecting at least one gantry; configuring the at least one gantry to engage and adjust the plurality of struts; installing a plurality of slats atop the plurality of struts, wherein the slats extend laterally across the bed frame; installing a control system for the bed, the control system comprising a plurality of sensors about the plurality of slats and a controller, the controller configured to receive input from the plurality of sensors for determining an adjusted sleeping position; and connecting the control system with the gantry for sending signals to the gantry for controlling movement and adjustment of the plurality of struts.

BRIEF DESCRIPTION OF THE DRAWINGS

Reference is now made to the following descriptions taken in conjunction with the accompanying drawings, in which:

FIG. 2B shows a side view of another embodiment of a strut according to the present disclosure;

FIG. 5C shows a top view of an embodiment of slats illustrating operation of interlocking lugs and stabilizers according to the present disclosure;

FIG. 5D shows an end view of an embodiment of slats and lugs according to the present disclosure;

FIG. 5E shows an end view of another embodiment of slats and lugs according to the present disclosure;

FIG. 5F shows an end view of yet another embodiment of slats and lugs according to the present disclosure;

FIG. 5H shows an end view of another embodiment of slats and lugs according to the present disclosure;

FIG. 6C shows a graphical analytic view of a pressure profile that may be generated from a person lying on a bed formed with adjustable struts connected to slats according to the present disclosure;

FIG. 7 shows a perspective view of a portion of an embodiment of a bed comprising lateral slats and adjustable struts according to the present disclosure;

FIG. 9D shows a top view of an embodiment of how the hub of FIG. 9C may be used to engage the T-handle of a strut in a bed according to the present disclosure;

DETAILED DESCRIPTION

Figure 1A:
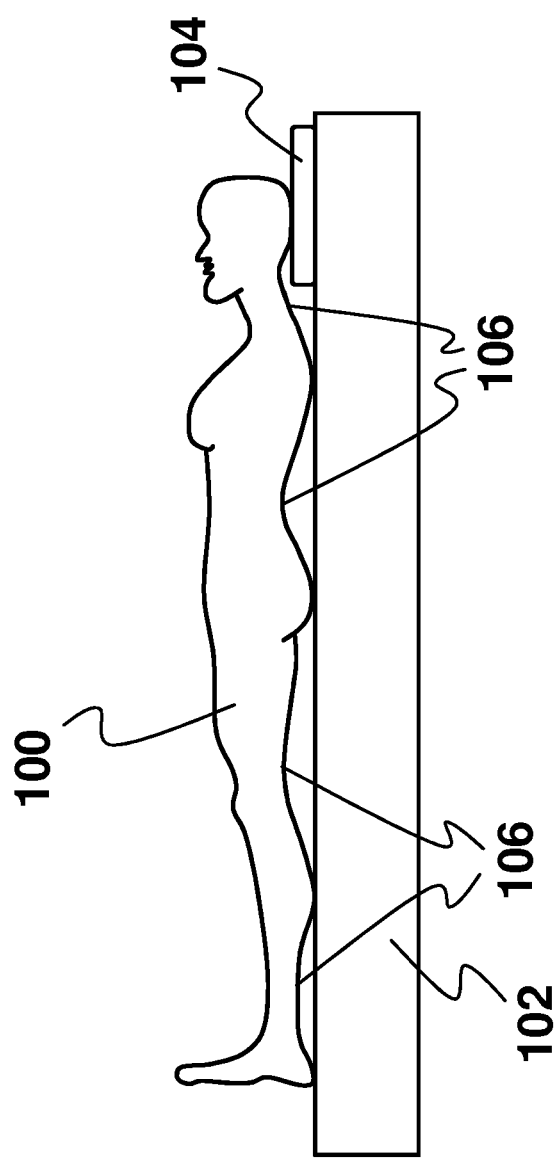
FIG. 1A shows a side cross-section view of a person lying on a conventional mattress.

The present disclosure provides enhanced systems, techniques, and methods for the application of electronic sensing and control to provide enhanced sleeping comfort and health for humans. A plurality of sensors positioned among a plurality of adjustable bed members, such as struts or slats, may sense force along with an occupant's body size, weight, shape, and various other factors for determining a preferred sleeping position. A controller, such as an electronic control, determines the preferred sleeping position and adjusts the adjustable members in order to provide a sleeping surface that conforms to the shape of person's body, optimizes the distribution of pressure on a person's body, provides movement in the course of sleep, and offers other benefits conducive to good sleep, comfort, and/or health. Some embodiments of struts may include springs or pliable materials for modeling changes in spring length. Some embodiments may comprise pliable material thickness as a function of applied force which may be utilized for modeling the surface shape of a bed. Some embodiments of struts may utilize jack screws while others may utilize pneumatic cylinders, hydraulic cylinders, or other constructions. Embodiments of beds may use substantially thin bed coverings over the struts so that the covering may be removed for laundering. Bed coverings may be easily changed to accommodate weather and environment changes. Some embodiments of bed coverings (and/or pillows, etc.) may include RFID (Radio Frequency Identification) tags or other techniques that allow a bed to read information regarding the thickness, stiffness, an insulation rating, and possibly other information about the bed covering (or pillow, etc.) so that the bed may optimize comfort and/or health of an occupant. Some embodiments may include a fan coupled with a heater or cooler to increase air flow to further enhance comfort. Sensor data may be analyzed to assess an occupant's sleeping position and adapt the bed to an adjusted sleeping position for improved comfort.

Alternative embodiments comprising lateral slats used in conjunction with adjustable struts may provide lower cost. The slats may comprise sensors, may be variably adjustable for improved comfort, and may include heaters or coolers. Some embodiments of slats may include springs, pliable materials, or may bend or flex under load. Slats may interconnect or interlock with each other to improve strength and allow lighter and/or lower-cost materials to be utilized for slats and struts. Slats may be adjusted to various heights and may tilt at various angles to provide improved sleeping comfort. An occupant's body position may be sensed and assessed by measuring pressure or force and assessing both a distribution of force and/or a quantity of force. Some embodiments may include buttons, voice response controls, accelerometers, force sensors, and other sensors or interfaces to allow a person to control a bed. Some embodiments may include wired or wireless connections to cell phones, watches, electronic tablets, computers, and other electronic interfaces that may allow a person to control a bed, send a user profile including their preferences to a bed, send biometric information to a bed, or otherwise configure or control a bed. Some embodiments may employ a gantry including motors or other controls that allow struts to be engaged and adjusted. Embodiments comprising a gantry may engage and control certain struts based on sleeping positions either determined by the plurality of sensors or input by a user so that struts may be controlled to benefit the user's comfort and/or health. Electric motors mounted to a gantry may engage multiple jack screws for supporting slats to provide an adjustable sleeping surface.

Beds constructed according to the present disclosure may be fabricated at reasonable cost, packaged compactly, transported easily, and set up quickly and easily.

One or more controllers coupled with beds according to the present disclosure may be configured to collect information from sensors, assess a bed occupant's sleeping position, and adapt to that position to improve sleep, comfort, and/or health. Some embodiments may monitor the sleeping habits of a bed occupant and proactively adjust so that the bed occupant is helped to change their sleeping position at various times so that health may be improved. Beds may collect and combine inputs from a variety of sensors including pressure sensors, force sensors, temperature sensors, humidity sensors, vibration sensors, heart rate sensors, microphones that may be used to record and analyze breathing, and other possible sensors. The one or more controllers may receive information from multiple sensors to make determinations regarding how to benefit the comfort, sleep, and/or health of a bed occupant. Some embodiments may monitor certain sensors to detect if a bed occupant is bumping, tapping, or otherwise generating movements, signaling that the bed occupant is in a certain sleeping position, that the bed occupant is not comfortable, or possibly providing other signals to control the bed.

Beds utilizing struts or a combination of struts and slats may be configured to adjoin so that larger beds may be formed from a combination of smaller beds. Slats may include features to allow them to interconnect or interlock. Spacers may be utilized to allow smaller beds to adjoin without interfering with operation in undesirable ways. Beds comprising struts or a combination of struts and slats according to the present disclosure may be configured so that they may be disassembled for storage or moving in a substantially compact and convenient fashion.

FIG. 1A is a side view of a person 100 lying on a conventional mattress 102 and a pillow 104. The conventional mattress 102 shown in FIG. 1A may be very firm and there are gaps 106 between the conventional mattress 102 and regions of the person's 100 ankles, thighs, lower back, and neck. A softer conventional mattress may be sufficiently pliable to close some of the gaps 106 shown, but the parts of person's 100 body contacting conventional mattress 102 in FIG. 1A would still bear most of their body weight.

Figure 1B:
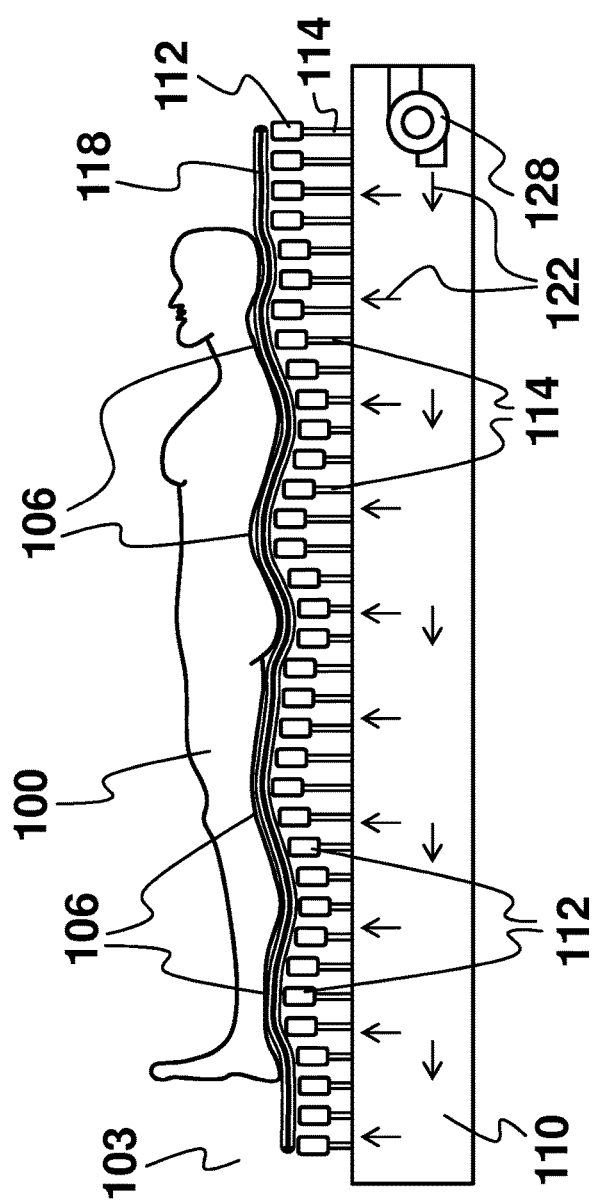
FIG. 1B shows a side cross-section view of a person lying on an embodiment of a bed having adjustable struts according to the present disclosure.

FIG. 1B shows a side cross-section view of a person 100 lying on an embodiment of a bed 103 formed with adjustable struts 114 having bed covering 118 affixed there over. Struts 114 may be adjusted to conform to the person's 100 body structure and sleeping position such that person 100 may be more comfortable when sleeping. Struts 114 are shown extending from bed frame 110 and have strut caps 112 attached thereon. Struts 114 may be of the form of strut 200 shown in FIG. 2A, strut 201 shown in FIG. 2B, strut 203 shown in FIG. 2C, or may be hydraulic struts, pneumatic struts, or any other form of strut suitable for the embodiment of bed 103 as shown. Bed frame 110 may house one or more struts 114 and other components of bed 103. Other possible constructions of bed frame 110 may include open frameworks, frameworks covered with fabrics or other materials, boxes or frameworks supported on legs to increase the height of a bed 103 above a supporting floor, or other possible structures suitable to support and house struts 114 and other elements of various embodiments of bed 103. Bed frame 110 may include sound insulating or sound deadening material to reduce the level of acoustic noise that may emanate from bed frame 110. Some embodiments of bed frame 110 may be designed in a manner to de-tune the acoustic properties of bed frame 110 so that it is less likely to acoustically resonate and create audible noise. Bed frame 110 may be a box or other suitable structure and may comprise wood, plywood, composite materials, plastics, metals, or other materials.

The regions where gaps 106 existing between person 100 and conventional mattress 102 in FIG. 1A are shown to be substantially closed in FIG. 1B. In FIG. 1B, struts 114 have been adjusted to conform to person's 100 body so that person's 100 body is substantially uniformly supported. Strut caps 112 in FIG. 1B are shown as larger structures than strut caps 216 of FIGS. 2A-2C, which may be thinner in size. Strut caps 112 may comprise a cover or shroud for struts 114. Strut caps 112 in bed 103 support bed covering 118, and bed covering 118 provides a surface for person 100 to lie on. Since struts 114 are adjusted to conform to person 100, person 100 can comfortably rest on bed 103 without the need for thick layers of foam and springs as are commonly found in conventional mattresses 102. Accordingly, bed covering 118 may be relatively thin compared to bed coverings for traditional mattresses and may be removed and laundered, or may be changed to different materials, weight, fill or insulations according to person's preference. Some embodiments of bed covering 118 may comprise a thickness between about ½ inch thick to about 5 inches thick, and other embodiments may be thicker or thinner in size according to a person's preference, and likewise may comprise a single layer, or multiple layers as desired. Some embodiments of bed coverings 118 may be of uniform thickness while others may vary in thickness by regions of the bed. Bed covering 118 may comprise foam, fabrics, and other materials.

Bed 103 may use information collected from sensors, input from user interfaces, and other possible information to adjust struts 114 to conform for person 100. Additionally, information about the size and materials comprising bed covering 118 may be entered into a user interface or collected automatically through sensors, RFID (Radio Frequency Identification), or other suitable methods.

Some embodiments of beds 103 may include RFID, NFC (Near Field Communications), passive inductance measurement devices, passive RFID tag readers, active RFID tag readers, resonant circuit measurement devices, or other suitable ways for bed 103 to collect information about bed covering 118 stored in an RFID tag, NFC tag, or other suitable electronic tag that may be read so that information regarding the properties of bed covering 118 may be determined by bed 103. Some embodiments of beds 103 may be configured to read multiple RFID tags or otherwise sense or receive information from multiple layers of bedding (or pillows, etc.). It is also possible for some thicker layers of bed coverings 118 to have RFID tags or other techniques to pass information to a bed while other very thin layers such as bed sheets may be sufficiently thin and light that they may be neglected in bed shape modeling algorithms.

Some embodiments may comprise a fan 128 to circulate air through the bed frame 110. Arrows 122 in FIG. 1B indicate possible air flow inside bed frame 110. Fan 128 may be a centrifugal fan, axial flow fan, variable speed fan, or other type of suitable fan and may be driven by an electric motor. Some embodiments may also include elements to heat or cool air to improve comfort for person 100. Fan 128 may be reversible in some embodiments so that air may be directed either upwards or downwards through bed covering 118. Some embodiments of fan 128 may provide reversible air flow via electrical drive signals to a motor driving fan 128, while other embodiments may utilize duct work or other mechanical approaches to reverse air flow. Some embodiments of bed 103 may include electronic controls that warm or cool bed 103 automatically to maintain a desired temperature for person 100, including timing functions according to time or day and other settings similar to those which may be adjusted in heating and air conditioning controllers. Bed 103 may alternatively facilitate air flow by directing air between the top surface of bed frame 110 and below strut caps 112.

Figure 2A:
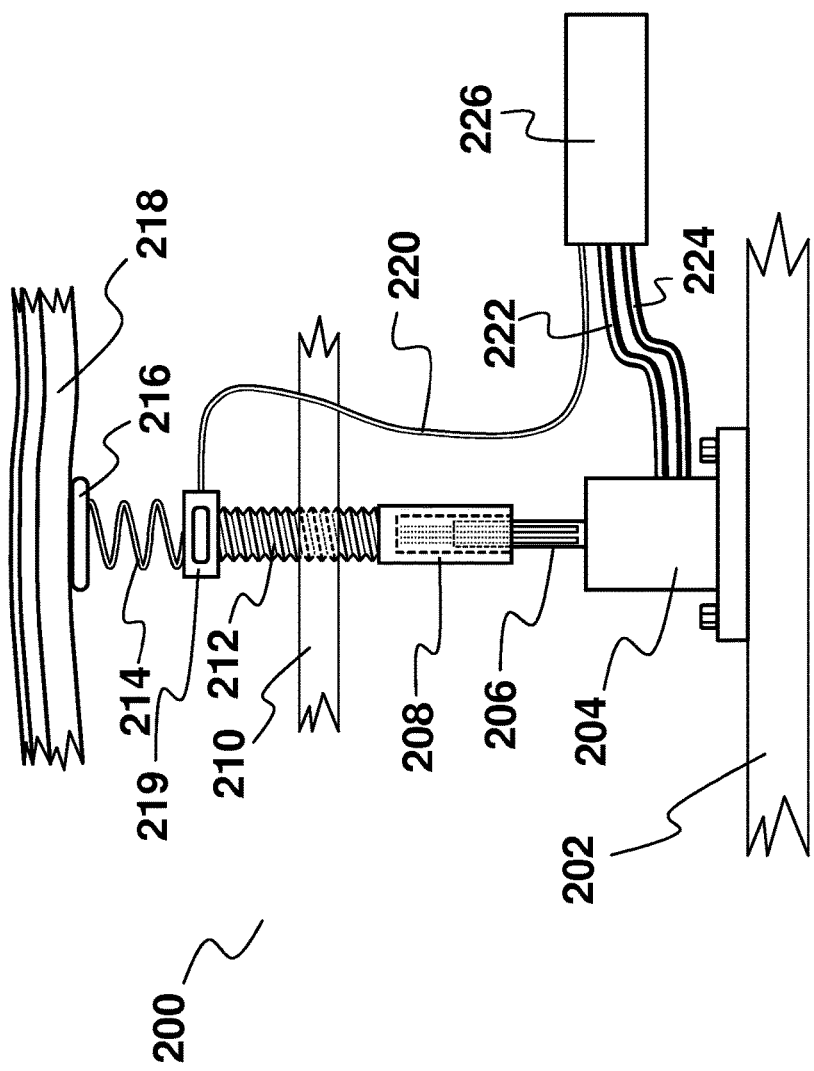
FIG. 2A is a side view of an embodiment of one component, a strut, that may be used in one or more embodiments of beds according to the present disclosure.
Figure 2C:
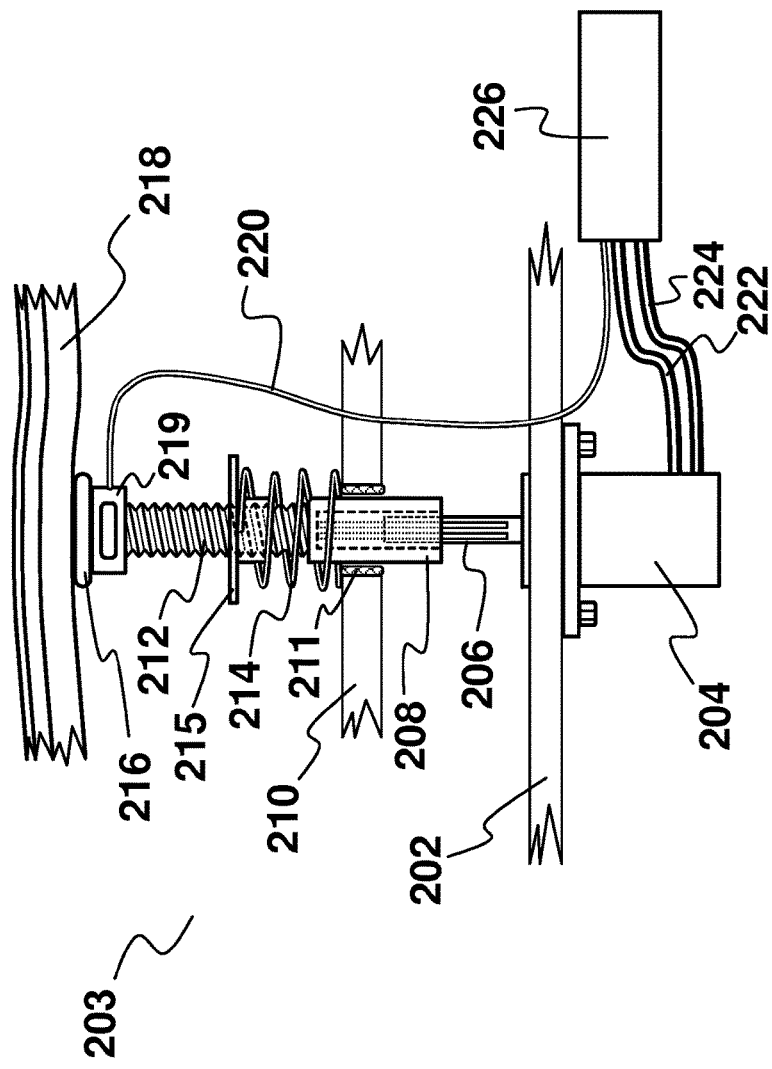
FIG. 2C shows a side view of yet another embodiment of a strut according to the present disclosure.

Struts 114 as shown in FIG. 1B may contain jack screws 212 as shown in FIGS. 2A-2C. However, exposing threaded jack screws 212 on the outside of a bed may be problematic as a jack screw 212 may be greased, oiled, or otherwise lubricated for operation. Accordingly, bedding materials may be exposed to and damaged by strut 114, and some embodiments may comprise shields, shrouds, or coverings to prevent direct contact with struts 114, which may be applied around or over struts 114 and likewise serve as a safety shield to prevent small objects, such as, i.e., fingers, from getting caught therein.

Figure 1C:
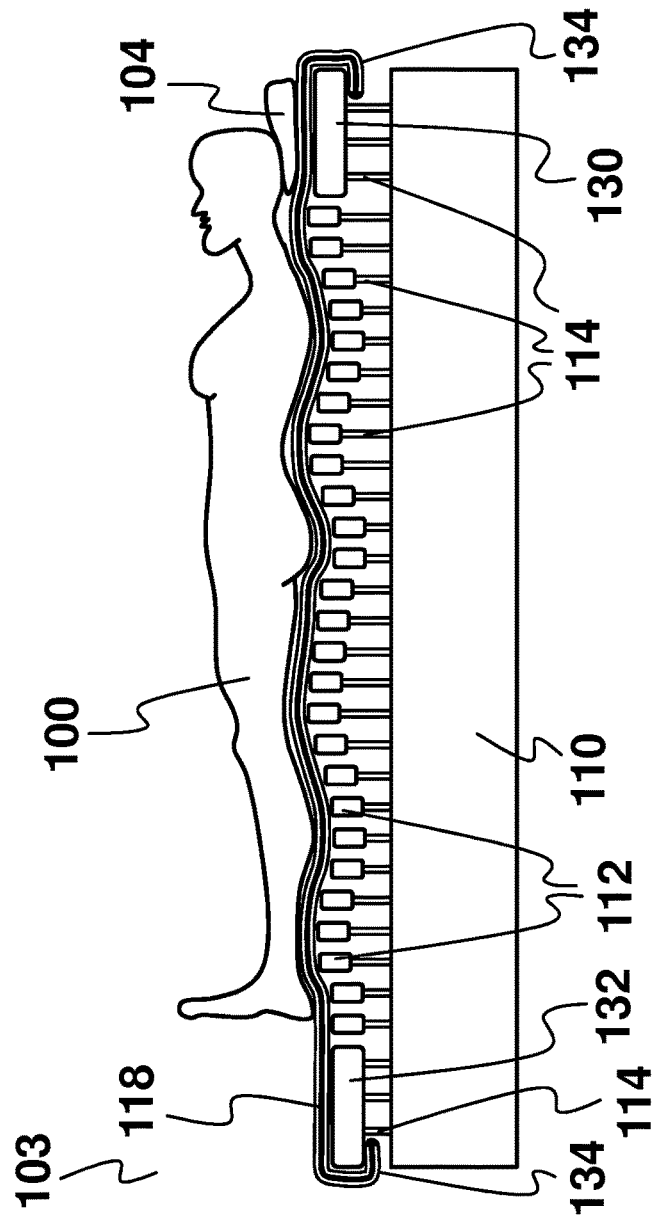
FIG. 1C show a side cross-section view of another embodiment of a bed formed with adjustable struts according to the present disclosure.

FIG. 1C is a side cross-section view of another embodiment of a bed 103 formed with adjustable struts 114 having head platform 130 and foot platform 132 sections. Head platform 130 and foot platform 132 may provide larger surfaces that may provide an alternative to utilizing struts 114 to support the head and feet of a person 100 lying on bed 103, and may offer benefit in reducing the cost and/or complexity, or improving the comfort of bed 103. Head platform 130 and foot platform 132 may be supported and automatically adjusted through control of the struts 114 shown supporting them in FIG. 1C. Head platform 130 and/or foot platform 132 may be coupled to bed frame 110 and fixed in position, or may be adjustable. Adjustable head platforms 130 and/or foot platforms 132 may be manually adjusted by person 100 or another person. The height and/or incline of head platform 130 and/or foot platform 132 may be adjusted by manual levers, knobs, stops, supports, or other common elements, using common techniques that are used commonly to adjust athletic benches, household items, furniture, and other common things. Sensors may be used to detect the height and/or incline of head platform 130 and/or foot platform 132 so that the height of strut caps 112 may be adjusted accordingly. In some such embodiments, strut caps 112 near head platform 130 and/or foot platform 132 may include mechanical features that may strike, interlock with, or otherwise contact head platform 130 and/or foot platform 132 through at least a portion of the possible range of adjustment of struts 114 so that the height and/or incline of head platform 130 and/or foot platform 132 may be sensed by sensing the associated strut(s) 114. In some embodiments, struts 114 supporting head platform 130 and/or foot platform 132 may incorporate pressure or force sensors so that the weight born by head platform 130 and/or foot platform 132 may be determined. Head platform 130 and/or foot platform 132 may comprise air permeable materials, perforated materials, meshes, or other materials or constructions benefitting substantially free flow of air. Some head platforms 130 may further comprise a pillow incorporated therein so a traditional pillow is not needed.

The outer positions of head platform 130 and foot platform 132 are shown in FIG. 1C aligned to the length of bed frame 110. Head platform 130 and/or foot platform 132 may also extend beyond bed frame 110 and likewise, bed frame 110 may extend beyond either or both head platform 130 and/or foot platform 132.

In the view shown in FIG. 1C, the feet of person 100 do not extend to foot platform 132. However, in the case of a larger and taller person 100 or if person 100 is positioned on bed 103 closer to foot platform 132, person's 100 feet may actually rest on foot platform 132. In some embodiments, foot platform 132 and/or head platform 130 may provide a specially formed or contoured surface to improve comfort instead of the flat top surfaces shown in the embodiment of FIG. 1C. In cases where the feet of person 100 extend over foot platform 132, some embodiments of bed 103 may align the tops of strut caps 112 of nearby struts 114 to provide a substantially flat surface near to foot platform 132 as it may be difficult by sensing the weight on foot platform 132 to determine precisely the place at which person's 100 feet extend over foot platform. In some embodiments, the pressure or weight born by foot platform 132 may not be electronically sensed so that detection of other features of person's 100 body may be necessary to infer the extent of person's 100 feet over foot platform so that struts 114 near to foot platform 132 may be adjusted.

Bed covering 118 is shown wrapped over the ends 134 of head platform 130 and foot platform 132 and may be affixed in place with snaps, hook and loop fasteners, hooks, pockets, catches, springs, draw string, ribbon ties, clips, elastic bands, elastic rings, or any other suitable techniques. Pockets sewn into bed covering 118 may slide over some portions of head platform 130, foot platform 132, and strut caps 112; while other techniques (snaps, hook and loop closures, hooks, catches, pins, etc.) may allow bed covering 118 to attach to or be affixed to head platform 130, foot platform 132, and strut caps 112; and other techniques may also be utilized to secure, attach, or affix a bed covering 118. The side view shown in FIG. 1C does not show bed covering 118 over the sides of head platform 130, foot platform 132, and strut caps 112, but in some embodiments, bed covering 118 may fit over all the outer peripheral sides of head platform 130, foot platform 132, and strut caps 112. For such an embodiment, bed covering 118 may be applied with an elastic ring that fits over the head platform 130, foot platform 132, and strut caps 112, much like a fitted sheet or mattress cover fits over a conventional mattress with use of an elastic ring. Bed covering 118 may cover some or all components of bed 103, and some embodiments may include one or more bed coverings for various components. Some embodiments of bed coverings 118 may include thinned regions, more flexible regions, more elastic regions, or other features. Such variations in the construction of bed coverings 118 may be placed near to where head platform 130 and/or foot platform 132 meet with nearby struts 114 so differences in height between head platform 130 and/or foot platform 132 and nearby struts 114 may be accommodated.

Figure 1D:
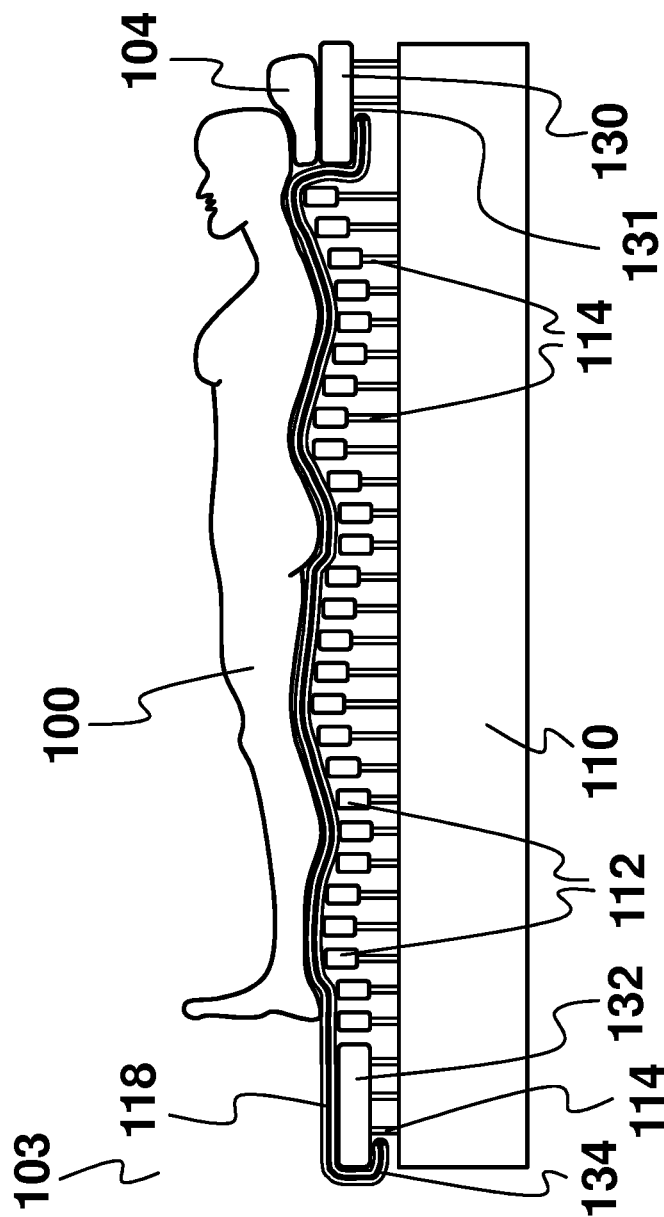
FIG. 1D shows a side cross-section view of another embodiment of a bed formed with adjustable struts according to the present disclosure.

FIG. 1D shows an embodiment of a bed 103 where bed covering 118 extends between struts 114 nearest head platform 130 and head platform 130 and is affixed to a lower side 131 of head platform 130. Bed covering 118 may be affixed to lower side 131 of head platform 130 with hooks, springs, clips, hook and loop fasteners, pins, cord or string, or other possible techniques. Positioning a bed covering 118 between a head platform 130 and adjacent struts or slats and affixing it to the head platform 130, slat, strut, or bed frame 110, may allow a head platform 130 to more easily extend above or below the top surface of the struts or slats making up a bed or slat bed without over-extending or over-stretching the bed covering 118 (that might cause bed covering 118 to bridge over the gap formed between the top of head platform 130 and nearby struts 114, possibly resulting in an uncomfortable result for person 100). In this way, difference in height between a head platform 130 and adjacent struts or slats may allow side sleepers who may need the top surface of the struts or slats nearby a head platform to be substantially below or above the head platform 130 in height to be more easily and comfortably accommodated.

FIG. 2A is a side view of a strut 200. Strut 200 comprises a jack screw 212 having a splined hub 208, a spring 214, and a strut cap 216 at the distal end of the jack screw. The jack screw is coupled at its proximal end with electric motor 204, which is coupled into base support 202 via one or more fasteners, such as, for example, bolts. A pressure sensor 219 is positioned proximal the distal end of the jack screw 212 and coupled with a controller 226. Base support 202 may function as a bottom of a bed frame, similar to bed frame 110, or another possible support built into a bed. Jack screw 212 has spiral threads and is threaded into a similarly spiral threaded hole in upper support 210. Upper support 210 may comprise a substantially rigidly fixed support and may function as a top surface of a bed frame or may be another possible support built into a bed. The spiral threaded hole in upper support 210 may be formed to smoothly and effectively engage the spiral threads of jack screw 212 so that rotary motion applied to jack screw 212 results in vertical motion of jack screw 212 and pressure sensor 219 attached to the top of jack screw 212. The spiral threaded hole in upper support 210 may be formed directly in upper support 210, or may be formed inside an insert, hub, or other element formed from metals or other suitable materials that may be bonded or otherwise affixed into upper support 210. Pressure sensor 219 may be attached to jack screw 212 with a bearing and may be affixed to spring 214 so that pressure sensor 219 does not substantially rotate when jack screw 212 rotates. Spring 214 may comprise a compressive coil spring that provides compliance between sensor 219 and strut cap 216. Strut cap 216 may be a rigid or semi-rigid disc or other structure suitable to provide a connection to the upper end of spring 214 and provide a suitable surface with which to engage bed covering 218. Bed covering 218 may comprise multiple layers of materials and may form an upper surface for a bed on which a person may recline, rest, or sleep. These materials may include layers of pliable foam rubber, viscoelastic foam, other types of foam material used in the manufacture of beds and mattresses, other pliable materials, layers of canvas, layers of fabric, layers of meshes of nylon, layers of meshes of other synthetic or organic materials, layers of blankets, layers of woven fiber, or layers of other materials suitable for a bed covering. Note that bed covering 218 as shown in FIGS. 2A-2C serves a similar purpose and may be of similar construction to bed covering 118 as shown in FIGS. 1B-1D. Spring 214, strut cap 216, and pressure sensor 219 may include additional supporting or guiding elements to prevent turning in response to rotary motion of jack screw 212, but respond mechanically to vertical motion of jack screw 212. Motor 204 may include a rotary position sensor, one or more commutation angle sensors, or other sensors connected to controller 226 by rotation sensor wire 222 and suitable to provide the relative angle of motor shaft 206 and to allow rotations of motor shaft 206 to be counted and determined by controller 226. Some embodiments of motor 204 and controller 226 may implement sensor-less commutation of motor 204 in which the commutation angle of motor 204 may be determined by analysis of the motor's 204 windings, so that no additional rotary position sensor or rotation sensor wire 222 are needed. Motor 204 may receive power, commutation controls, and other control signals from controller 226 over motor wire 224. Pressure sensor 219 may sense force or pressure between jack screw 212 and spring 214 and provide a representative signal to controller 226 over pressure sensor wire 220. Those skilled in the art will recognize that pressure is the application of force over a surface area. In the present disclosure, various embodiments may alternatively utilize pressure sensors and signals representing pressure, force sensors and signals representing force, or both pressure and force sensors and associated signals.

Motor shaft 206 may be splined as shown and engage splined hub 208. Hub 208 is attached to jack screw 212 so that rotary motion of hub 208 causes rotation of jack screw 212. Hub 208 has splined construction so that vertical motion of jack screw 212 results in vertical sliding of hub 208 on the splined shaft 206 of motor 204 so that motor 204 may transfer motion to jack screw 212 over a range of vertical positions of jack screw 212 as allowed by the dimensions and construction of hub 208. Other embodiments of shafts 206 may comprise hexagonal, square, or other suitable cross-sections for engaging appropriately formed hubs 208 and provide rotational coupling. Controller 226 may be wired or wireless and may be powered by electricity, batteries, or other possible power sources. Controller 226 may include sensor conditioning electronics, analog-to-digital converters, digital electronics, microcontrollers, programmable electronic elements, computers, digital-to-analog converters, amplifiers, comparators, power electronics, electronic memory, and other electronic components. Controller 226 may also include wired or wireless electronic interfaces such as USB, FIREWIRE®, THUNDERBOLT®, BLUETOOTH®, ZIGBEE®, WiFi, or other electronic interfaces to allow controller 226 to interface to other controllers, computers, user interfaces, cell phones, electronic tablets, watches, and other possible electronic devices. Controller 226, or other electronics may also interface with internet servers, cloud servers, host computers, or other computer systems to report issues, upload data, download updates, download upgrades, or otherwise interface with and/or benefit from interconnection with computers or internet systems.

Base support 202, upper support 210, and bed covering 218 are shown in FIG. 2A as broken segments of larger elements. Base support 202, upper support 210, and bed covering 218 may cover a full embodiment of a bed or a portion of an embodiment of a bed utilizing the techniques of the present disclosure.

Motor 204 maybe an AC induction motor, DC brush type motor, brushless DC motor, stepper motor, or other suitable motor. Some embodiments of motor 204 may include gears, gear reductions, worm gears, or other components for matching torque and speed. Shaft 206 and hub 208 may comprise steel, metals, plastics, or other suitable materials. Jack screw 212 may comprise steel, aluminum, plastics, or other suitable materials. Base support 202 and upper support 210 may comprise wood, plastics, metals, combinations of materials, or other suitable materials. Spring 214 may comprise steel, plastics, or other suitable materials. In some embodiments, spring 214 may comprise plastic foam or other pliable material. Strut cap 216 may comprise wood, plastics, metals, or other suitable materials. Pressure sensor 219 may be any suitable pressure or force sensor that may sense compressive force or pressure between jack screw 212 and spring 214.

Strut 200 may be used in beds as a replacement for a spring in a mattress. Accordingly, a bed, such as bed 103, may comprise an array of struts 200. Pressure or force may be monitored at one or more struts 200 in the array and the height of the top of the bed covering 218 may be estimated based on the vertical position of jack screw 212 and knowledge of the forces applied to struts 200. The vertical position of jack screw 212 may be determined by controlling motor 204 by controller 226 to turn jack screw 212 to its lower or upper limit. In some embodiments, jack screw 212 may include a stop feature such as a threaded nut or nuts, a suitable fitting, or other feature secured to or formed on jack screw 212 so that jack screw will substantially stop turning when the stop feature engages upper support 210 or some other suitable element that would force motion of jack screw 212 to stop movement. Such a stop feature, uniformly applied to jack screws 212 of the struts 200 of a bed formed from such struts 200 would allow adjustment of the top surface of bed covering 218 to achieve a substantially flat surface. Once the limit of motion of jack screw 212 is determined, a rotation sensor inside motor 204 may be utilized by controller 226 to count full and partial turns of shaft 206 so that the vertical position of jack screw 212 may be determined (based on the rotation of shaft 206 and the angle of the threads of jack screw 212). Other embodiments of struts 200 may utilize encoders, sensors, or other suitable techniques to monitor rotation of motor 204, or may use ultrasonic sensors, radar, sonar, or other techniques to substantially directly measure the length of strut 200, or even directly measure the height of bed covering 218. For example, an ultrasound range sensor mounted to upper support 210 and directed vertically upwards could substantially directly measure the height of the lower surface of bed covering 218. Those skilled in the art will recognize a wide range of ways that radar, sonar, optical measuring devices, and other techniques may be applied to measure the height of bed covering 218, model the effects of force or pressure on bed covering 218 and/or spring 214, and model or otherwise analytically estimate the shape of a sleeping surface of a bed comprising struts 200.

Controller 226 receives input from one or more sensors, such as pressure sensor 219. With knowledge of the pressure applied to spring 214, controller 226 may estimate the degree to which spring 214 is compressed based on at least the spring constant of spring 214 and the degree to which bed covering 218 is compressed (computed based on the pressure applied and the compressive properties of the materials used for bed covering 218). Hence, controller 226 may determine an adjusted position of strut 200 such that vertical position of jack screw 212 may be adjusted with motor 204. In some embodiments, motor 204 may be a stepper motor and, for such embodiments, it may not be necessary to monitor the rotation angle of motor 204 as stepper motors may normally provide controlled levels of motion in response to applied control signals.

On a conventional mattresses, springs only compress and the top surface of the mattress simply conforms to weight applied thereon. Strut 200 allows controls from controller 226 to be applied so that the height of the top of bed covering 218 may be controlled substantially independently of the weight applied to strut 200 (limited by the mechanical range of jack screw 212, the stiffness of spring 214, the level of compliance of bed covering 218, and possibly by other factors). For example, in a conventional mattress, minimum pressure on a mattress spring would normally result in the top surface of the mattress to be at its highest level. But with the strut 200 of FIG. 2A, minimum pressure on strut 200 may be achieved at any height of a bed surface by turning motor 204 to raise or lower jack screw 212 (or an array of jack screws present in an array of struts). That is, the pressure on a strut 200 may be substantially determined by the load it bears and the actual length of strut 200 (or correspondingly the height of the surface of bed covering 218) may be adjusted as desired. Of course, as struts 200 in a bed are adjusted, the pressure on the strut 200 and other struts 200 may change. Minimum pressure or force on strut 200 may be achieved by turning motor 204 to lower jack screw 212 so that the weight applied to the bed falls to adjacent struts 200 in the array and the particular strut 200 being controlled sees reduced pressure or force. Turning motor 204 to raise jack screw 212 would normally increase the pressure or force on strut 200 as it assumes more of the applied load from other adjacent struts 200. Hence, the application of struts 200 in an array to form a surface for a bed provides the ability to adjust the contour of the top surface of the bed to a substantially desired contour in the face of a significant range of applied loads.

Some embodiments of strut 200 may not include spring 214 and may attach pressure sensor 219 directly to strut cap 216. In fact, pressure sensor 219 and strut cap 216 may be formed in a common sub-assembly and be applied as a single component. In such embodiments, bed covering 218 may be made thicker and more pliable to provide a desired level of softness and comfort to a person lying on such a bed. Some embodiments may also apply pliable materials such as complaint foam, plastic mesh materials, or other suitable materials or components in place of spring 214. Some embodiments of beds may simply provide a harder and more rigid surface for sleeping and not include spring 214.

Some embodiments of motor 204 may allow motor torque to be determined by monitoring the current used to cause motor 204 to rotate. Hence, electronic monitors that may be incorporated in motor 204, controller 226, or other locations in a system including strut 200 may monitor the level of current supplied to motor 204 over motor wire 224 so that the torque produced by motor 204 may be computed from the current applied and the motor torque constant. Alternatively, some embodiments of motors 204 may include a torque sensor that substantially provides a reading indicative of motor torque. Knowledge of the torque applied by motor 204 to jack screw 212 and the mechanical advantage offered by jack screw 212 then allows computation of the pressure or force jack screw 212 may apply to spring 214. As a motor torque constant may be controlled and motor current may be measured in some embodiments of strut 200, calibration of pressure sensor 219 based on comparison of the pressure reading of pressure sensor 219 at the same times and over the course of some rotation of motor 204 may be beneficial.

Friction of jack screw 212 and other parts of strut 200 may make the actual pressure or force on strut 200 somewhat different from that computed from observation of the current applied to motor 204 to achieve rotating motion. The effect of friction may be especially troublesome when strut 200 is heavily loaded and friction is high. The torque needed to turn jack screw 212 to cause it to lift bed covering 218 will normally be somewhat higher than the torque needed to turn jack screw 212 to cause it to lower bed covering 218. As the torque needed to lift bed covering 218 is the torque needed to lift the applied load and overcome friction, and the torque needed to lower bed covering 218 is the torque needed to overcome friction less the action of the applied load on jack screw 212; friction may be removed from computations of the pressure or force actually applied on strut 200. Hence, the force or pressure on strut 200 may normally be computed by monitoring the current applied to motor 204 as it is commanded by controller 226 to both raise and lower jack screw 212. Consequently, some embodiments of strut 200 may determine the applied force or pressure by raising and lowering jack screw 212. Operating motor 204 in a way in which pressure or force may be determined may allow motor 204 to be used as a force or pressure sensor in some embodiments so that pressure sensor 219 may not be needed in those embodiments.

In some embodiments, controller 226 may control more than a single strut 200. For such situations, controller 226 may be connected to two, three, or a larger plurality of struts so that many struts 200 may be controlled by a single controller 226. One or more controllers 226 may be present in an embodiment of a bed and multiple controllers may intercommunicate electronically for contouring the top surface of bed covering 218.

FIG. 2B shows a side view of another embodiment of a strut 201 comprising a jack screw 212, an electric motor 204, a splined hub 208, a spring 214, a pressure sensor 219, threaded hub 215, and a controller 226. In FIG. 2B, spring 214 has been moved from being positioned between strut cap 216 and pressure sensor 219 to be positioned between threaded hub 215 and upper support 210. Threaded hub 215 encircles jack screw 212 and engages the threads of jack screw so that rotary motion of jack screw 212 results in vertical force applied to threaded hub 215. Some embodiments of threaded hub 215 may be supported or guided by additional supports not shown in FIG. 2B, so that rotary motion of jack screw 212 does not result substantially in rotary motion of threaded hub 215. Vertical force of threaded hub 215 bears on spring 214. Spring 214 is supported on upper support 210. Upper support 210 as shown in FIG. 2B has a smooth opening through which splined hub 208 and jack screw 212 extend. Upper support 210 may include bushing 211 which may comprise metals, plastics, or other suitable materials to provide smooth vertical motion of splined hub 208 and jack screw 212.

Strut 201 may offer benefit in providing similar functions to strut 200 but may be more compact as spring 214 is positioned around jack screw 212 instead of on top of pressure sensor 219. Those skilled in the art will further recognize that a very wide array of embodiments of struts comprising jack screws and motors may be constructed and that some such embodiments may also comprise springs, pliable materials, bearings, bushings, pressure sensors, force sensors, controllers, and other elements.

Strut 200 and strut 201 may take the place of springs in a conventional inner spring mattress or other types of springs used in various embodiments of beds. Strut 200 and strut 201 utilize jack screws and motors along with springs and/or pliable materials to create a bed. Embodiments of struts constructed with pneumatic cylinders, hydraulic cylinders, electrical solenoids, stepper motors, mechanical levers, cables, pulleys, gears, and a wide range of other constructions are possible. Embodiments of struts with motors turning jack screws may also include gears, levers, pivots, bearings, and many other common constructions found in mechanical devices that convert rotational movement of a motor to linear motion that may be applied to raising or lowering a mass or weight.

FIG. 2C shows an embodiment of a strut 203 similar in construction to strut 201 shown in FIG. 2B. Motor 204 is coupled to base support 202 proximate the end from which motor shaft 206 emerges from motor 204. Motor shaft 206 in FIG. 2C is shown extending through base support 202 in FIG. 2C.

Figure 3A:
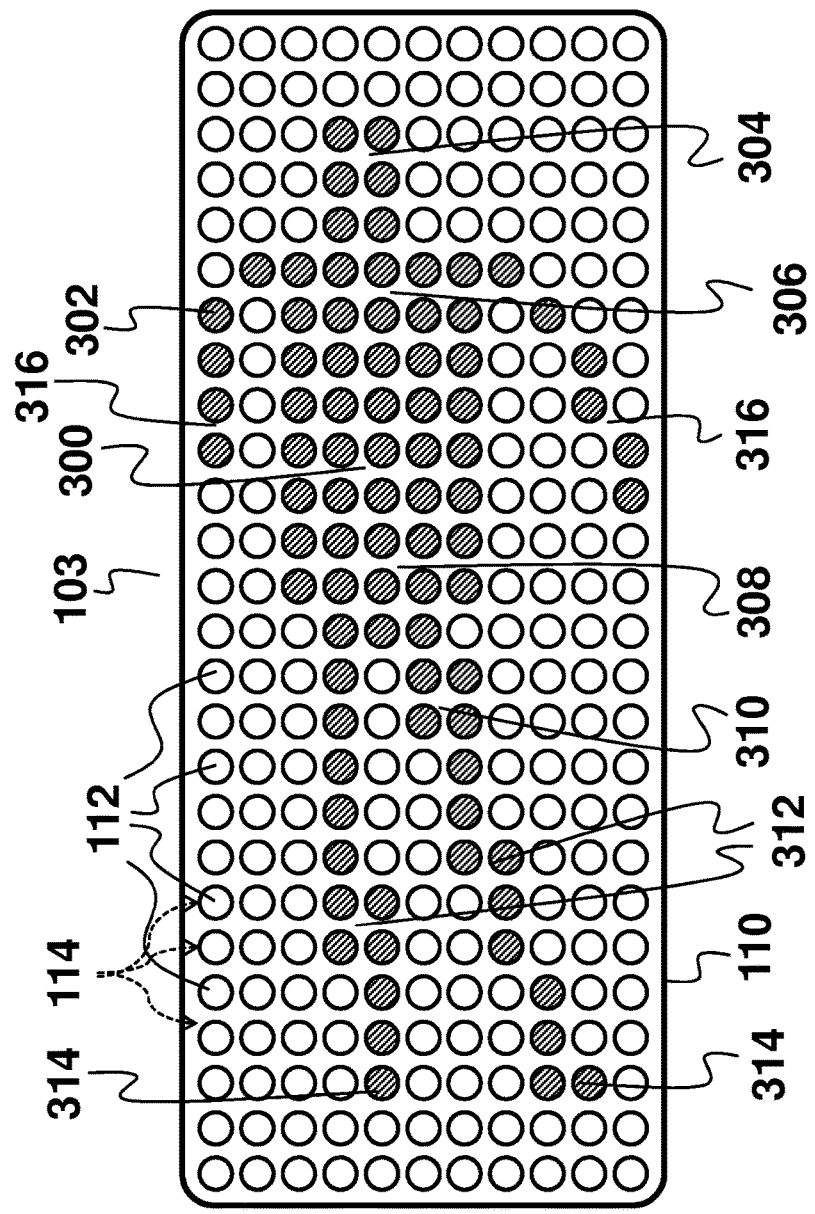
FIG. 3A shows a graphical analytic view of a pressure profile that may be generated from a person lying on one embodiment of a bed according to the present disclosure.

FIG. 3A shows a graphical analytic view of a pressure profile 300 that may be generated from a person 100 lying on their back on bed 103 formed with adjustable struts 114 that are individually sensed to assess the weight or pressure applied to each of them. Pressure profile 300 may be stored graphically and utilized in a computer or controller comprising or connected with bed 103. Individual sensing of struts 114 may involve reading the output of a pressure sensors 219 on each strut 114, monitoring motor current for a motor 204 and computing the pressure on strut 114, taking pressure readings on hydraulic or pneumatic struts, or other techniques that provide an indication of pressure or force on each strut 114. Individual strut caps 112 are shown in FIG. 3A in an array covering the surface of a bed 103 and each such strut cap 112 has a strut 114 below it as indicated in FIGS. 1B-1D. A shaded strut cap 302 in FIG. 3A indicates a strut 114 that has substantial pressure or force applied to it, indicating that something is bearing down on it. The strut caps 112 in FIG. 3A that are not shaded are not bearing a load. Note the image formed from shaded strut caps 302 indicate the head and neck 304, shoulders 306, hips 308, thighs 310, knees 312, feet 314, and arms 316 of person 100. While the pressure profile 300 shown in FIG. 3A includes only shaded strut caps 302 and non-shaded strut caps 112, a pressure profile 300 may also quantitatively measure the pressure or force on each strut and generate a numerical file with sufficient pressure or force resolution in the measurements to allow more detailed analytical analysis. Hence, embodiments where force or pressure is simply quantified as above or below a threshold level, and embodiments in which force or pressure is measured to significant levels of accuracy and resolution, are both possible.

The image formed in FIG. 3A by shaded strut caps 302 may be correlated mathematically with reference images to allow information about the sleeping position and dimensions of person 100 lying on bed 103 to be determined. In some embodiments, an image such as that shown in FIG. 3A may not only indicate whether a given strut 114 is bearing weight, but also quantify the weight applied. Hence, the image of FIG. 3A may allow a computer algorithm executed on a controller or other computer to determine an adjusted sleeping position for person 100 and control the struts 114 of bed 103 accordingly. The algorithm may consider pressure profile 300 shown in FIG. 3A to adjust the level of person's 100 head and neck 304, shoulders 306, hips 308, thighs 310, knees 312, feet 314, arms 316, and other parts of their body to offer a comfortable and healthy sleeping position, including modeling the shape and location of person's 100 spine and then adjusting struts 114 for good orthopedic health. The determined sleeping positioning may also consider pressure applied to various parts of person's 100 body; for example, person 100 may be most comfortable with most of their mid-section weight bearing uniformly over their hips and shoulders, but with some portion of their weight born by their lower and middle back. The distribution of weight may be automatically or manually controlled. For example, some persons 100 may find that they are most comfortable with roughly 50% of their mid-section weight born by their lower and middle back, but other persons that may have issues with back pain may want to lower this amount to only 20%. Hence, a user interface on bed 103 may allow a person 100 to provide information and control how bed 103 may best accommodate their comfort.

Modeling of a person 100 so that bed 103 may be adjusted may consider various aspects of a person's 100 body such as, for example, height, weight, body type, distribution of weight, age, strength level, and other aspects of the person's 100 body. One or more of the foregoing aspects may be measured by sensors positioned throughout bed 103, or may be input through a computer interface, downloaded from the internet, or otherwise provided. Physical modeling algorithms may be applied to estimate the resulting shape and orientation of a person's 100 body due to the impact of a given bed surface shape on the skeletal structure, muscle tissue, and fatty or other soft tissue of a person's body. Computational algorithms such as finite element analysis, solid modeling computer algorithms, and other computer modeling techniques may be used to model the combined structure made up of a person 100, bed covering 118, strut caps 112, struts 114, pillow 104, any springs or other pliable materials or structures that may be present, any flexing or compliance of bed frame 110, and any other structures that may be present in various embodiments of beds 103 (or slat beds 400) so that substantially complete and accurate modeling of sleeping positions, stress on person 100, and other results may be determined. Recursive algorithms or other computer algorithms may be applied to optimize the comfort and/or health of the person 100 by modeling the resulting applied pressure, spinal shape, and other aspects of a person's 100 body position in response to various surface shapes of a bed; and recursively optimizing (or using other optimization methods) bed surface shape to improve overall comfort and/or health. Once a substantially optimized surface shape for a bed has been determined, the bed 103 (or slat bed 400) may provide actual adjustments to implement the shape that was determined. Once the actual bed surface shape is applied (by adjusting struts 114), pressure or force measurements at each strut 114 may be assessed against the previously modeled predictions and further optimizations may be made to converge to a result.

Special comfort or health modes may also be offered in some embodiments wherein certain conditions or preferences may be provided. For example, in the course of pregnancy, the weight and distribution of weight of a woman's body changes. Some embodiments may automatically determine that the bed occupant is a pregnant woman by monitoring changes in her weight, weight distribution, preferred sleeping positions, sleep and wake habits, body temperature, heart rate, breathing, and possibly other factors and may automatically adjust sleeping contours to optimize comfort and health. The controller may be configured to accommodate many possible ways of combining manually input and automatically sensed data, accounting for the health and/or comfort of a bed occupant, and optimizing the surface shape and contours of a bed.

Figure 3B:
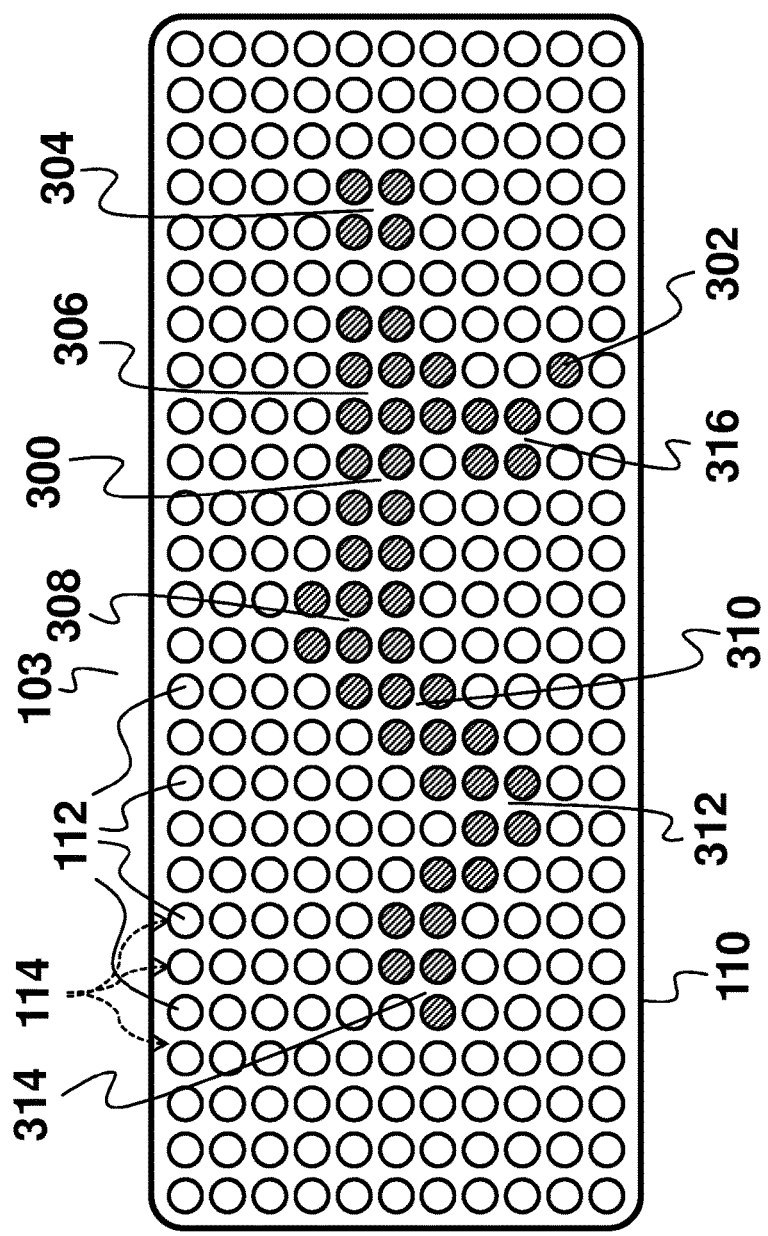
FIG. 3B shows an alternate graphical analytic view of a pressure profile that may be generated from a person lying on one embodiment of a bed according to the present disclosure.

FIG. 3B shows a graphical analytic view of a pressure profile 300 that may be generated from person 100 lying on a bed formed with adjustable struts 114 that are individually sensed. Person 100 is shown positioned on their left side and the adjusted sleeping position and adjustment of struts 114 may be determined according to account for the position of person's head and neck 304, shoulders 306, hips 308, thighs 310, knees 312, feet 314, and arms 316.

To account for various sizes of persons and/or sleeping positions, some embodiments of bed 103 may offer a learning mode that allows bed 103 to generate pressure profiles 300 similar to those of FIGS. 3A and 3B of sleeping positions person 100 may wish to store in a computer controlling bed 103. For such measurements, the struts 114 of bed 103 may be adjusted to produce a substantially flat surface so that an accurate pressure profile may be collected and person 100 may assuming various sleeping positions while pressure profiles 300 are collected. Such a pressure profile may simply note which struts 114 have pressures above some threshold or may measure and store the pressure at each strut 114 quantitatively and with substantial accuracy and resolution. A collection of pressure profiles specific to a given person 100 may be collected for multiple sleeping positions, so that bed 103 may recognize these positions through mathematical correlations, or other relevant analysis techniques, when the person 100 later assumes similar positions while sleeping.

When a sleeping position is determined for bed 103 struts 114 may be adjusted to benefit person's 100 comfort and/or health. However, while a computer or controller comprising bed 103 may apply algorithms believed to offer beneficial health and/or comfort for many persons, some persons 200 may want specific adjustments made to their specific preferences. Accordingly, person 100 may lie on bed 103 and assume different sleeping positions for storage and reference and then may direct bed 103 to adjust to their position automatically. Once bed 103 has adjusted, person 100 may then manually control bed 103, through a user interface. Once person 100 is satisfied with how bed 103 is adjusted, they may command bed 103 to store those adjustments so that they may be utilized again later when person 100 assumes similar positions while sleeping. User interfaces through which a person may control a bed 103 to make adjustments to the shape of the surface of bed 103 may include graphical representations of bed 103, and may possibly also show the surface shape of bed 103, that a person may interact with using a mouse, cursor controls, a touchscreen interface, or other possible computer or electronic display interfaces.

In addition to reacting to the sleeping position of a person 100, some embodiments of bed 103 may provide additional enhancements. For example, struts 114 may move in one or more direction to provide a vibrating, undulating, waving, rocking, or other sensation to person 100. Struts 114 may move up and down rapidly to create a vibrating effect, or may move slowly to compensate as person 100 shifts during sleep. Bed 103 may provide the sensation of a spring mattress, rocking cradle, or other possible effects in which bed 103 senses and "picks up a rhythm" of motion and enhances or sustains that motion in a desirable way. Some embodiments may enhance motion in such a fashion and gradually diminish the enhancement of motion over time if the person 100 stops all motion of their own so that the bed 103 does not sustain motion that person 100 no longer desires.

Bed 103 may also come to know the sleeping habits of person 100 and may anticipate when and how person 100 will move in bed. For example, if bed 103 learns through observation of the habits of a particular person 100 that they roll from one side to the other every 20 minutes during sleep, bed 103 may adjust itself to help the person 100 roll more easily and more comfortably fall back to sleep. For example, bed 103 may flatten some portions of its surface and angle others just before it anticipates that person 100 is ready to roll so that person 100 may roll over more easily. For health reasons, some embodiments of beds 103 may adjust to encourage motion of person 100 in the bed. For example, to avoid bed sores in elderly persons, a bed 103 may encourage a person 100 to roll to a new sleeping position every few hours.

Some persons may make inputs to bed 103 to direct certain aspects of how they will sleep. For example, many persons 100 desire their upper chest and shoulders to be somewhat elevated relative to their hips so that stomach acid does not enter their upper digestive tract. Such persons 100 may also benefit from a slight increase in pressure against their lower back, upper thighs, and possible a slight elevation of the bed 103 surface just below their feet, as these modifications may allow them to maintain their position on bed 103 and avoid sliding over the course of a night to the foot-end of their bed 103. Persons 100 may provide inputs through a user interface connected to and controlling bed 103 to provide inputs on their sleeping preferences and special needs. Other inputs a person 100 may make to a bed 103 user interface might include their height, weight, age, sex, preferred sleeping positions, health factors, whether or not they have back pain, whether they have pain in other parts of their body, and other helpful information that a bed 103 may utilize to benefit them. Such a user interface may be a dedicated control device possibly including a keyboard, buttons, knobs, switches, a display and/or other elements found in electronic interfaces or may be a user interface may be formed with application software running on a cell phone, electronic tablet, computer, watch, or other electronic device that has a wired or wireless interface to bed 103. For example, an application on a personal computing device, such as a cell phone or tablet, may provide a user interface for a bed 103 and connect with computing or controller components of bed 103 using BLUETOOTH® or another wired or wireless interface. Accordingly, person 100 may have their sleeping preferences with them such that if they are travelling, they can input their preferences into a bed having similar capabilities as bed 103. User preferences may also be virtually stored in a cloud or website, etc. Some embodiments of bed 103 may include electronic controls that erase or over-write personal information that may be downloaded to the bed 103 by person 100 after that person has stopped using the bed 103 to protect private information, or after a specified event or lapse of time has occurred.

Pressure profiles 300 as shown in FIGS. 3A and 3B may be collected by monitoring the force or pressure applied to each strut 114 in a bed 103. However, other or additional information regarding sleeping position of person 100 may be collected in other ways; for example, a camera or other monitoring device may be used. Use of conventional optical cameras may not provide a sufficient amount of information or images as certain components of bed 103 may block light and/or images. As such, use of one or more infrared cameras, sonar, radar, heat sensors, or other techniques may be useful in some embodiments to determine sleeping positions. In some embodiments, analysis algorithms utilized in a bed 103 may augment a pressure profile 300 with optical, infrared, sonar, radar, or other information to allow more precise and accurate determination of sleeping positions. Overhead images or images taken from the side from a camera, infrared camera, radar, sonar, or other imaging system from above bed 103 may also be used in some embodiments. For such embodiments, techniques for mounting a camera, infrared camera, radar system, sonar system, or other imaging system above bed 103, either on a frame, ceiling, wall, or other possible mount, may be implemented.

Figure 4:
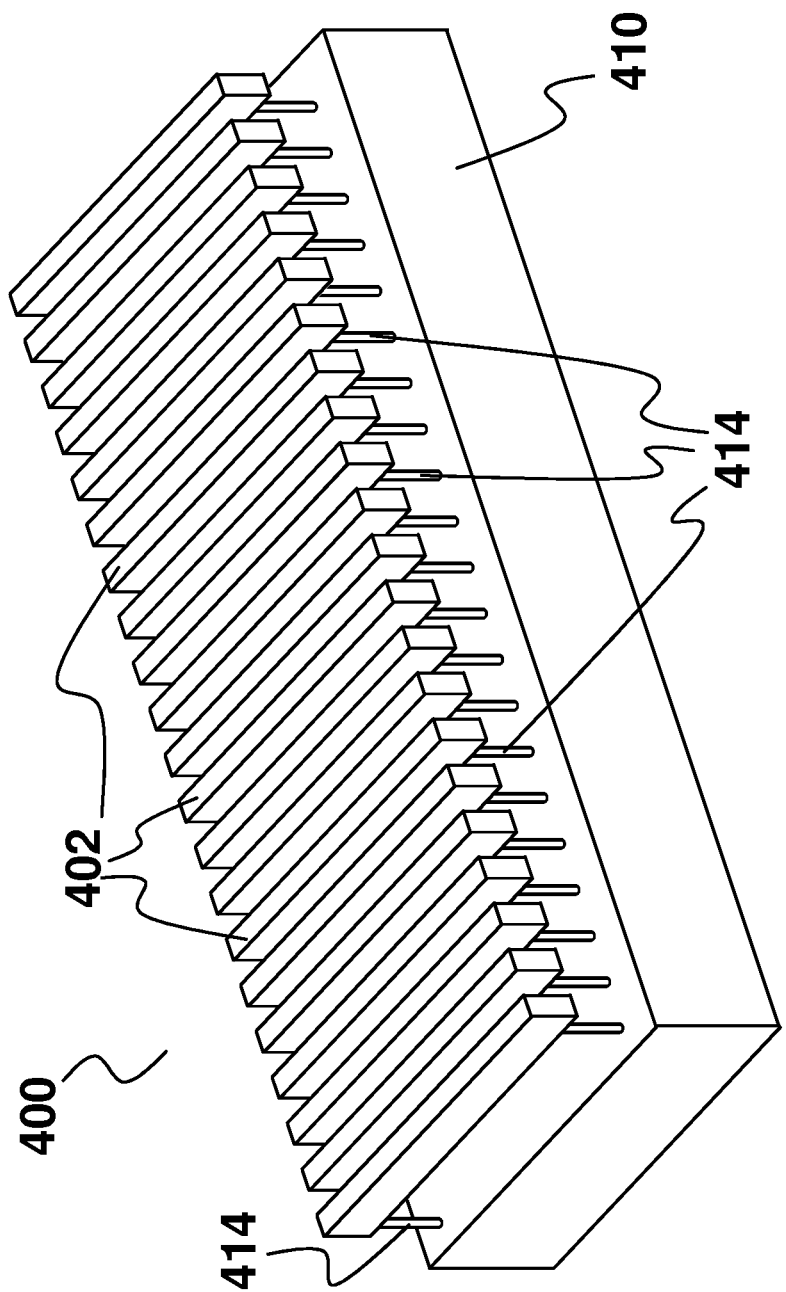
FIG. 4 shows a perspective view of an embodiment of another bed according to the present disclosure comprising lateral slats and adjustable struts.

FIG. 4 shows a perspective view of an embodiment of slat bed 400 comprising lateral slats 402 and adjustable struts 414. Struts 414 may be of similar design to strut 200 shown in FIG. 2A, strut 201 shown in FIG. 2B, strut 203 shown in FIG. 2C, hydraulic struts, pneumatic struts or other types of struts suitable for use in slat bed 400. A base structure for slat bed 400 is provided by bed frame 410 and each slat 402 may be supported by two struts 414, one near to each end of a given slat 402. Slat bed 400 may be adjusted so that person 100 is supported by a contour formed by adjustment of the plurality of slats 402 making up slat bed 400. However, slats 402 extend substantially across the width of slat bed 400 so the ability to provide adjustable contours across the width of slat bed 400 is limited, while providing adjustable contours along the length of slat bed 400 is readily achieved. Some embodiments of slat beds 400 may include a head platform 130 and/or a foot platform 132 in a similar fashion and likewise may comprise bed covering 218 over the slats 402.

Figure 5A:
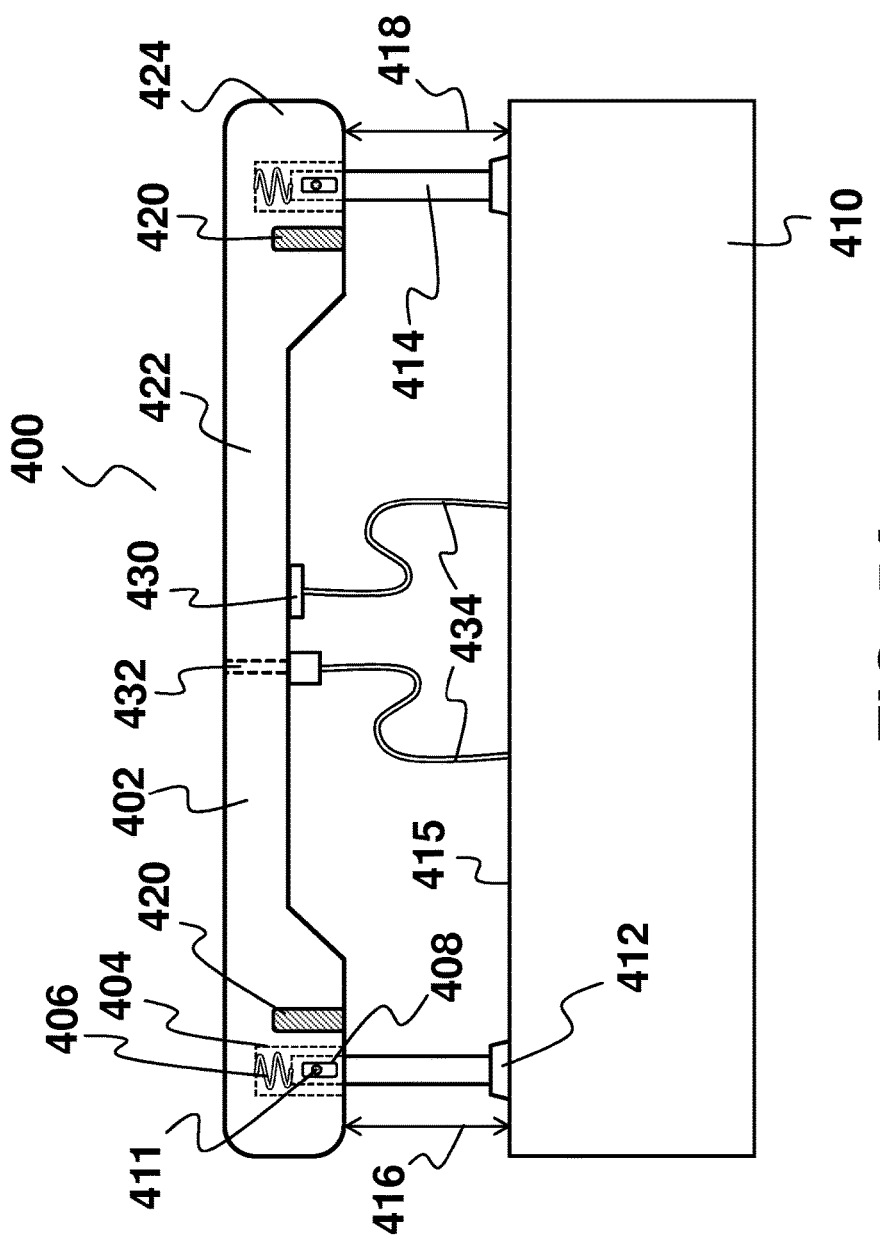
FIG. 5A shows an end view of an embodiment of a slat bed according to the present disclosure.

FIG. 5A shows an end view of slat bed 400. Slat bed 400 comprises a plurality of slats 402, motion sensors 430, temperature sensors 432, lugs 420, springs 406, and bed frame 410. Bed frame 410 has top surface 415 and struts 414 are supported inside bed frame 410. Struts 414 may be supported similarly as described hereinabove in conjunction with FIG. 1B-2C. Struts 414 are shown emerging above the top surface 415 of bed frame 410 from fittings 412. Fittings 412 may be used in some embodiments and may be threaded inserts into top surface 415, may insert into top surface 415 in other ways, or may be simply affixed to top surface 415. Struts 414 as shown in FIG. 5A are not shown with treaded shafts and jack screws 212 as these components may be covered or shrouded as explained hereinabove to avoid an unsightly look, dirt, grease, or otherwise undesirable look or touch and may therefore be covered or shrouded with metal, plastic, rubber, cloth, or other sleeve or shroud. The covering or shroud may be flexible, telescoping, may use a fan-folded construction, or may be otherwise configured so that it may compact and extend accordingly.

Fitting 412 as shown in FIG. 5A may also reduce the likelihood that water or liquids that may be spilled on slat bed 400 and leak into bed frame 410. As bed frame 410 may contain electrical equipment, some embodiments may comprise water impermeable coverings, shrouds, or fittings 412 may be used to avoid the potential for electric shock if liquids are spilled onto a bed such as slat bed 400. Fittings 412 may extend above top surface 415 of bed frame 410 to prevent liquids from pooling near struts 414. In some embodiments, top surface 415 of bed frame 410 may be slanted or otherwise designed so that water or other liquids spilled onto top surface 415 flow from top surface 415 and don't pool there. As top surface 415 may be designed to facilitate air flow, some embodiments of top surface 415 may be configured to repel liquids and also be air permeable. Electrical equipment and/or electronics inside bed frame 410 may be grounded, isolated, insulated, or otherwise protected to minimize the risk of electrical shock. Fuses, circuit breakers, ground fault interrupters, and/or other safety techniques may be applied. The mechanical connections between electric motors, electrical elements, sensors, and other elements with electrical connections inside bed frame 410 may be mounted to struts 414 and/or slats 402 with electrically insulating connections for safety. Slats 402 and shrouds or sleeves covering struts 414 may also be electrically insulated.

Slat 402 as shown in FIG. 5A has a length that is substantially equivalent to the width of bed frame 410 so that the outer dimension of thicker ends 424 are substantially aligned with the outer sides of bed frame 410. Other embodiments of slat beds 400 may make use of slats 402 that are longer than bed frame 410 is wide so that thicker ends 424 extend beyond bed frame 410 on either or both sides of bed frame 410. Still other embodiments may make use of bed frames 410 that are wider than slats 402 are long. Embodiments of slats 402 on slat beds 400 may not be all of the same length so that some slats 402 may extend beyond the sides of bed frame 410, some slats 402 may align with bed frame 410, and still other slats may be shorter than bed frame 410 is wide.

Slat 402 may have a thinned central region 422 that allows slat 402 to be somewhat flexible and pliable to the weight load of a person 100 that may lie on a slat bed 400. Slat 402 may have a thicker end 424 to facilitate connection to struts 414 and to provide a smooth and rounded structure over which a bed covering similar to bed covering 118 or 218 may be applied. Some embodiments of slats 402 may include lugs 420 that allow slats 402 to mechanically couple to adjacent slats 402 and possibly also to a head platform 130, foot platform 132, or other structures that may be found in some embodiments of slat beds 400. As will be shown in FIG. 5C, lugs 420 may simply be features that interlock or interconnect between slats 402 so that stress or motion that may be applied laterally to slats 402 may be absorbed by multiple slats 402 working together via their mechanical linkage through lugs 420 so that the overall capability of slat bed 400 to absorb applied stress is improved. Lateral stress on slats 402 may occur as a person 100 climbs onto slat bed 400, rolls over while sleeping, or moves while they are supported on slat bed 400. Slats 402 and lugs 420 may comprise metals, wood, plastics, nylon, combinations of materials, and/or other suitable materials and may be rectangular, contoured, or other possible shapes suitable for use as a lug 420. In some embodiments, slats 402 may be made of pliable materials that flex when weight is applied to them. In some embodiments, slats 402 may comprise materials that are hollow inside, are ribbed or have other special constructions, or are otherwise formed to provide mechanical benefits and/or reduce the overall weight of slats 402.

Figure 5B:
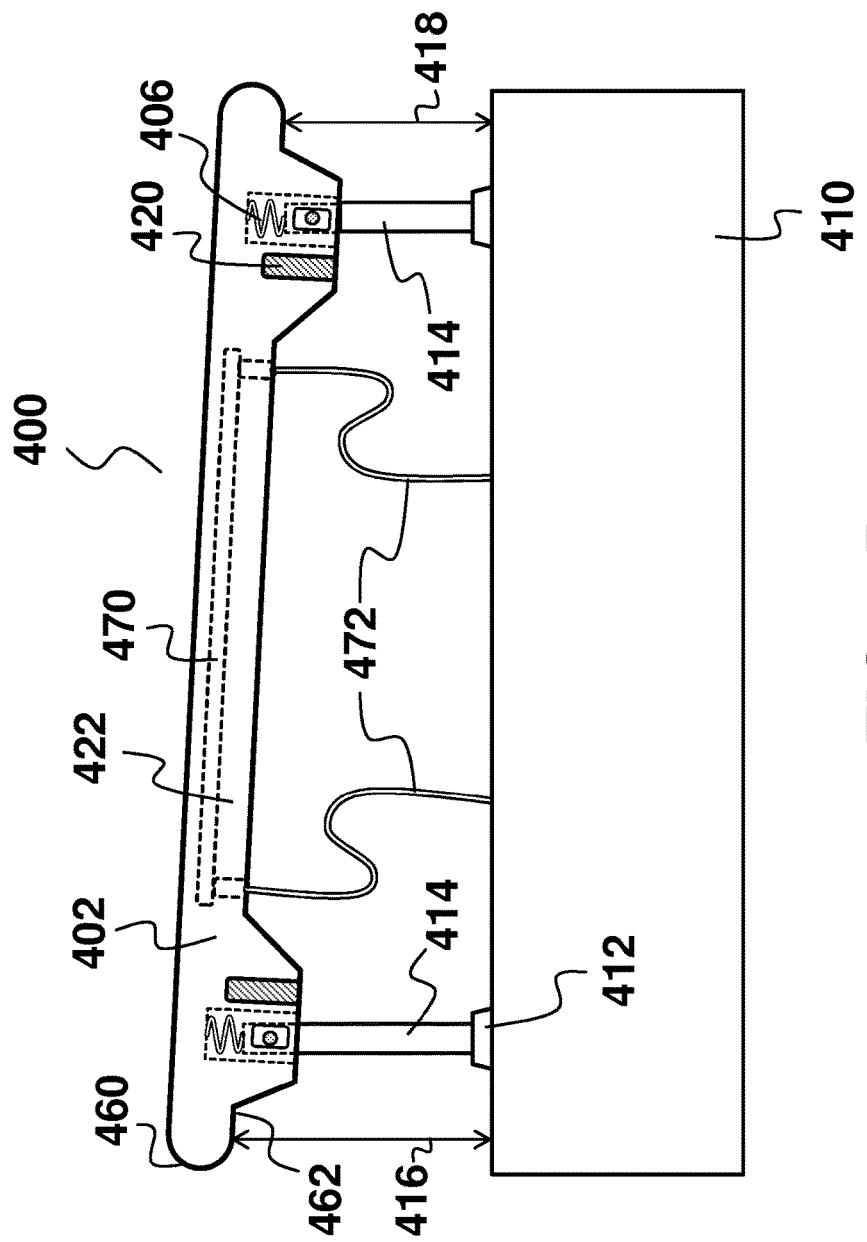
FIG. 5B shows an end view of another embodiment of a slat bed according to the present disclosure.

Struts 414 are connected to slats 402 with pins 411 that may be placed through the upper ends of struts 414 and through slotted holes 408 in slats 402. The upper end of struts 414 may contact springs 406 that may be supported inside coupling holes 404 in slats 402. Springs 406 in slats 402 may take the place of and perform similar functions to springs 214 shown in FIGS. 2A-2C. Slats 402 may flex along central region 422 and may also be pliable due to the presence of spring 406 or the presence of other flexible or pliable materials. Further, a bed covering applied over slats 402 may offer further compliance and comfort to a person 100 laying on slat bed 400. The application of pins 411 inside slotted holes 408 to connect slats 402 to struts 414 in some embodiments may allow springs 406 to be compressed or extended and may also allow sufficient motion between slats 402 and struts 414 so that left slat height 416 and right slat height 408 may be different (this is shown in FIG. 5B and will subsequently explained). Adjustment of struts 414 may allow slats 402 to be positioned so that their top surfaces may not all be parallel. While the connection between slats 402 and struts 414 utilizes pins 411 and slotted holes 408, those skilled in the art will recognize that embodiments utilizing sleeves, bushings, bearings, ball bearings, roller bearings, thrust bearings, ball-joints, alternative fittings, catches, clips, snaps, cams, bolts, nuts, washers, roll pins, inserts, and other mechanical connection techniques are also possible. Likewise, some embodiments of slats 402 may lack springs 406 and struts may be fixedly attached to slats 402 in some embodiments, or may pivot but not provide spring action or compliance. Struts 414 and slats 402 may comprise pliable materials such as plastics, foam rubber, or other pliable materials used in place of springs 406 to create an adjustable mounting of a strut 414 to a slat 402. Embodiments of slats 402 are also possible that include a threaded connection to a jack screw 212 of a strut 414 (in place of using a threaded connection to an upper support 210 as shown in FIGS. 2A-2C) so that as strut 414 is rotated that the jack screw 212 interacts with the threaded connection to the slat 402 so that the slat 402 may be raised or lowered.

A motion sensor 430 may be present in some or all of the slats 402. In some embodiments, motion sensor 430 may be an accelerometer, or other sensor capable of sensing motion of slat 402 so that electronic circuits in slat bed 400 may sense the motion of a person 100 lying on slat bed 400. Motion sensor 430 may be used to sense a heart rate or breathing rate of a person 100 lying on the bed. One or more pressure sensors, such as pressure sensors 219 may monitor pressure on struts 414 and may likewise provide information which may be analyzed to assess heart rate and/or breathing rate of person 100. Bed 400 may further comprise sensors, accelerometers, microphones, and other sensors that may allow the bed to monitor, record, analyze, and provide control to the struts 414, temperature controls, or other available controls based on a person's 100 breathing, heart rate, and other measurements related to the person's health and condition. Some embodiments may record health data and may even signal alarms if certain health conditions occur (such as heart rate conditions that signal the onset of a heart attack, for example). Temperature sensor 432 may measure temperature as close as possible to person 100. The output of temperature sensor 432 may be used to control heaters, coolers, fans, and possibly other elements of some embodiments of slat bed 400. Like bed 103, slat bed 400 may have similar components and capabilities to monitor and adjust temperature at one or more times while person 100 is in slat bed 400.

Control electronics controlling slat bed 400 may receive input from various sensors and be used to determine one or more adjusted positions and thereafter direct and/or control struts 414 to adjust to the one or more adjusted positions. Motion sensor 430 and temperature sensor 432 are connected to electronics inside bed frame 410 by sensor wires 434. In some embodiments, sensor wires 434 or other electrical wires running from slats 402 to bed frame 410 may be bundled together, shrouded, pass through articulating or telescoping conduit, pass through shrouding or conduits that also shroud struts 414, or utilizing other techniques.

Embodiments of slats 402 shown in the present disclosure are rigid or semi-rigid (per above, some embodiments of slats may flex under load) members consistently shown supported by two struts 414. Alternative embodiments of slats are possible that may comprise two or more rigid or semi-rigid members supported by a greater number of struts. For example, if three struts are used, a slat consisting of two rigid or semi-rigid members with a pivot, or other articulating joint connecting them may be supported at both ends by struts and at the pivot or other joint by a third strut. A rigid or semi-rigid single slat may also be supported by three or more struts. For example, an embodiment of a slat bed 400 may be configured for very large or heavy persons and may benefit from slats 402 that are supported by more than two struts each.

FIG. 5B shows an end view of another embodiment of a slat bed 400. Bed 400 comprises an electric heater 470 embedded in slat 402. The view of FIG. 5B shows struts 414 that have been adjusted so that slat 402 is tipped. As shown, left slat height 416 is longer than right slat height 418 so that the top surface of slat 402 is downward to the right. Positioning slats 402 in a tipped position may allow some embodiments of slat beds 400 to provide a rocking or undulating motion that may be desirable for rocking a person 100 to sleep, massaging a person 100 (whether or not they are sleeping), or otherwise providing desirable motion or positioning of the slats 402. For example, some persons 100 may benefit from having their knees slightly lower than their hips while sleeping on their side; or possibly having their arms and hands slightly lower than their head.

Heater 470 is embedded in slat 402 and may be connected electrically to a control circuit, driver, or other source of electric power through heater wires 472. Slat 402 may contain a temperatures sensor so that heater 470 may be controlled to achieve a desired temperature or heater 470 may be controlled in an open loop fashion through direct control by a person 100 lying on slat bed 400. Embodiments of slat bed 400 may utilize slats 402 that all contain heaters or in which only some of the slats 402 in the bed contain heaters. For example, some embodiments of slat bed 400 may only use slats 402 with heaters 470 in the region of slat bed 400 where a person's 100 feet may be present.

The embodiment of slat 402 shown in FIG. 5B provides a thinner slat end 460 versus the thicker ends 424 shown in FIG. 5A. Slat end 460 is rounded so that a bed covering, such as bed covering 218, may be stretched over the slats 402 of slat bed 400 and be fitted with a draw string or elastic band. Some embodiments of bed coverings may also be attached to slat beds 400 with elastic bands that run in parallel to and between slats 402 and pull the lower edges of the bed covering together so that the lower edges of the bed covering are substantially pulled tightly into notched regions 462 by the elastic bands. That is, these elastic bands would attach to a bed covering near the left side notched region 462 and near to the right side notched region 462 shown in FIG. 5B and run in parallel to and between slats 402. Hook and loop fasteners, snaps, pockets, clips, pins, or elastic bands or other techniques may be applied on slat 402 in the notched region 462 where slat end 460 meets the region where struts 414 connect to slats 402. The bed covering may be attached to every slat 402 of a slat bed 400 or may be only attached to a subset of the slats 402 in a slat bed 400.

The embodiment of slat 402 shown in FIG. 5A and the embodiment of slat 402 shown in FIG. 5B both include a thinned central region 422 that may be designed so that slat 402 is flexible and may bend in response to an applied load so that slat 402 may improve comfort. While a uniformly thinned central region 422 is shown in FIGS. 5A and 5B, some embodiments may benefit from a thinned central region 422 that is thinned progressively to be at its thinnest near the center of slat 402 and thicker near the areas where struts 414 connect with slats 402. Other embodiments of slats 402 with non-uniform thickness and that react to weight loads in desirable ways are clearly also possible. While the top surfaces of slats 402 shown in FIGS. 5A and 5B are substantially flat, it is clear that the surface of a slat 402 on which a person would rest may be curved or contoured to better fit the back, side, or other surface of a person's body that may rest on it. Slats 402 may also not all be of uniform shape and some embodiments of slat beds 400 may utilize slats 402 optimized for back support in the region of a slat bed 400 where a person's back may normally lie and slats optimized for support of other portions of a person's body where those portions may normally lie. Slats 402 may be designed to be substantially easy to remove and install so that they may be interchanged, replaced, or removed to customize slat size and configuration according to person's 100 preferences or body type. Embodiments of slats 402 may be designed to be rigid, to be flexible, to flex different amounts in response to applied weight, to have hollowed out sections to control flexing, to incorporate combinations of materials to control flexing, to be of different shapes so they flex in desirable ways, to have differently contoured top surfaces, to have top surfaces that include bumps, ridges, or other features to provide a massaging action, to have top surfaces that are padded or pliable, to incorporate springs of various levels of stiffness, or to be otherwise tailored to provide beneficial effect for a person utilizing slat bed 400.

FIG. 5C shows a top view of an embodiment of slats 402 illustrating operation of interlocking lugs 420, internal stabilizers 426, and external stabilizers 428. As shown in FIG. 5C, lugs 420 may be affixed to slats 402 in a configuration so they interlock. Lugs 420 may be configured in various shapes, including, but not limited to trapezoids, dove-tailed, round, or other possible cross-sections. Referring to FIGS. 5A and 5B, the mechanical size of lugs 420 may limit the range of motion over which slats 402 may move upwards and downwards (due to adjustment of struts 414 or compression of spring 406) while lugs 420 interlock adjacent slats 402. In some embodiments, the vertical height between adjacent slats 402 may also be limited with mechanical stops, computer control algorithms, or through other techniques for safety reasons, so that hands, feet, or other body parts may not extend over one slat 402 and under an adjacent slat 402 in the course of utilizing a slat bed 400. The spaces between lugs 420 and between lugs 420 and slats 402 may contain nylon, felt, fabric, plastic spacers, pliable materials, or other bushing material to allow lugs 420 to interlock smoothly while slats 402 are raised or lowered (when struts 414 are adjusted). Lugs 420 may provide benefit to some embodiments in interconnecting slats 402 so that stress applied to them is absorbed by multiple slats 402 and struts 414. Lugs 420 may also be used to interconnect slats 402 to head platforms 130 and/or foot platforms 132. Those skilled in the art will recognize that alternative mechanical techniques to interconnect slats 402 besides the use of lugs 420 are possible. For example, slats 402 may include interconnecting members to adjacent slats 402; slats 402 may be buffered from each other with felt, rubber bumpers, or other pliable elements; slats 402 may be coupled with layers or webbings of nylon, plastics, metals, canvas, fabrics, or other materials affixed to their top or bottom surfaces; or other techniques may be applied. In some embodiments, a bed covering similar to bed covering 218 may be affixed to a bed 103 or slat bed 400 in a manner so that the physical properties of the bed covering couples slats 402 together. For example, if the bed covering is affixed to slats 402 with hook and loop fasteners affixed to the top of slats 402 and the underside of the bed covering, the hook and loop fasteners connection may serve to couple slats 402 together and provide a strengthening effect as the slats 402 may bear lateral force applied to them acting together. Some embodiments of slat bed 400 may utilize canvas, nylon webbing, or other materials to bind only a limited number of the endmost slats 402 on slat bed 400 together. Individual struts 414 in bed 103 may also be bound together through the use of meshes, canvas, or the application of bed coverings affixed to struts 414 so that the struts 414 may act together robustly in the face of laterally applied stress.

As slats 402 are raised, lowered, and possibly tipped, it is possible in some embodiments for lugs 420 to compress against each other and to possible bind or interfere in an undesirable way. Accordingly, applying a control algorithm for the adjustment of struts 414 to first level slats 402 may prevent or reduce binding or compression between lugs 420. Slats 402 may then be raised or lowered as desired, and then slats 402 that are desired to be tipped may again be tipped into their desired positions. Slats 402 may be substantially relieved of binding due to tipping (by leveling them as an initial step), adjusted vertically, and then tipped back into place in a recursive manner as slats 402 are adjusted over time in the course of operation of a slat bed 400. Some embodiments of lugs 420 may employ mating surfaces that are slightly rounded or contoured, larger gaps between lugs 420 that may also include thicker applications of pliable or bushing materials, larger gaps between lugs 420 and slats 402 that may also include thicker applications of pliable or bushing materials, or other features, finishes, designs, or construction that substantially reduce binding between lugs 420 as slats 402 are adjusted in position.

Internal stabilizers 426 may be a board, member, or other structure that is secured to bed frame 410 and extend upwards between slats 402 so that the structure of internal stabilizer 426 engages lugs 420 so that horizontal motion of slats 402 is substantially stabilized. Lugs 420 and slats 402 may slide over the surfaces of internal stabilizers 426 so that vertical motion of slats 402 and lugs 420 is not blocked, but lateral or horizontal motion of lugs 420 and slats 402 is stabilized. Internal stabilizers 426 may be utilized between every pair of slats 402 in some embodiments, may not be present at all in some embodiments, or may only be present between some pairs of slats 402. Internal stabilizers 426 may comprise wood, plastics, metals, and other possible materials and may be laminated, coated, or treated with coverings of felt, plastics, lubricants, or other materials to benefit smooth engagement and sliding against lugs 420 and slats 402. In some embodiments, internal stabilizers 426 may be sized and shaped for minimum impediment to lateral motion of the lugs against the ends of internal stabilizers 426 or may be sized and shaped so they only impede lateral motion of the slats 402 against the sides of internal stabilizers.

External stabilizers 428 perform a similar function to internal stabilizers 426, but are simply mounted to bed frame 410 and positioned so they act on the outside of lugs 420 versus between lugs 420 as was the case for internal stabilizers 426. Those skilled in the art will recognize a very wide range of possible constructions for additional stabilizers that may be formed with levers, connecting members, sliding members and other possible constructions to stabilize lateral or horizontal motion of slats 402 in a slat bed 400.

Lugs 420, internal stabilizers 426, external stabilizers 428 and other possible structures that may interface with each other as a slat bed 400 is adjusted may result in rattles, noise, and other effects if they do not fit well together. Some embodiments of slat bed 400, may employ shims, adjustable fittings, spring loaded gliders, spring loaded plates, hydraulic cylinders, pneumatic cylinders, pliable materials, or other possible techniques between slats 402, lugs 420, internal stabilizers 426, external stabilizers 428, and other associated structures to improve fit and substantially avoid rattles, noise, vibrations, or other possibly undesirable effects.

FIG. 5D shows an end view of an embodiment of lugs 420 and slats 420 having rounded corners 440. Rounded corners 440 may reduce pressure from sharp corners that may protrude over the course of a contour adjusted to fit a given person 100 and accordingly improve comfort. Internal stabilizer 426 and external stabilizer 428 are shown mounted to a portion of bed frame 410 and extend upwards between pairs of slats 402. In most embodiments, the top surface of internal stabilizers 426 and external stabilizers 428 may be kept somewhat below the top surface of slats 402 so that the sleeping surface is determined by slats 402 and not by stabilizers protruding between them. In some embodiments, internal stabilizers 426, external stabilizers 428, and other possible stabilizer embodiments may be telescoping, employ levers attached to slats 402, or may use other constructions so they may engage slats 402 and/or lugs 420 over a wider vertical range of motion of slats 402 without extending above slats 402.

FIG. 5E is an end view showing lugs 420 and slats 420 having a mushroom shaped top surface 442. Slats 402 having mushroom shaped top surfaces 442 or other rounded and extended top surfaces may further improve comfort in the fashion of rounded corners 440. Some slats 402 may also use top surfaces that are padded, coated with rubber, covered with layers of leather, canvas, or other materials, or are otherwise covered, coated, or laminated with materials or combinations of materials to improve comfort or provide other benefits. The extension of mushroom shaped top surfaces 442 to slats 402 may reduce the amount of air flow that is possible through slats 402. In response, some embodiments of slats may be perforated, or mushroom shaped top surface 442 may be formed from a mesh of metal, a plastic mesh, materials that allow air to flow through them, or other materials or configurations to benefit the free flow of air. Also, some embodiments of slats 402 may utilize one or more different formations and combinations of top surfaces. For example, mushroom shaped top surfaces 442 may only be utilized along some portion of the length of a slat 402 and other shapes or constructions may be utilized along other portions of the length of slat 402.

FIG. 5F shows an end view of lugs 420 and slats 402 having a pliable top member 444. Pliable top member 444 may be formed from rubber, plastics, wood, metals, laminated materials, or other suitable materials and may be formed in manufacturing with slat 402 or may be bonded, glued, riveted, screwed, nailed, or otherwise affixed to slat 402. In some embodiments, slats 402 may have a reduced width 446 along their top surface so that pliable top members 444 may flex more freely. Pliable top member 444 may allow slats 402 of different heights to form a smoothly flowing contour to fit a person 100 and avoid the protrusion of sharp edges that may cause discomfort. Pliable top member 444 may be perforated, formed from a mesh or grid of material, or otherwise formed or configured to allow the free flow of air. Pliable top members 444 in FIG. 5F are shown almost touching the pliable top members 444 of adjacent slats 402. In some embodiments, pliable top members 444 may actually extend over complaint top members 444 of adjacent slats 402 and overlap (or interlock). Those skilled in the art will recognize many possible embodiments.

Figure 5G:
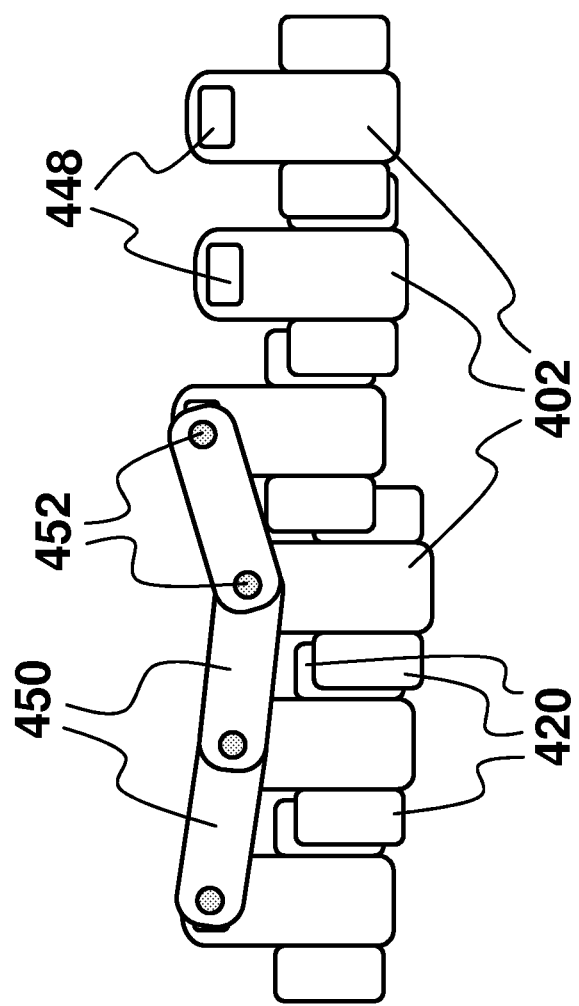
FIG. 5G shows an end view of still another embodiment of slats and lugs according to the present disclosure.

FIG. 5G shows an end view of slats 402 and lugs 420 wherein slats 402 are interconnected by interlocking members 450 secured to slats 402 with pins 452 through slotted holes 448. The two right-most slats 402 shown in FIG. 5G do not have interlocking members 450 shown attached on them so that the nature of slotted holes 448 may be shown. Those skilled in the art will recognize that many common mechanical constructions such as roll chains, bulldozer tracks, military tank tracks, and other constructions allow stiff members to be interconnected to form a mechanical device or element that may be fitted to a contour. Such constructions may be adapted to the interconnection of slats 402. Interlocking members 450 may be applied at regular intervals over the length of slats 402 to benefit comfort. It is also possible to laminate or otherwise affix nylon or plastic meshes, fabrics, nylon webbing, webs made from other suitable materials, canvas, or layers of other suitable materials over all or limited parts of the top surfaces of the slats 402 forming a slat bed 400 to benefit the ability to generate smooth contoured surfaces. While lugs 420 are shown in FIG. 5G, interlocking members 450, interconnected links, or similar techniques may provide sufficient transfer of stress between slats 402, so that lugs 420 are not needed for some embodiments.

FIG. 5H shows an end view of slats 402 and lugs 420 wherein slats 402 include features such as holes 464 that allow pins 462 to connect top pieces 460 in such a way that top pieces 460 may pivot around pins 462 and holes 464. The two right-most slats 402 in FIG. 5H don't have top pieces 460 attached to them so that the nature of holes 464 may be shown. Top pieces 460 may couple to slats 402 with pins 462 that extend the full length of slats 402 in the manner of a long hinge, so that pins 462 alternately couple to top pieces 460 and slats 402 in intervals along the length of slat 402. Top pieces 460 may interlock with slats 402, couple through channels in top pieces 460 that pivot over a fulcrum formed along the top of slats 402, or may be formed and adjoined through other possible techniques that allow a top piece 460 to pivot on a slat 402. Pivoting top pieces 460 may have their range of pivoting limited by mechanical features on top pieces 460 and/or slats 402 and such limited range of pivoting may be limited in a way that provides some cushioning with felt, rubber, springs, or other techniques to provide a cushioned or pliable limit to pivoting motion of top pieces 460. Top pieces 460 may be attached to slats 402 with pins 462 as shown in FIG. 5H, or in various embodiments they be attached with pins, clips, tied with string, tied with plastic ties, hook and loop fasteners, snaps, interlocking features, other possible connections, or they may simply rest on the tops of slats 402 without being securely adjoined. Top pieces 460 may be formed from wood, plastic, pliable materials, rubber, metals, or other suitable materials, and may include ventilation holes to facilitate air flow. Alternative embodiments may utilize pliable connections or other possible constructions between top pieces 460 and slats 402 so that top pieces 460 may rock, tilt, or pivot on top of slats 402. Those skilled in the art will recognize many ways for top pieces 460 to be affixed or mated to slats 402 including canvas or fabric hinges, metal hinges, pliable mountings, or other possible constructions. Top pieces 460 may support and align with a bed covering such that the bed covering pressing against top pieces 460 may serve to cause top pieces 460 to pivot so that they freely aligned to the contour of the bed covering. In some embodiments, a mix of rigidly fixed and pivoting top pieces 460 may be used as some regions of a slat bed 400 may normally have a flatter surface and other regions may have more significant contours. Additionally, there may be some regions of a slat bed 400, such as the slats nearest to a foot platform 132 or head platform 130, where slats 402 may not have top sections 460 that tilt or pivot in some embodiments.

Figure 5I:
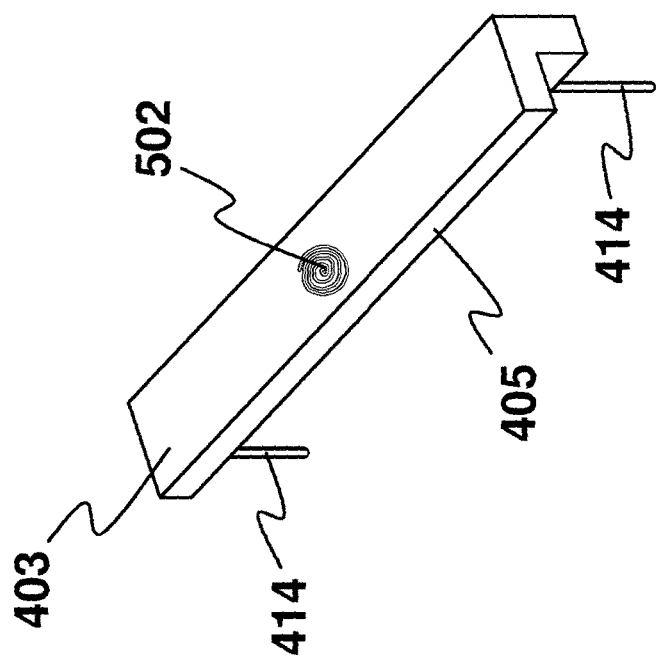
FIG. 5I shows a perspective view of an embodiment of an end slat that may be suitable for use as an end-most slat in a slat bed according to the present disclosure.

FIG. 5I shows a perspective view of an embodiment of an end slat 403 that may be used in slat bed 400. End slat 403 may be used at one or both ends of bed 400. End slat 403 includes extension 405 that provides an extended surface over which a bed covering 218 may be affixed. Those skilled in the art will recognize that an extension 405 or other suitable feature on the end-most slats of a slat bed 400 may include special shapes, features, hooks, clips, snaps, hook and loop fasteners, or other features so that a bed covering may be more easily applied to slat bed 400. End slat 403 may comprise square edges and corners, or may also comprise additional shapes and corners that are rounded or contoured. In some embodiments, end slat 403 may be designed to be stronger or stiffer than other slats 402 as end slat 403 may need to withstand more lateral forces applied to it in the operation and use of a bed. In some embodiments, struts 414 utilized to support an end-most slat of a slat bed, such as end slat 403, may be of stronger or more robust design than other struts in a slat bed 400. In some embodiments, end slats 403 or other end-most slats 402 of a slat bed 400 may be supported by more struts 414 than other slats 402 so that the end slat 403 or other end-most slat 402 is stronger and more robust. In some embodiments, struts 414 supporting slats 402, end-most slats 402, or end slats 403 may be designed and constructed to be flexible in nature so that they may bend somewhat due to applied lateral forces and spring back into position when such lateral forces are removed. In some embodiments, end slats 403 may be rigidly fixed in place or may be manually adjustable in height so that such end slats 403 may be strong and robust without the need for stronger or additional struts 414.

Some embodiments may comprise an identification sensor 502 to determine the presence and properties of a bed covering. For some such embodiments, if no bed covering is sensed, the slat bed 400 may keep the struts 414 in either a nominally safe position or keep struts 414 in their currently present positions as a matter of safety. Identification sensor 502 is shown as a spiral of wire that may be electrically driven and sensed so that a corresponding identification tag that may be sewn, glued, embedded, clipped, or otherwise affixed onto or into a bed covering may be electronically sensed and read by electronics controlling and sensing identification sensor 502. Those skilled in the art will recognize that many commonly used RFID tags are inductively driven and sensed and that an appropriately designed inductive spiral or coil of wire such as identification sensor 502 may be used to both stimulate and sense an RFID tag in or on a bed covering. Identification sensor 502 may be exposed as illustrated, or covered with a protective covering, embedded inside end slat 403, or otherwise protected, encased, or enclosed.

Some embodiments of identification sensor 502 and associated RFID tags may be positioned proximate sensor 502 and tag for placement of identification sensor 502 on a slat such as end slat 403, and the placement of an RFID tag in or on bed covering may need to be controlled. In other embodiments, precise alignment or close proximity may not be required and identification sensor 502 may be placed in other locations. Those skilled in the art will recognize that some embodiments of RFID tags may be designed so they are fully enclosed in plastics or other materials so that they may withstand normal use, laundering, submersion in water, and other conditions that a bed covering may be subjected to. An RFID system or other suitable electronic identification system for a bed covering may provide information on the thickness, stiffness, compliance, physical modeling parameters, heat insulation properties, air flow properties, and other properties that a bed 103 or slat bed 400 may utilize to benefit various aspects of the use of such a bed 103 or slat bed 400. It is possible to utilize other electronic tags or identification techniques besides RFID such as resonant circuits, optical tag readers and tags, ultrasonically coupled readers and tags, infrared light tags and readers, and any other suitable electrical, optical, mechanical, or other suitable scheme in which information regarding the properties of a bed covering may be determined by a bed 103 or slat bed 400. Some embodiments of beds 103 or slat beds 400 may be capable of measuring information from multiple layers of bed coverings 218 so that the effects of multiple layers of bed coverings 218 applied to a bed 103 or slat bed 400 may be accounted for in bed shape modeling, or for other purposes. Some embodiments of beds 103 or slat beds 400 may also sense the presence and/or properties of pillows or other additional bedding elements and model their effects based on information received about them. For pillows and other bedding elements, some embodiments of beds may additionally include sensors, imagers, or other techniques so that the location and/or orientation of a pillow or other bedding element may be determined and also accounted for in computerized modeling or other uses of such information. Some embodiments of beds may also send a signal, illuminate a warning light, or otherwise provide an audible, visible, or other indication that a bed covering 218 is not detected to be properly installed on the bed.

Figure 6A:
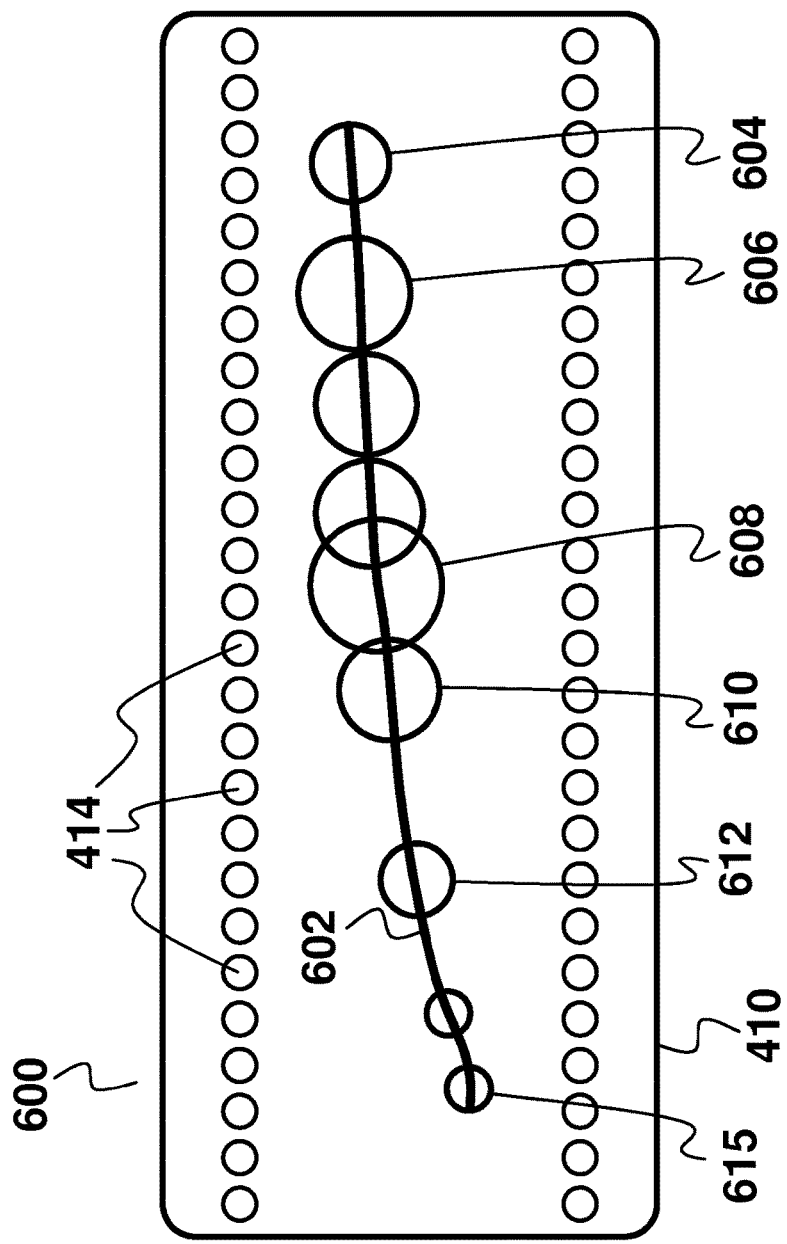
FIG. 6A shows a graphical analytic view of a pressure profile that may be generated from a person lying on a bed formed with adjustable struts connected to slats according to the present disclosure.

FIG. 6A shows a graphical analytic view of a pressure profile 600 that may be generated from a person lying on a slat bed 400 formed with adjustable struts 414 connected to slats 402. Pressure profile 600 may be stored graphically and utilized in a computer that is part of the control electronics of a slat bed 400 or the information substantially provided in FIG. 6A may be referenced in the form of tables of numbers, arrays of numbers, analytical relationships, and other possible analytic, tabular, or graphical constructions of information. As explained previously, the pressure due to weight applied to a bed may be monitored at each strut 414 either with sensors, such as pressure sensor 219 shown in FIGS. 2A-2C, or by monitoring the motion of and current supplied to a motor, such as motor 204 shown in FIGS. 2A-2C, so that the motor torque output may be computed and utilized to determine the weight applied to a strut 414. The pressure profile 600 of FIG. 6A is similar to the pressure profile 300 shown in FIG. 3A, however, in FIG. 6A only two pressure or force measurements are available for each slat 402 of a slat bed 400. So in FIG. 6A, information on pressure or force applied to slat bed 400 is limited to knowledge of the pressure or force at each strut 414 as shown in FIG. 6A and the knowledge that struts 414 are each connected to slats 402 extending across slat bed 400. Weight center line 602 may be computed for each pair of struts 414 opposite each other on the top and bottom of the view in FIG. 6A. As each slat 402 is supported by two struts 414, and considering the load on each slat 402 as an equivalent point load at some point along the length of the slat 402, with knowledge of the pressure or force applied to each strut 414 and the dimensions and geometry of the struts 414 and slat 402, it is possible to compute a point on the slat 402 at which the equivalent point load is applied. Interpolation, spline fitting, or other suitable mathematical curve fitting of these equivalent point loads for each slat 402 in a slat bed 400 allows weight center line 602 to be generated. Additionally, the total weight applied to a slat 402 may be computed as the sum of the weight born by each strut 414 as evidenced by the pressure or force applied to each strut 414, so both the location and the amount of an equivalent point load on each slat 402 may be computed. Weight center line 602 provides the locations of the equivalent point loads and the circles along weight center line 602 represent the weight applied to those equivalent point load locations, with the diameter of each circle corresponding to the weight applied. The leftmost circle in FIG. 6A corresponds to the weight of the feet 615 of person 100. The right-most circle in FIG. 6A corresponds to the weight of the head 604 of a person 100 lying on slat bed 400. In between, there are circles corresponding the knees 612, upper thighs 610, hips 608, shoulders 606, and some additional locations that have not been numbered as they are not specifically needed in the description provided here. In some embodiments, all or only a portion of the struts 414 may be monitored for pressure or force and so some embodiments may use more or less information to compute weight center line 602 and the circle sizes corresponding to the weight loads on each slat 402.

Providing both a weight center line 602 and information on the total weight load along the weight center line 602 may help determine sleeping position. For example, the pressure profile 600 shown in FIG. 6A may be similar for a person 100 sleeping either on their back or their stomach. However, persons sleeping on their backs normally press more strongly on their upper back, hips, and feet; while persons sleeping on their front side normally press more strongly on their stomachs, knees, and chest. Hence, while analysis of weight center line 602 alone may not allow a person sleeping on their back or front to be distinguished, analysis of weight load along weight center line 602 may allow a front sleeper or a back sleeper to be determined. Some embodiments of slat beds 400 may also measure the weight distribution of a person 100 lying on the bed while measurements are recording in known sleeping positions that may later be reference and analyzed so that a given pressure profile 600 may more accurately indicate sleeping position. Note that the pressure profiles shown in FIGS. 6A-6C do not take into account, or specify pressure at or on head platforms 130 and/or foot platforms 132, but some embodiments of pressure profiles may do so.

Figure 6B:
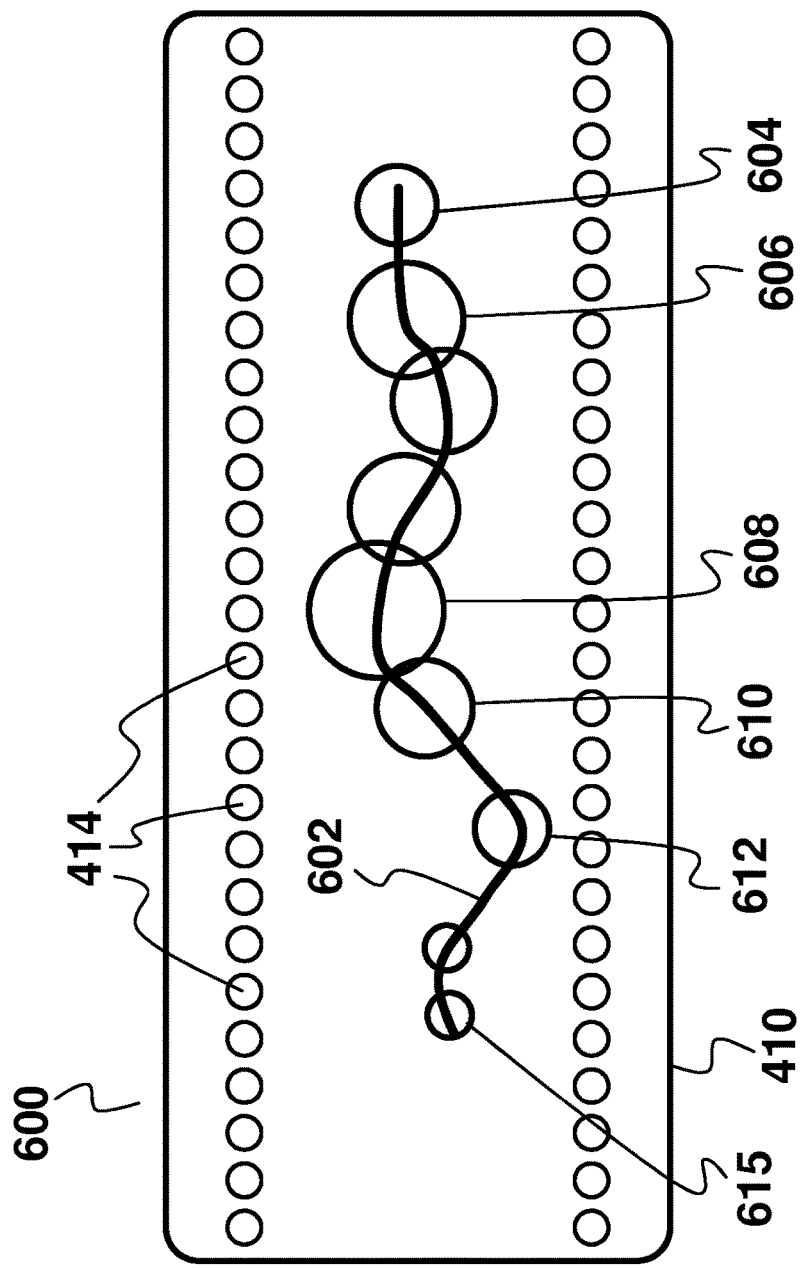
FIG. 6B shows an alternate graphical analytic view of a pressure profile that may be generated from a person lying on a bed formed with adjustable struts connected to slats according to the present disclosure.

FIG. 6B shows a graphical analytic view of a pressure profile 600 that may be generated from person 100 lying on a slat bed 400 formed with adjustable struts 414 connected to slats 402. The view of FIG. 6B corresponds to a person 100 lying on their left side. Weight center line 602 as shown in FIG. 6B is for a person 100 lying on their left side and with corresponding circles corresponding to the weight of the feet 615, knees 612, upper thighs 610, hips 608, shoulders 606, and head 604 provides an analytic pressure profile 600 that is distinct from and discernable from the corresponding pressure profile 600 shown in FIG. 6A. A computing device comprising bed 400 may utilize information regarding the pressure or weight applied to some or all of the struts 414 in a slat bed 400 and may determine information regarding the height, weight, weight distribution, sleeping position, and other factors regarding a person 100 sleeping in a slat bed 400. Algorithms used for such an analysis may include correlations of a weight center line 602, correlations including distribution and amount of weight of equivalent point loads along such a weight center line 602, the shape of a weight center line 602, and other factors. In some embodiments, knowledge of information collected through a computer interface, analysis of the pressure applied to struts 414, and/or other information that may be available may allow a bed 103 or slat bed 400 to identify a person 100 lying in the bed. Hence, for situations where more than one person may sleep in a given bed on different occasions, it may be possible to identify which person is present and to control the bed to their preferences, sleeping patterns, and possibly other factors. As previously mentioned, heart rate, breathing rate, and possibly other health factors may also be assessed from pressure sensors, motion sensors, analysis of the pressure on struts 414, microphones, or possibly other sensors that may be present in some embodiments of beds 103 or slat beds 400. Personal characteristics such as heart rate, breathing rate, and other factors that may be measured by a bed 103 or slat bed 400 may also be used to help identify the occupant of the bed.

As shown in FIG. 6B, slightly elevating the ends of the slats 402 behind person's 100 back may allow them to roll back just slightly and take some of their weight off their ribs and stomach. Such an adjustment may be uniformly applied along person's 100 back or a somewhat larger adjustment may be made near the small of person's 100 back to further enhance support and comfort. Slightly elevating the ends of slats 402 below the hips 608 (and behind the thighs 610) and slightly lowering the ends of slats 402 in front of the thighs 610 may shift some pressure to the backs of person's 100 thighs and buttocks and off their pelvic and thigh bones. Other adjusted sleeping positions may be configured or determined based on medical information and additional information available to computing device and/or controller.

Some embodiments of beds 103 and slat beds 400 may be connected with to the internet, WiFi, Local Area Networks (LAN), Wide Area Networks (WAN), wired networks, wireless networks, and other possible networks and interfaces. Access to computer networks may also allow some embodiments of slat beds 400 to report the need for maintenance, report operational issues, download upgrades, download updates, upload and download user information, and to otherwise exchange information and benefit from access to a computer network.

When two or more persons may occupy or attempt to occupy a bed 103 or slat bed 400, rather complex and difficult to analyze pressure profile 600 may result, especially when the two or more persons are moving or changing positions. Bed 103 or slat bed 400 may also be configured to a person having special physical needs, such as disability, injury, or sleeping in a very unconventional position. Accordingly, bed 103 or slat bed 400 may be configured for only manual position adjustment wherein the person or person's care giver may manually input an adjusted position of the bed. In some embodiments, it may also be possible for a bed 103 or slat bed 400 to discern that two persons are in the bed and to determine to adjust the bed for one of them only. For example, if a child is determined to be sleeping with an adult, the bed may determine to adjust the bed for the adult with the understanding that a small child is lighter and more limber and may be less sensitive to the contour of the bed surface. It is also possible for embodiments of a bed 103 or slat bed 400 to mimic a conventional spring mattress (which may also be useful if the sleeping position of a bed occupant can't be determined). For example, if a bed 103 or slat bed 400 makes adjustments so that the force on each strut 414 or slat 402 is a function of how far that strut 414 or slat 402 is below the height of the highest struts 414 or slats 402, the effect of the spring constant of a conventional bed spring will be substantially replicated, so that similar sleeping positions to those of a conventional spring mattress may be realized. In some such embodiments, adjustments may be possible for a bed occupant to select softer or firmer bed. Some embodiments of beds 103 or slat beds 400 may include modes in which they mimic the response, shape, and/or sleeping contour of beds constructed from memory foam, viscoelastic foam, springs, combinations of materials or other materials; or that mimic the response, shape, and/or sleeping contours of water beds, air mattress beds, or other types of beds.

FIG. 6C shows an analytic view of a pressure profile 600 that may be generated from a person 100 lying on a slat bed 400 formed with adjustable struts 414 connected to slats 402. The view of FIG. 6C corresponds to a person lying on their left side. Like numbered elements in FIG. 6C provide similar functions to those so numbered in FIGS. 6A and 6B. The view of FIG. 6C further shows the locations of four continuously sensed struts 622. In some embodiments of beds 103 and slat beds 400, the pressure or force applied to all struts 414 may not be continuously monitored to conserve power, or in the case of embodiments where motor 204 motion and current level is monitored to determine applied torque, it may not be beneficial to continuously drive struts 414 up and down to assess applied load (as this could disturb a person sleeping in the bed). Accordingly, some embodiments of beds 103 or slat beds 400 may comprise a number of sensors applied to struts 414, or possibly to other locations such as motion sensor 430 as shown in FIG. 5A, that are monitored substantially continuously so that motion (or other factors including heart rate, breathing, etc.) of a person or persons in the bed may be monitored. Continuously sensed struts 622 may be a part of a plurality of continuously monitored sensors for such embodiments. In some embodiments, continuously sensed struts 622 may be deployed in the region of a bed near to where a person's hips, midsection, or shoulders may be present as greater motion and more easily sensed signals may occur in such locations of a bed. Some embodiments may include a greater number of struts 414 that may be continuously sensed so that the locations of continuously sensed struts 622 may be adaptive to a person or a sleeping position of a person in a bed. In some embodiments of beds 103 or slat beds 400, additional sensors may be monitored in situations where movement, changes in distribution of weight, or other indications are made through monitoring continuously sensed struts 622 or other continuously monitored sensors. That is, analysis of sensors or struts 414 that are continuously monitored may trigger broader analysis of sensors, motor torque, and other factors when suitable conditions are determined through analysis of the continuously monitored sensors or struts 414.

Accelerometers, motion sensors, pressure sensors, and other sensors may also be used in bed 103 or slat bed 400 to sense commands or signals from a person 100 lying in the bed. Signal sensed struts 620 are shown in FIG. 6C and may provide struts that are monitored in a more sophisticated fashion for some embodiments of beds that may allow a person to provide signals to the bed. Signal sensed struts 620 may include pressure or force sensors that provide fast response times, more bandwidth, more accurate signals, or provide other benefits versus other pressure or force sensors used on other struts so that the action of a person bumping, tapping on them, or otherwise sending signals to a bed may be assessed. For example, if person 100 wants the bed to begin vibrating, the person 100 may bump one of the signal sensed struts 620 with their hand or fist rapidly three times in succession. A signal to the bed to stop vibrating may be delivered with two bumps in succession. Hence, a simple code, perhaps similar to the well-known Morse Code, may be provided. Such codes may signal to a bed that the person 100 lying on it may want to the bed to vibrate, to stop vibrating, to undulate slowly, to stop undulating, to accommodate them with more back support, to raise or lower their head, or to accommodate them in any other possibly way for which such a code may be developed. Such a code may include analysis of the timing of bumps or taps, the level or severity of bumps or taps, where such bumps or taps are applied, or other possible aspects of how a person lying in a bed may bump, tap, or otherwise provide a signal to a bed. The ability to interact with a bed by bumping, tapping, kicking, thumping, or otherwise providing a signal to the bed may enable the person in the bed to provide a signal to the controller without substantially changing position. For some embodiments, the meaning of signals delivered by a person to a bed may have different meaning based on the sleeping position the person is in. For example, a person lying on their side that sends a signal to rock the bed surface gently may initiate a different sequence of motion of the bed surface versus a person lying on their back who sends the same signal. That is, a bed may analyze a command from a person in view of the sleeping position of the person, the person's personal preferences, and other information the bed may have available and provide an optimized response based on the available information. Various embodiments of beds 103 and slat beds 400 may make use of signal sensed struts 620 or possibly with additional or supplemental motion sensors, pressure sensors, force sensors, or other possible sensors that may be used to sense bumps, taps, or other possible signals from a person.

Signals may also include bumping, tapping, kicking, or otherwise stimulating sensors such as signal sensed struts 620 to signal a sleeping position to the bed. For example, two quick bumps delivered near the signal sensed strut 620 on the left side of the slat bed 400 used to generate the pressure profile 600 in FIG. 6C might signal that the bed occupant is sleeping on their left side. Bumping both signal sensed struts 620 at a substantially identical time might signal the bed occupant is sleeping on their back. In some embodiments, a bump to a signal sensed strut 620 may simply signal to the bed that the present sleeping position it is providing is not comfortable and should change. Algorithms in the computing device or controller that adjust sleeping position may then assume the prior analysis of the one or more bed occupants' sleeping position is not correct and move to the next closest estimate the bed has and try that one in an attempt to better serve the bed occupant.

Pressure profiles 600 as shown in FIGS. 6A and 6C may be collected by monitoring the force or pressure applied to each strut 414 in a slat bed 400 and assembling that information to create the views shown. However, other or additional information regarding sleeping position of a person 100 on a slat bed 400 may be collected in other ways, such as cameras, imaging devices, and other tools discussed hereinabove.

Pressure sensors 219 may not normally all read force or pressure consistently, so the operation of a bed 103 or slat bed 400 may benefit if some calibration is performed. In some embodiments, the reading of pressure sensors 219 may be compensated by taking readings when the bed is not occupied. Such pressure sensor 219 calibration cycles may be undertaken automatically, may be done in a calibration phase that may occur when a bed is first constructed or set up for use, or may be manually initiated. Calibration may be done when the bed is known to be unoccupied and a user controlling a calibration may be directed through a user interface to clear the bed of all bed coverings and other possible loads that may affect the calibration cycle. Some calibration routines may benefit from a bed covering in place so that any inconsistencies in the thickness, fit, or applied pressure due to the bed covering may be accounted for in the calibration. In some embodiments, a user might be directed to apply weights to some areas of a bed sleeping surface so that reference readings under load may be taken to augment calibrations (and to possibly later move the weights to other regions of the bed for additional readings). As techniques of calibration of weigh scales, pressure sensors, and force sensors are well-known to those skilled in the art, the details of how calibrations may be performed and applied are taken as understood and will not be provided herein.

Some embodiments of pressure sensors 219 or other suitable pressure or force sensors may provide acceptably consistent measurements of pressure or force (possibly after a calibration cycle), but may not provide highly accurate measurements. For such situations, bed 103 or slat bed 400 may proceed with optimization of its sleeping surface based on information is available about the bed occupants actual weight. In some embodiments, a bed occupant may enter their actual weight manually through an electronic interface so that such a bed may better accommodate their comfort and health. In some embodiments, a bed occupant may input information about their comfort while using the bed and may indicate if the bed feels too firm, too stiff, too soft, or has other limitations that a bed 103 or slat bed 400 may improve upon through electronic computer algorithms and controls once the limitation has been input by the bed occupant.

In some embodiments of slat beds 400, some slats 402 may be at substantially different heights from their adjacent slats. This may occur, for example, with slats 402 that support a bed occupant's hips or other portions of the body that may curve abruptly and benefit from a rapidly curving bed surface. Readings of the pressure or force on slats in regions of a bed that have a substantially rapidly curving surface may suffer some error as the action of a bed occupant's body may place considerable lateral force on slats in those regions of a bed. Hence, some embodiments of slat beds 400 may benefit from compensation of the force readings of slats in regions of the slat bed 400 where slat 402 height varies significantly between adjacent slats 402. Such compensations may be made based on the total weight born by a grouping of slats and a prediction of natural curves and distribution of weight of the human body. For example, weight readings near the hips of a bed occupant may be substantially similar for three slats 402 near the hips; so a correction algorithm may assume that lateral pressure on the slats 402 is effectively binding them together (possibly through action of lugs 420 that couple them) so that they share the weight load applied to them evenly versus providing a correct reading of their individual loads. The slat bed 400 electronics may then decide to distribute the total weight readings of these three struts in a more natural way across them to reflect a more reasonable prediction of how weight is actually distributed. Many possible compensation or correction algorithms may be applied that take account of the force, pressure, or weight on each slat, the relative heights of the slats, modeling of the bed occupants body, and many other possible factors to provide improved readings of the load born by each slat 402.

FIG. 7 shows a perspective view of a portion of an embodiment of a slat bed 400 comprising lateral slats 402 and adjustable struts 414 and including a head platform 130 that includes buttons 702, a microphone 704, and a speaker 706 that may allow a person to control the bed or receive signals from the bed. Buttons 702 as shown in FIG. 7 are large and have simple shapes that may provide benefit in allowing a person 100 to feel them and identify them in the dark and without supplemental lighting that may disturb sleep. Buttons 702 may be recessed from the surface they are applied to so that they may be less likely to be inadvertently pressed. Buttons 702 are also shown in FIG. 7 to be redundantly placed on a front facing and a side facing surface of head platform 130 so that a person lying in different positions on slat bed 400 may access them easily. Buttons 702 may also be placed in various other locations. Microphone 704 may sense voice commands from a person. Speaker 706 may provide information to a person in the bed regarding the time of day, their health information (such as heart rate, etc., assuming such signals are being sensed), news information, weather information, music, soothing sounds, or other audible information. Speaker 706 may also provide alarm functions and signal a person to wake up. Wake up signals may also be provided at programmed alarm times to a person by vibrating the struts 414 in a bed, undulating the bed, or providing other types of motion through control of struts 414 to signal to a person that it's time to wake up.

Some embodiments of bed 103 or slat beds 400 may collect information or receive information from other sources such as the internet, computer servers, social media, and other sources about the identified person's preferences and interests and may adapt information it provides to the person based on that information. Hence, a person identified and known to enjoy classical music may be provided a wakeup signal from speaker 706 delivering classical music. A person with keen interest in certain company stock prices may receive information about those companies before they fall asleep at night. As another example, a person with relatives in India may be awakened at night to be told that an earthquake has struck a village near where their family lives. Similarly, the detection of a house fire, severe weather, or other emergency situations may justify waking a person in the night. Those skilled in the art will recognize that the ability of some embodiments of a bed 103 or slat bed 400 to identify a person and provide information and possibly other services to them, including information related to their interests, family ties, financial investments, travel interests, product interests, advertising information they may find interesting, product offerings, music, games, entertainment, and other possible information or services may provide benefit to some persons. Additionally, some embodiments of a bed 103 or slat bed 400 may sense or determine when a person is about to fall asleep and may no longer desire information to be provided to them, when they are awake in the course of the night and may appreciate receiving some information, when they have awoken in the morning and what information they may find interesting, when some news or other information is so important to them that they should be woken immediately, when some news or other information is of sufficient interest that they should be provided it once they awake in the morning, or other possible ways in which various embodiments of beds 103 or slat beds 400 may provide information or services to a person.

A person 100 controlling a bed 103 or a slat bed 400 may want the bed to quickly provide a surface that is substantially flat or is some other pre-defined shape. For such situations, a voice command, a bump code to a signal sensed strut 620, or possibly pushing a button 702 may command a bed to flatten. For example, in FIG. 7 one of the buttons 702 is shown with a square shape, and in some embodiments a square button 702 may simply cause a bed to flatten. Similarly, the upward pointing triangle button 702 shown in FIG. 7 may command a bed to adjust for a person 100 sleeping on their back. The triangular buttons 702 pointed to the left or right may cause a bed to adjust for a person 100 intending to sleep on their left or right side.

Some embodiments of slat beds 400 or beds 103 may automatically adjust to provide a substantially flat surface or a pre-programmed desired surface shape after some interval of time has passed without detecting a person 100 sleeping or lying on the bed. For example, a bed may detect when a person leaves the bed and start a timer so that if no person returns to the bed after some time has passed, the bed assumes a default adjustment position (that again, may be a flat bed or some other desired shape). Some embodiments may use a fixed elapsed time before a bed returns to a default adjustment position while other embodiments may allow the elapsed time to be controlled or programmed into the bed. Desirable times for a bed to assume a default shape may range from a few minutes to a several hours. For example, some persons, especially those with health issues, may find it desirable to have a bed assume a default adjustment shape that makes it substantially easier for them to get into the bed. Such a default position may substantially lower slats 402 to their lowest possible level for some regions of a bed. So if the person leaves the bed, even if for only a few minutes, they may desire the bed to assume its default shape (again, facilitating easy entry into the bed). Other persons, however, may prefer to re-assume their prior sleeping position when they return to bed. So for such persons, it may be preferred if the bed never changes to a default position, or only does so after a rather long time interval has passed.

Some embodiments of slat beds 400 or beds 103 may be pre-programmed to implement a sequence of preferred sleeping positions as a function of time through the course of the night (or other sleeping interval). For example, some persons may desire to sleep on their backs for the first few hours of a night, then change to sleep on their right side for an hour, then change to sleep on their left side for an hour, and then to return to their back for the remainder of the night. Accordingly, a program that automatically adjusts sleeping positions may enable a better night sleep such that the person need not or may not wake. Changing sleeping positions may also benefit persons who may be prone to the development of muscle aches, bed sores, or other ailments from sleeping in the same position for too long. Some embodiments of beds 103 or slat beds 400 may also report the sleeping position, pressure profile, sensor data, or other information collected by the bed to a central computer system, the internet, a cloud computer system, a computer server, or other computer system used to collect information from multiple beds that may be in a facility such as a nursing home, hospital, hospice, or other care facility. In this way, the central computer system of such a facility may notify nursing staff if a person has remained in a given position in their bed for too long so that a caregiver may be dispatched to provide care to the person in need. Additionally, some embodiments of beds 103 or slat beds 400 may be programmed or may receive instructions from a central computer system, the internet, a cloud computer system, a computer server, or other computer system so that the bed may be controlled remotely by an operator or controlled automatically in response to commands from a computer.

While buttons 702, speaker 706, and microphone 704 are shown in FIG. 7 as examples of embodiments of controls allowing a person 100 to interface with a bed, those skilled in the art will recognize that additional techniques are also possible. Embodiments of beds 103 and slat beds 400 may include knobs, buttons, switches, electrical jacks, audio jacks, electronic displays, electronic touch-screen displays, indicator lights, buzzers, alarms, vibrators, haptics, wired electronic interfaces, wireless electronic interfaces, sensor interfaces, heart rate monitor interfaces, CPAP (Continuous Positive Airway Pressure) machine interfaces, interfaces to cell phones, interfaces to tablet computers, interfaces to computers, and any other suitable technique through which a person 100 or device may interface with a bed.

Some embodiments of beds 103 or slat beds 400 may include features to facilitate exercise such as platforms, weights and pulleys, or other accessories and features that may be attached to bed frame 410 or other parts of a bed 103 or slat bed 400. Beds 103 or slat beds 400 incorporating exercise equipment or exercise capability may include electronic interfaces or other controls to allow such exercise functions to be initiated and controlled. For example, a bed may allow a person to initiate a short yoga routine that involves the bed creating movements that gently exercise the body and benefit the onset of sleep. A bed might also continue motion through some or all of the night to provide some level of exercise or beneficial motion during sleep. Some embodiments may initiate a yoga, stretching, or other routine to gently wake a sleeping person and provide exercise and/or motion that helps them stretch and condition their body before they rise from the bed. For persons with back or spine-related medical conditions, rolling and stretching the spine may reduce the onset of injury if such exercises are done prior to rising from a bed.

Figure 8:
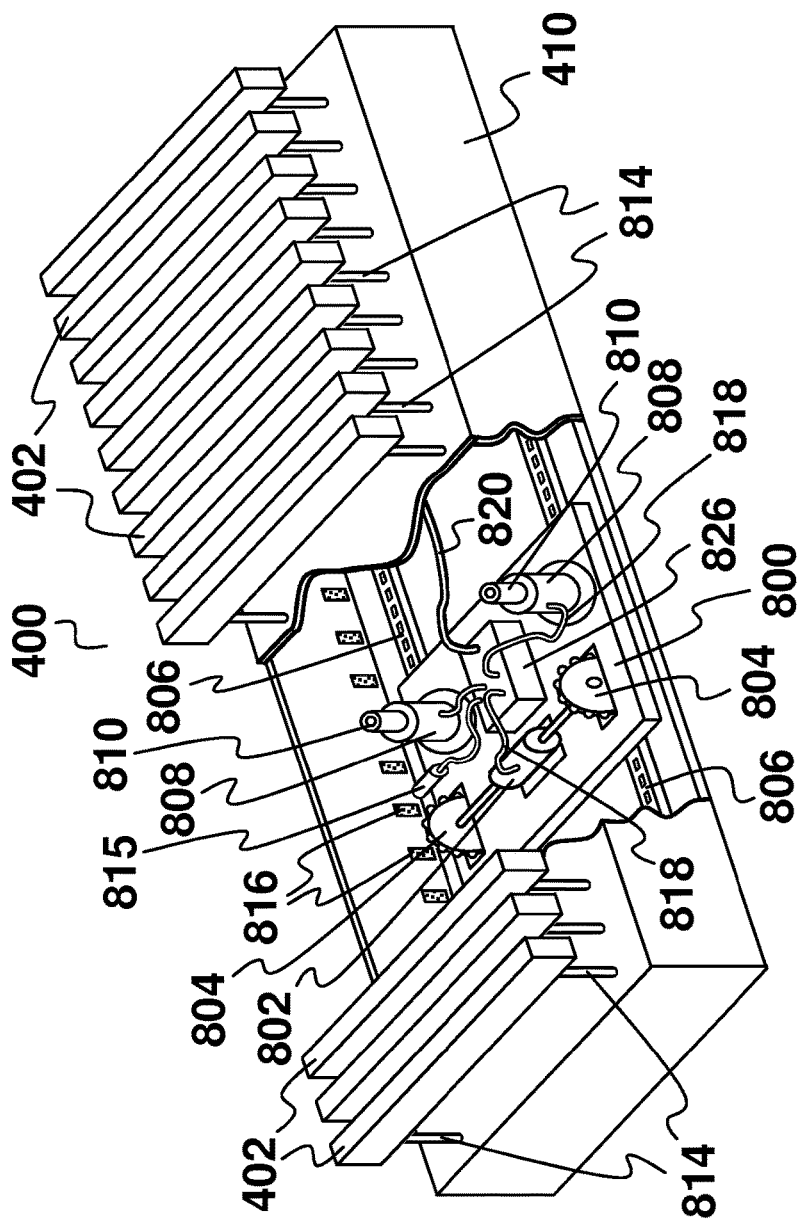
FIG. 8 shows a perspective view of an embodiment of a slat bed comprising lateral slats and adjustable struts according to the present disclosure.

FIG. 8 shows a cutaway view of an embodiment of a slat bed 400 comprising lateral slats 402 and adjustable struts 814. Bed 400 comprises a gantry 800 that may move along tracks 806 and motors 808 with hubs 810 that may allow adjustable struts 814 to be engaged, sensed, and adjusted. Gantry 800 may be driven by gantry motor 802 which may drive gears 804 that engage tracks 806. The teeth of gears 804 engage slots as shown in tracks 806 so that rotation of gantry motor 802 causes motion of gantry 800. Gantry 800 may slide on tracks 806, or on the lower inside surface of bed frame 410, or may be supported by wheels, bearings, or other mechanical systems to support gantry 800 and allow it to move with a guided motion. Gantry motor 802 is connected to controller 826 through electrical wire 818. Gantry motor 802 may be an AC induction motor, DC brush type motor, brushless DC motor, stepper motor, or any other type of electric motor suitable to drive gantry 800.

Motors 808 with hubs 810 mounted on their shafts are mounted to gantry 800 and are connected to controller 826 through electrical wires 818. Motors 808 may be AC induction motors, DC brush type motors, brushless DC motors, stepper motors, or any other type of electric motors suitable to drive hubs 810 so that struts 814 may be adjusted. As gantry 800 moves along tracks 806, hubs 810 may engage a jack screw so that action of motors 808 and hubs 810 may rotate the jack screw and adjust the height of the associated strut 814. Hubs 810 may have electrical controls that allow them to extend and retract so that they may engage and disengage jack screws on struts 814. Alternatively, the techniques of FIGS. 9A-9E, the techniques of FIG. 12, or other techniques may be applied so that hubs may engage and disengage jack screws only through lateral motion of gantry 800. Controller 826 may be similar to controller 226 shown in FIGS. 2A-2C, but may include additional functionality to control multiple motors 808 and gantry motor 802 and may also include an interface to sensors such as position sensor 815. Controller 826 may be powered through power cable 820 that may be suspended inside bed frame 410 using springs and supports, a spring-loaded or electrically controlled winch (on which power cable 820 may wind and unwind as gantry 800 moves, or suspended by other techniques suitable to keep power cable 820 safely positioned as gantry 800 moves).

Controller 826 may be located in other parts of bed frame 410 or even be mounted outside of bedframe 410 in some embodiments. The functions of controller 826 to collect and analyze information received from sensors, monitoring motor currents, from user interfaces, from a host computer, from a computer server, from the internet, or possibly from other sources; to determine adjustments for struts 814; and to power and control motors, actuators, and other elements that may be present in some embodiments may be contained in a single controller 826 as shown in FIG. 8, or may be distributed over multiple controllers and housings in multiple locations. Those skilled in the art will recognize that an electronic controller 826 function of a bed 103 or slat bed 400 may be housed as a single element, or housed as multiple elements that may be partially built into or partitioned across multiple functions and locations. For example, some embodiments of motors 808 may include some power control electronics inside them while others require external power controls that may reside in controller 826 as shown in FIG. 8 or in other locations.

While the embodiment of FIG. 8 provides an example of motors 808 and hubs 810 that may control struts 814 that include jack screws, those skilled in the art will recognize that additional embodiments of a gantry 800 may be utilized to adjust struts 814 that utilize pneumatic cylinders, hydraulic cylinders, other forms of mechanical struts, mechanical mechanisms that may be used to control a slat 402, or other types of controls that may allow a slat 402 to be raised, lowered, or tilted. Multiple struts 814 may be adjusted with a single motor 808 that is connected to multiple hubs 810 or other assemblies and may be used to transfer motion from one motor 808 to multiple locations so that multiple struts 814 may be engaged.

Position sensor 815 may be an optical sensor that may sense position targets 816 that are affixed to the inside of bed frame 410 so that the position of gantry 800 relative to struts 814 may be determined. Targets 816 may be simple reflectors and position sensor 815 may be a simple light source, such as a light emitting diode (LED), and a photo-detector, such as a photodiode. Position sensor 815 is connected to controller 826 through an electrical cable 818, and controller 826 may include filtering, conditioning, controlling, amplifying, and/or other sensing electronics so that the signals from position sensor 815 may be collected and analyzed. While the embodiment of FIG. 8 shows position sensor 815 embodied as an optical sensor, other embodiments making use of Hall-effect sensors, magnetic sensors, inductance sensors, ultrasound sensors, infrared light sensors, and many other types of sensors that may be suitable for measuring and controlling the position of gantry 800 are possible. In some embodiments, sensors may be fitted directly to hubs 810 so that the proximity of a jack screw may be sensed substantially directly at hub 810. In some embodiments, a magnetic flux path may be provided through or across hub 810 that is responsive to the presence of a jack screw so that magnetic sensors may be utilized to sense when a hub 810 is at close proximity to a jack screw.

Embodiments of slat beds 400 utilizing a gantry 800 with motors to engage and control struts such as the embodiment of FIG. 8 may provide benefit in allowing lower cost embodiments of slat beds 400 versus slat beds 400 that have a dedicated motor and controller to control each strut 814. However, as the operation of a slat bed 400 involves adjusting struts 814 in response to movement and changes in position of a person 100 lying on slat bed 400, it may take somewhat longer for a slat bed 400 including a gantry 800 to adjust the bed than it would if each strut 814 had a dedicated motor. Multiple gantries may be included in the embodiment of a slat bed 400 so that multiple struts 814 tied to multiple slats 402 may be adjusted at the same time. Also, some gantries 800 may comprise more than two motors 808. For example, a gantry with four motors 808 and hubs 810 may be able to adjust two slats 402 at the same time. If struts 814 and slats 402 are placed so closely that multiple motors 808 cannot be fitted to a gantry at the spacing of struts 814, then a gantry 800 may be designed to adjust multiple struts 814 at the same time but in which the slats 402 and associated struts 814 may not be adjacent. In such a configuration, every other slat 402 or every third (or fourth, etc.) slat 402 along the length of slat bed 400 may be adjusted at one time and a second pass (or additional passes) of gantry 800 may be utilized to adjust the interspersed slats 402 that were skipped on the first pass of gantry 800. Some embodiments of slat beds 400 may also employ slats 402 that are supported by three or more struts 814 instead of with two struts 814 as shown in FIG. 8. For such embodiments, additional motors 808 and hubs 810 may be added to gantry 800 so that all the struts 814 associated with a given slat 402 may be adjusted at one time. Embodiments are also possible in which more than one gantry 800 are utilized and the embodiment of track 806 includes multiple tracks 806 so that each gantry 800 is kept to its own separate tracks 806. For example, an embodiment of slat bed 400 may have one gantry 800 to engage struts 814 for the half of slat bed 400 nearest where a person 100 may rest their head and a second gantry 800 to engage struts 814 for the half of slat bed 400 nearest where a person 100 may rest their feet. For such an embodiment, track 806 may continuously extend the full length of slat bed 400 or may be broken near the center of slat bed 400 so that each gantry 800 would operate on a section of track that is separated from the section of track used for the other gantry 800. Those skilled in the art will recognize a very wide range of possible numbers of gantries 800, arrangements of track 806, numbers of motors 808 and hubs 810 per gantry, and other arrangements and configurations that are possible for various embodiments of slat beds 400.

While gantry 800 as shown in FIG. 8 moves in a single direction back and forth along the length of slat bed 400 and engages and adjusts the struts 814 associated with each slat 402 at the same time, one or more gantries may be configured to move both along the length of and across the width of, a bed 103 or slat bed 400, so that one or more struts 814 may be adjusted at one time. Accordingly, a priority system may be configured to indicate which struts and slats are to be adjusted prior to other struts and slats.

As previously described, some embodiments of struts 814 utilizing motors and jack screws may sense the force or weight applied to the jack screw by rotating the motor and monitoring the current utilized so that the motor torque may be determined. It was also described that rotating such a motor to both raise and lower the jack screw may allow the effect of friction to be determined so that a more accurate value of the weight applied to the jack screw may be determined. Hence, some embodiments of a slat bed 400 utilizing a gantry 800 may determine the force or weight on various struts 814 by engaging motors 808 and hubs 810 in sequence with struts 814 and determining the force or weight applied to them. As the gantry 800 must then move to various positions and various struts 814 must be engaged and rotated, it may take some time to determine the sleeping position of a person 100 lying on slat bed 400 so that analysis can be used to determine how to adjust struts 814. Priority may be applied in the adjustment of struts 814 to benefit the comfort and/or health of person 100. Hence, some embodiments of slat beds 400 may monitor sleeping positions of a person 100 lying on them; store information about those sleeping positions in computer memory; determine likelihoods of the course of changes in sleeping positions that the person 100 may make based on their past behavior; preferentially monitor whatever sensors, strut 814 weight loads, or other sources of information may be available to detect changes in sleeping positions based at least partially on the likelihood that certain courses of changes in sleeping positions may occur; and make preferential adjustments to struts 814 in response to detected changes. Those skilled in the art will recognize a wide range of possible methods that are possible for collecting, organizing, monitoring, storing, referencing, and analyzing information that may be available to a slat bed 400 so that decisions regarding priorities for monitoring and adjusting the slat bed 400 may be made in a beneficial way.

Figure 9A:
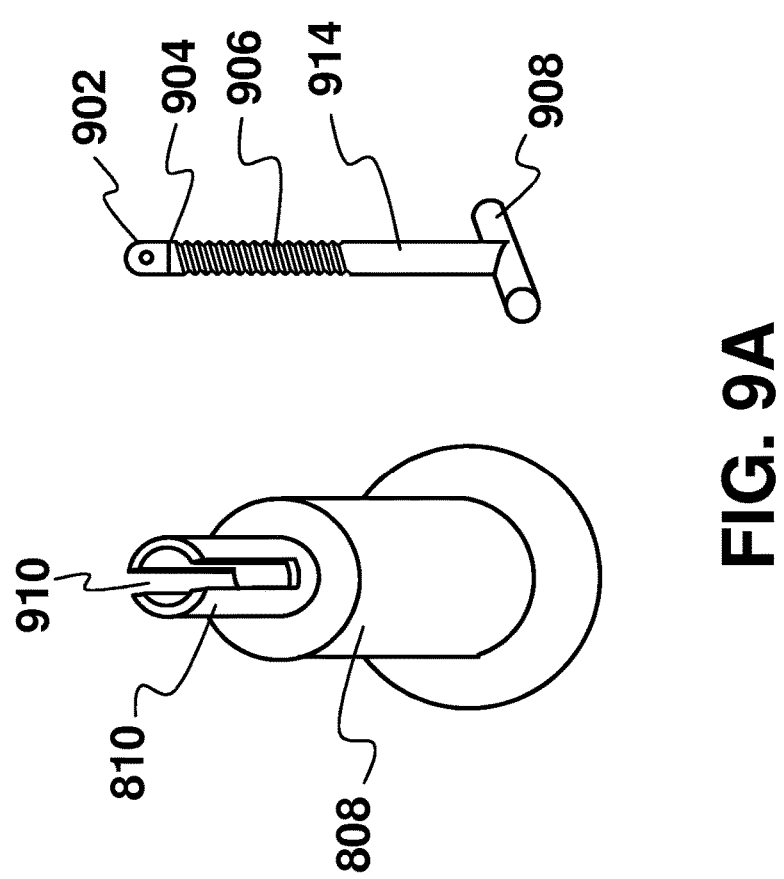
FIG. 9A shows a perspective view of an embodiment of a motor and hub and an adjustable strut that may be utilized in the bed of FIG. 8.

FIG. 9A shows a perspective view of an embodiment of a motor 808 and hub 810 that may be utilized in some embodiments of a slat bed 400 using a gantry 800 as shown in FIG. 8. Hub 810 is mounted to motor 808 shaft and hub 810 is constructed as an open round cylinder with a slot 910 cut through it across hub 810. FIG. 9A also includes an embodiment of a strut 914 comprising strut top 902, free rotating joint 904, jack screw 906, and T-handle 908. Strut 914 may be suitable for use with a gantry 800 and, in particular, with a motor 808 and hub 810 in which hub 810 and slot 910 are constructed to engage with T-handle 908. Strut top 902 includes a hole through which a pin, bolt, or other connection may be made to a slat 402. Free rotating joint 904 is simply a joint in strut 914 that allows strut top 902 to rotate independently from jack screw 906 and T-handle 908. Free rotating joint 904 may include bearings, bushings, fittings, and other constructions suitable to generate a free rotating joint 904 so that strut top 902 may rotate freely. Those skilled in the art will recognize that alternative embodiments of strut 914 may utilize ball joints between struts 914 and slats 402, bearing surfaces inside slats 402 to which the end of struts 914 may engage, and a wide range of other possible connections between struts 914 and slats 402 that allow rotating jack screws 906 to be utilized to support and elevate slats 402. T-handle 908 may be formed by welding or otherwise connecting a section of shaft at a right angle to the main structure of strut 914 so that rotating force may more easily be applied to strut 914. Those skilled in the art will recognize that embodiments of struts 914 using hexagonal ends, square ends, or other constructions may be used instead of T-handle 908.

Figure 9B:
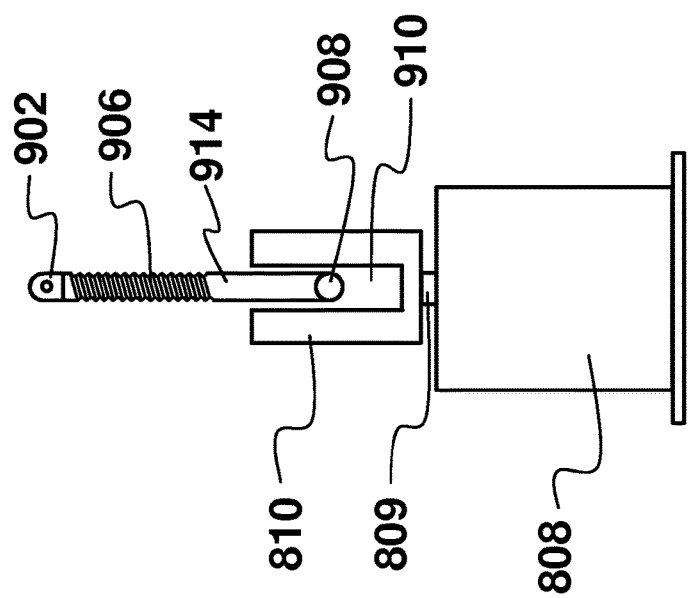
FIG. 9B shows a side view of the motor, hub, and adjustable strut shown in FIG. 9A.

FIG. 9B shows a side view of the motor 808, hub 810, slot 910, and adjustable strut 914 shown in FIG. 9A. Hub 810 is shown mounted to motor shaft 809 of motor 808. The view of FIG. 9A shows the T-handle 908 of strut 914 engaged in the slot 910 of hub 810 so that the engagement and operation of the system may be described. T-handle 908 fits into slot 910 of hub 810 so that rotation of motor 808 and hub 810 may be transferred to T-handle 908 and jack screw 906 so that rotary motion of motor 808 may be converted to vertical motion of strut 914 due to jack screw 906 when jack screw 906 is inserted into a threaded hole (such as the hole in upper support 210 as shown in FIG. 2A). It will be clear to those skilled in the art that the elongated slot 910 as shown on hub 810 in FIGS. 9A and 9B allows T-handle 908 to slide in slot 910 as jack screw 906 and T-handle 908 move vertically in response to rotation of hub 810 so that T-handle 908 remains engaged in hub 810 over the course of some range of vertical motion of T-handle 908.

Figure 9C:
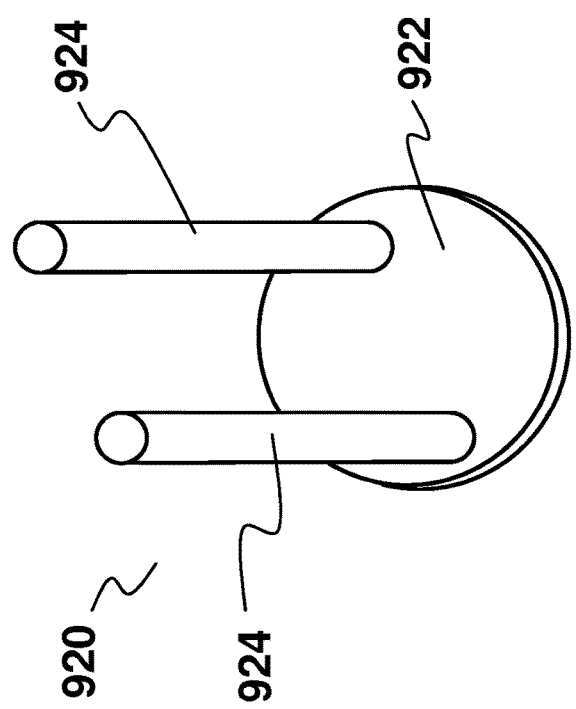
FIG. 9C shows a perspective view of an embodiment of a hub that may be attached to an electric motor that may be used to adjust struts in a bed according to the present disclosure.

An alternative hub embodiment is provided in FIG. 9C where hub 920 comprises mounting disk 922 and two shafts 924 welded or otherwise mounted to mounting disk 922 and extending upwards. Mounting disk 922 would be mounted to a shaft 809 of a motor 808 so that rotation of the motor shaft 809 would cause mounting disk 922 and both shafts 924 to rotate. A T-handle 908 of a strut 914 may be engaged between shafts 924 so that rotary motion of mounting disk 922 translates to rotation of T-handle 908 and other parts of strut 914.

Figure 9E:
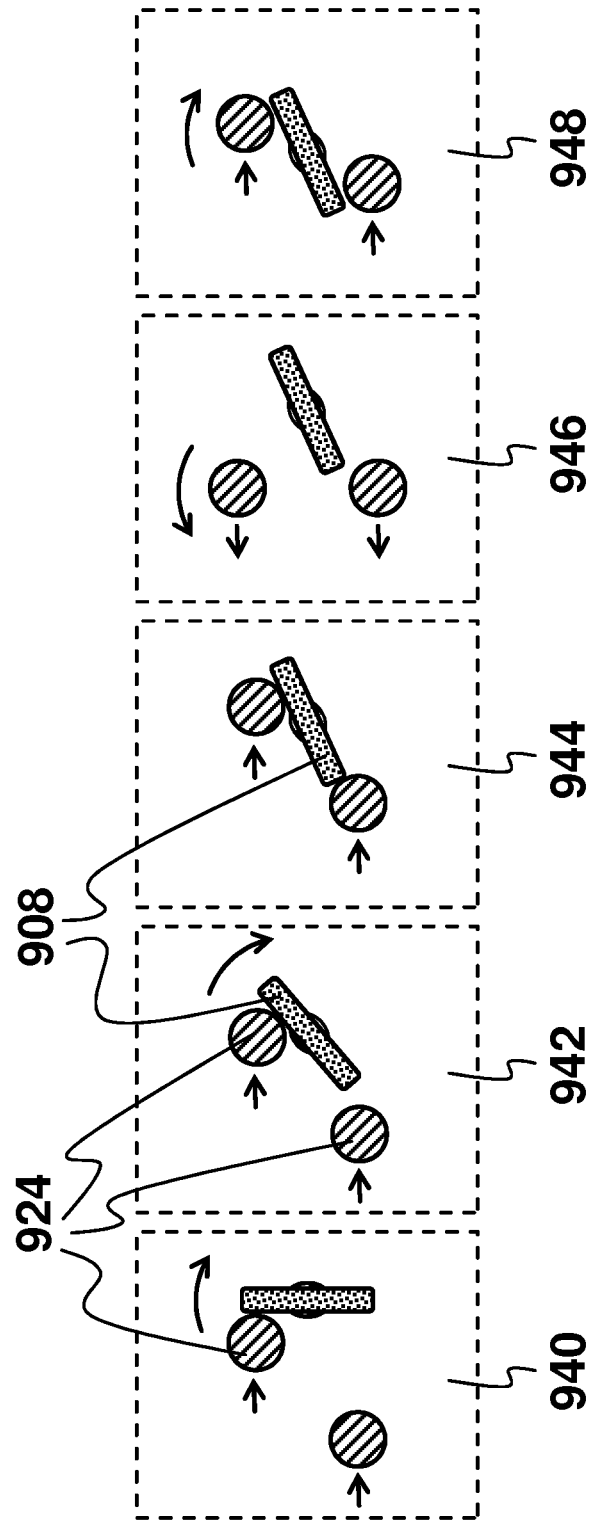
FIG. 9E shows a top view of an embodiment showing how the hub of FIGS. 9C and 9D may be used in a coordinated sequence of motion of a gantry and rotation of the hub to align a previously misaligned T-handle.

In FIG. 9D, a top cross-sectional view of five T-handles 908 are shown with the two shafts 924 of hub 920 engaging the center positioned T-handle 908. The T-handles 908 shown in FIG. 9D are all aligned in parallel and the orientation of each T-handle 908 is horizontal in FIG. 9D. It is clear from the view of FIG. 9D along with the perspective view of hub 920 in FIG. 9C and operation of gantry 800 as shown in FIG. 8 that with T-handles 908 aligned as shown in FIG. 9D that a gantry 800 may move along tracks 806 and engage hub 920 so that shafts 924 may act on T-handles 908 as shown in FIG. 9D to generate rotation of T-handles 908 and so also cause rotation of strut 914 and jack screw 906. Hence, if motor 808 is sensed and controlled so that it leaves T-handles 908 oriented in a direction substantially parallel to and aligned with the motion of gantry 800, then hub 920 may engage a desired T-handle 908 corresponding to a strut 914 in a slat bed 400 and make adjustments to the height of that particular strut 914. Such a control requirement limits rotation of T-handles 908 to half-turns, however, with proper design of jack screw 906 a half-turn may correspond to a reasonable minimum amount of vertical motion of strut 914. Of course, hub 810 shown in FIGS. 9A and 9B could also operate in a similar fashion, since if T-handles 908 are aligned in parallel with the motion of gantry 800, then slot 910 will allow hub 810 to pass over T-handles 908 and engage whichever T-handle 908 gantry 800 stops at. However, the design of hub 920 may benefit some embodiments of slat beds 400 in allowing controlled motion of gantry 800 and motor 808 to control hub 920 so that even T-handles 908 that are not in correct orientation in parallel to the motion of gantry 800 may be turned and engaged. An example of such an embodiment is shown in FIG. 9E in which five views of a T-handle 908 and two shafts 924 of hub 920 are shown. In the first view 940, T-handle 908 is shown oriented at a right angle to the direction of motion of gantry 800 which is shown with the straight arrows in first view 940. In first view 940, lateral motion of gantry 800 causes T-handle 908 to begin to turn clockwise (from the top as seen in the view of FIG. 9E) as shown by the curved arrow in first view 940. Further lateral motion of gantry 800 causes further clockwise rotation of T-handle 908 in second view 942. In third view 944, T-handle 908 has jammed against the lower shaft 924 due to continued motion of gantry 800. The jammed situation may be sensed by monitoring the torque provided by gantry motor 802 and gantry 800 may then be moved to the left as shown in fourth view 946. Fourth view 946 also shows counter clockwise rotation of hub 920 and shafts 924 so that both shafts 924 may clear T-handle 908 when rightward motion of gantry 800 resumes. In fifth view 948, gantry 800 has moved to the right and shafts 924 now properly engage T-handle 908 so that it may be turned either clockwise or counter-clockwise as may be desired to adjust the strut 914 associated with T-handle 908. It will be clear to those skilled in the art that the example of FIG. 9E and the use of hub 920 with shafts 924 to engage a T-handle 908 and correct the orientation of a misaligned T-handle 908 is only one of many possible techniques that may be applied to the construction of a slat bed 400 or bed 103 that makes use of a controlled gantry 800 to adjust struts 914. Other techniques involving a wide range of hubs are clearly possible.

Those skilled in the art will recognize that even if a control requirement is imposed to only adjust T-handles 908 to be left parallel after each adjustment to the direction of motion of gantry 800 that situations may occur in which T-handles 908 become misaligned. For example, vibration (due to operation of equipment nearby, vibration of a building, or other causes of vibration) of a slat bed 400 or a bed 103 may cause T-handles 908 to turn and may cause misalignment. T-handles 908 may also become misaligned due to movement of a bed, cleaning a bed, maintenance and lubrication of jack screws 906, or through other situations. Hence, embodiments of struts 914 and hubs 920 that allow automatic realignment may be beneficial. As a given bed 103 or slat bed 400 may have many struts 914, if T-handles 908 are misaligned, it may take some time for operation of the motors and gantry in a bed to properly align all the T-handles 908. Hence, some embodiments of slat beds 400 or beds 103 may sequence a gantry 800 over its range of motion at pre-determined time intervals so that misaligned T-handles 908 may be detected and corrected. Misaligned T-handles 908 may be detected by monitoring the torque applied by gantry motor 802 (by monitoring the current used by gantry motor 802 with a torque sensor, or by other possible techniques) as gantry 800 moves and determining when an increase of applied torque signals that a hub 920 has collided with a T-handle 908. When such a collision occurs, a method similar to that outlined in FIG. 9E or other possible control methods may be utilized to align the T-handle 908 properly. Some embodiments of beds 103 or slat beds 400 may utilize light sensors, magnetic sensors, cameras and image analysis, or other techniques to monitor the orientation of T-handles 908 (or other connections that may be used for a gantry to engage and rotate a strut) so their alignment may be detected and they may be adjusted as desired. Motion of a gantry 800 may be blocked or obstructed by other things besides misaligned T-handles 908. The presence of foreign objects, malfunction of gantry 800, or other possible factors may result in gantry 800 being blocked. In some embodiments, such an obstruction or blockage may be determined by assuming the blockage is due to a misaligned T-handle and attempting to align it. If the alignment process fails, other causes may be assumed and the bed 103 or slat bed 400 may provide a signal or indication (through an interface, with an indicator light, etc.) that a fault has occurred. In some embodiments, the maximum torque of gantry motor 802 and motors 808 may be selected, controlled, or limited so that the available force of gantry motor 802 and motors 808 is not sufficient to cause injury or serious damage in the case that gantry 800 is obstructed, jack screws 906 are jammed, or other situations exist in which a powerful or high torque motor may cause serious damage or injury to a person. Gantry motor 802 and motors 808 may also be monitored for the level of power they are providing and their temperatures may be monitored as a matter of safety. In some embodiments, sensors may be utilized to ensure gantry 800 has a substantially unobstructed path available before motion of gantry 800 is attempted. In some embodiments, openings or doors in bed frame 410 through which gantry 800 is installed and serviced may also include interlock switches so that gantry 800 may not be commanded to move unless all openings, service doors, etc. are all properly closed.

The position of motors 808 on gantry 800 and the relative dimensions of slat bed 400 and gantry 800 are such that slats 814 nearest the left side of FIG. 8 may not be engaged by motors 808 and hubs 810. Accordingly, some embodiments of bed frame 410 may be extended to provide a greater range of motion of gantry 800; some embodiments of gantry 800 may be more compact so that all or more struts 814 may be engaged; some embodiments of slat beds 400 or beds 103 may include struts 914 near one or both ends of the bed that are not automatically adjusted, are only adjusted manually, remain fixed in position, or include additional mechanisms to allow adjustment with a gantry 800 at its limit of motion; some embodiments of slat beds 400 or beds 103 may include a head platform 130 and/or foot platform 132 that are either not automatically adjusted, are adjusted manually, remain in fixed positions, or are adjusted automatically with the addition of mechanisms that allow them to be engaged with a gantry 800 at its limit of motion, so that space exists in bed frame 410 for needed motion of a gantry 800; and some embodiments of slat beds 400 or beds 103 may employ additional techniques or combinations of techniques to allow sufficient motion of gantry 800 and engagement of all desired struts 814 and slats 402.

Hub 810, hub 920, or other possible hubs may comprise electrically insulating plastics or other insulating materials to provide additional electrical isolation of a person 100 from an electric motor that may be used to adjust the struts 914 of such a bed. All or some portions of struts 914 may also be constructed from plastics or other electrically insulating materials in the interest of electrical safety.

Figure 10:
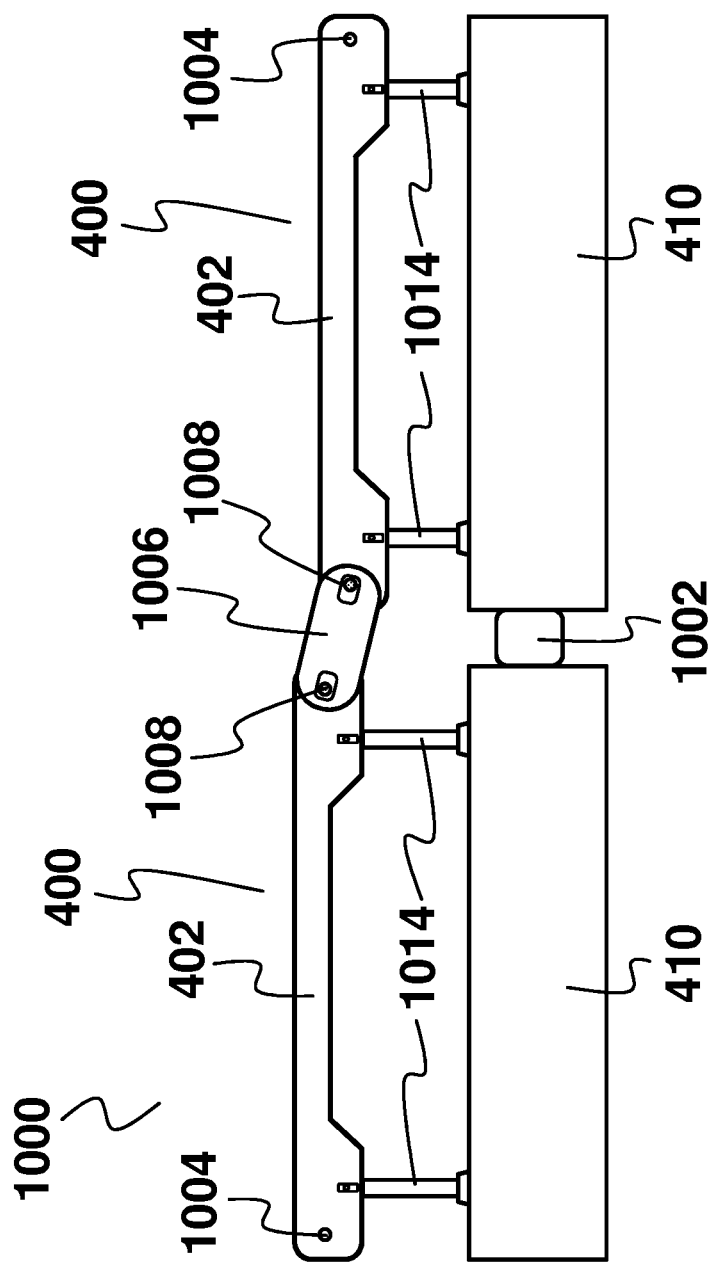
FIG. 10 shows an end view of two beds comprising lateral slats and adjustable struts in which the beds are separated and secured together by a spacer.

FIG. 10 shows an end view a double bed 1000 formed by joining two slat beds 400 with spacer 1002 and slat couplings 1006. Spacer 1002 may comprise wood, plastics, metals, and other suitable materials and may be fixed in place with adhesive, fasteners, clips, magnets, hook and loop fasteners, bolts, screws, and other possible techniques. Spacer 1002 may run the length of bed frames 410 as a continuous member or may be broken instead into two or more short spacers that ensure bed frames 410 are properly spaced and kept in parallel. Spacer 1002 may offer benefit in keeping the two slat beds 400 shown separated so that the slats 402 of each slat bed 400 don't interfere with each other. Some embodiments of spacers may attach to slat beds 400 at the top or bottom of bed frame 410 and attach in such a way as to avoid the need to drill in to, bolt on to, apply adhesive to, or otherwise alter the sides of bed frame 410. Some embodiments of double beds 1000 may not utilize spacers 1002 and depend instead on properly positioning slat beds 400 or aligning slat beds 400 using other techniques so that a double bed 1000 may be formed.

Slat couplings 1006 may be used in some embodiments so that independent adjustment of the struts 1014 of the slat beds 400 to the right and left in FIG. 10 does not create a large gap or step between the slats 402 to the left and right in the figure. Slat couplings 1006 may be secured with pins 1008 through holes 1004 in slats 402 and through slotted holes in slat couplings 1006 as shown in FIG. 10. Those skilled in the art will recognize that a very wide range of slat couplings 1006 are possible. In some embodiments, no slat coupling 1006 may be utilized and the slat beds to the left and right making up double bed 1000 may have separate bed coverings and may simply operate independently. Some other embodiments may not use a slat coupling 1006 and instead include a substantially stiff panel in a bed covering to bridge the gap between slats 402 of a double bed 1000. Such a stiff panel may be provided on a bed covering that is designed to span the full width and length of double bed 1000. Such a stiff panel in a bed covering may also help to bridge a gap between the left and right slat beds 400. A stiff panel may be sewn into bed covering or be affixed with adhesive or other fastening techniques. A stiff panel may be formed from leather, nylon, plastics, thick fabrics, canvas, or other suitable materials. Such a stiff panel may also be used in some embodiments of beds that utilize slat couplings 1006. While FIG. 10 shows two slat beds 400 joined to form a double bed 1000, larger beds may be formed by adjoining even more slat beds. Each side of a double bed 1000 as shown in FIG. 10 may be controlled to benefit the comfort and/or health of the persons who may be lying on each side of such a double bed 1000 using the techniques described herein.

Beds 103 and slat beds 400 may be coupled together as shown in FIG. 10 to create a double or larger size bed that could be used by two persons. Such beds 103 or slat beds 400 may be designed with standard dimensions so that they correspond to commonly sized twin, queen, and king bed sizes; or such beds may be sized to form other desirably sized beds. In some embodiments, slats 402 of different lengths may be interchanged on a bed so that when beds are joined together to form a double, queen, or king sized bed that beneficial results are obtained.

If a bed frame 410 is made to be approximately 30 inches wide, a twin XL sized bed may be created with slats 402 that are approximately 38 inches long, with the slats extending beyond bed frame 410 by approximately 4 inches on either side (note that a standard twin XL bed is 38 inches wide and 80 inches long). A queen sized bed may then be created with two such 30 inch wide bed frames 410 adjoined directly so that a 60 inch wide queen sized bed is formed; and slats 402 on such a queen sized bed may be slightly less than 30 inches long so that there is a suitable spacing between slats near where the two bed frames 410 adjoin to allow for clearance and movement of the slats 402 (note that a standard queen sized bed is 60 inches wide and inches long). In some embodiments, an asymmetric slat 402 may be utilized so that the ends of slats 402 align with the outside of a slat bed 400 formed from two bed frames 410, but a gap is created near the center of the bed. Accordingly, it is possible to offer a combination of bed sizes using interchangeable parts.

One problem with conventional mattresses and box springs is that they take up a lot of room, are difficult to move, and normally require a truck be used to deliver them. In contrast, the beds 103 and slat beds 400 of the present disclosure may be shipped in pieces and may be fully or partially assembled by a customer in their home.

Figure 11:
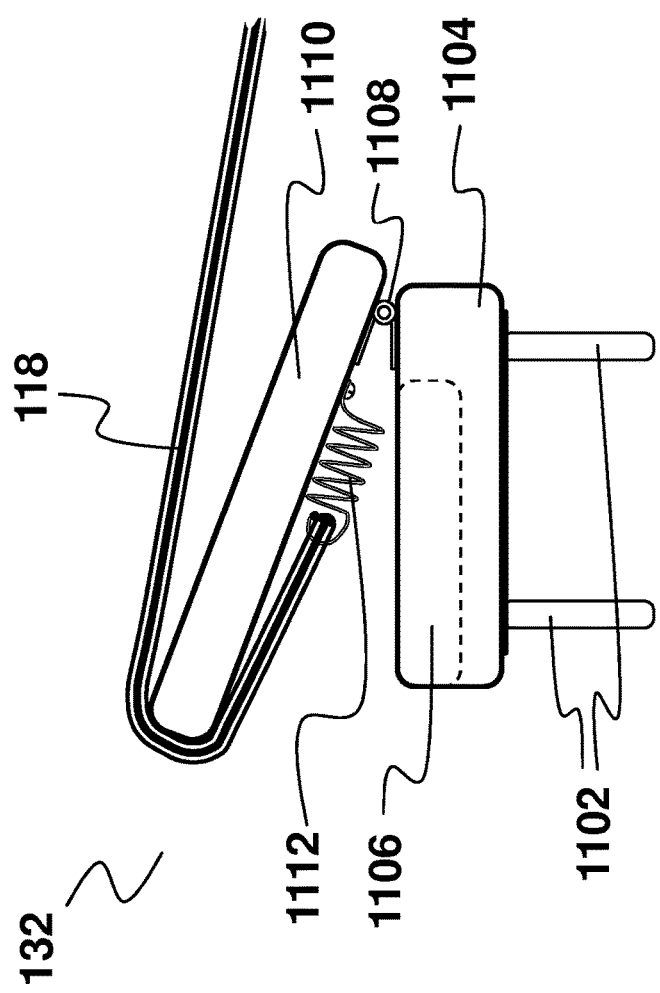
FIG. 11 show a side view of an embodiment of a foot platform which may be used in embodiments of beds according to the present disclosure.

In FIG. 11, a side view of an embodiment of a foot platform 132 is shown that includes an upper platform 1110 and a lower platform 1104 connected by hinge 1108. Supports 1102 are shown supporting foot platform 132 and supports 1102 may be fixed supports in some embodiments or may be embodied as manually or automatically adjustable struts 114 or supports in other possible embodiments. Supports 1102 are affixed to a bed frame 110 or other supporting structure so they may support foot platform 132.

Bed covering 118 is shown in FIG. 11 affixed to upper platform 1110 by spring 1112 that hooks bed covering 118 on one end of spring 1112 with the other end of spring 1112 affixed to upper platform 1110. In FIG. 11, bed covering 118 is shown extending to the right side of the figure and so, would extend over slats or struts making up a bed to which foot platform 132 is attached and would extend to the head-end of such a bed. Lower platform 1104 includes relieved region 1106 which is a hollowed out region inside lower platform 1104 into which bed covering 118 and spring 1112 will reside if upper platform 1110 is rotated counterclockwise (as shown in FIG. 11) on hinge 1108 so that upper platform 1110 and lower platform 1104 are substantially parallel and counter-clockwise rotation of upper platform 1110 has reached its mechanical limit. Embodiments of foot platform 132 may include a mechanical catch, magnetic catch, snaps, hook and loop fasteners, locking mechanisms, or other possible techniques for upper platform 1110 to be secured to lower platform 1104 when upper platform 1110 is rotated to be substantially parallel to lower platform 1104. In operation, foot platform 132 allows bed covering 118 to be secured near the head-end of a bed or slat bed and attached to spring 1112 with upper platform 1110 in an unlatched and elevated position as shown in FIG. 11. Upper platform 1110 may then be rotated and latched to lower platform 1104 so that spring 1112 is extended and provides tension on bed covering 118 so that bed covering 118 appears neat and straight and remains comfortable for an occupant of a bed or slat bed to which foot platform 132 is attached.

Embodiments of foot platform 132 may include multiple springs 1112 across the width of foot platform 132 and embodiments with one, two, three, or more such springs are possible. Bed covering 118 may affix to springs 1112 with hooks, catches, clips, or other suitable techniques. Springs 1112 may be attached to upper platform 1110 as shown in FIG. 11 or may attach instead to lower platform 1104. In some embodiments, bed covering 118 may be affixed directly to upper platform 1110 or lower platform 1104 and bed covering 118 may be of an elastic nature so that it stretches and provides tension to itself when upper platform 1110 is lowered to attach to lower platform 1104.

Some embodiments may also use springs on both the head and foot ends of a bed or slat bed. Head platforms 130 in some embodiments may also include folding sections, levers, or other approaches to allow bed coverings 118 to be stretched. Upper platform 1110 may be padded, contoured, or otherwise formed or covered to benefit comfort. Upper platform 1110 and/or lower platform 1104 may be perforated or otherwise constructed so that air may easily pass through them. Spring 1112 may be a metal spring fabricated from spring steel or other suitable metals, or may be formed from rubber, plastics, or other materials to provide an elastic connection providing substantially a similar function to spring 1112 as described herein.

Having bed covering 118 under tension may prevent bed covering from bunching, compressing, or folding as struts and slats move. It is also possible to control motion of struts 114 and slats 402 in a bed to create motions that tend to stretch and align a bed covering 118. For example, in the course of a night, a motion in which a slat 402 near the center of a bed occupant's body is slightly raised, followed by raising an adjacent slat 402, and then extending the raising of subsequently adjacent slats 402 so that bed covering 118 is incrementally pulled outwards towards an end of the slat bed 400 is possible. Such a motion to extend bed covering 118 may begin near the center of a bed occupants body, may start at the hips or other relatively heavy portions, or may start in other location and then extend first in one direction toward one end of slat bed 400 and then extend in the other direction from the first slat 402 that was raised toward the other end of slat bed 400. In this way, a wave or ripple formed from the motion of the slats 402 creates a motion that tends to extend and straighten bed covering 118. Once this extending motion is completed, slats 402 may be lowered starting again possibly at some central location and extending to the ends of slat bed 400. Waves or ripples may also be started at one end of a bed and simply extend to the other, and waves or ripples that either raise or low slats 402 may be utilized. Those skilled in the art will recognize that such a wave or ripple extending over a bed or slat bed may provide additional benefit in providing a rolling action on a bed occupant's spine to enhance comfort or health. Such waves or ripples to extend the spine may begin near the center of a bed occupant's back or possibly begin just above the hips and extend upwards. Those skilled in the art will recognize that many such waves or ripples may be devised to extend over a bed 103 or slat bed 400 to provide some extension of a bed covering 118 and also possibly a bed occupant's spine or body.

Figure 12:
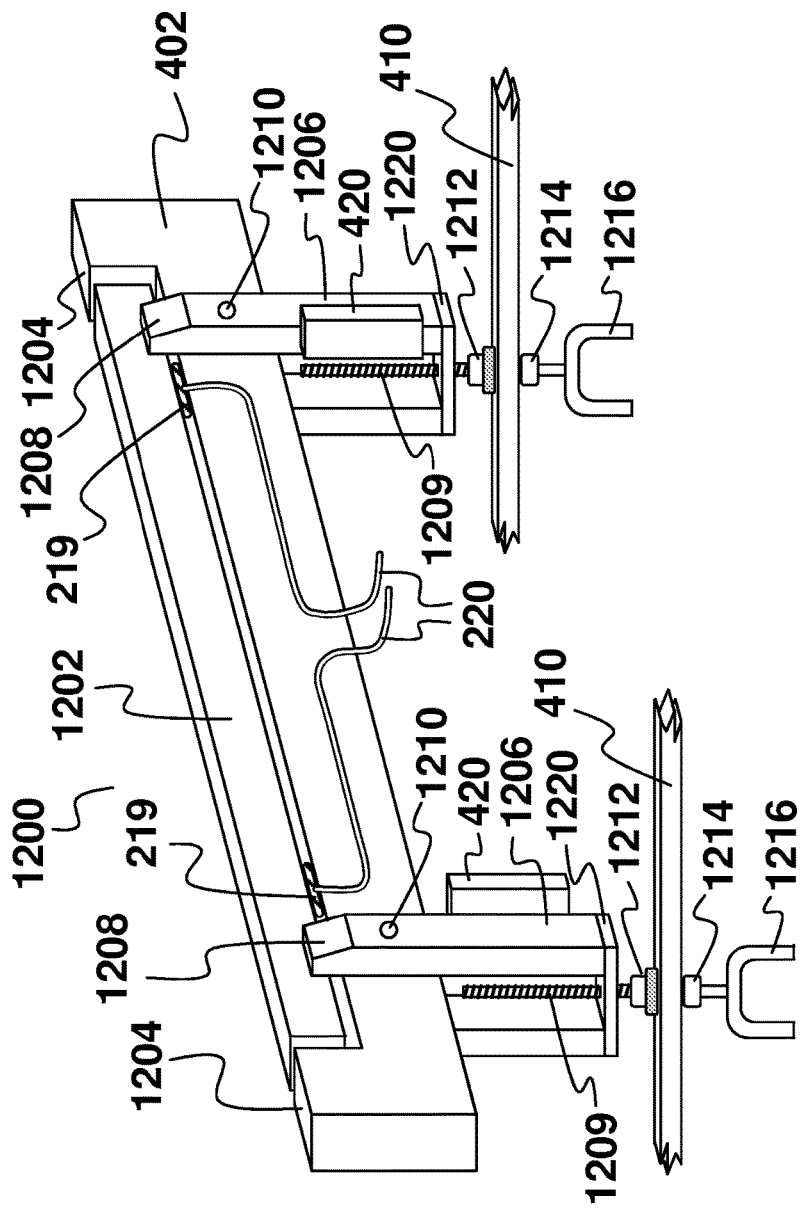
FIG. 12 shows an embodiment of a slat assembly that may be used in a slat bed according to the present disclosure.

In FIG. 12, an embodiment of a slat assembly 1200 is shown. Slat assembly 1200 as shown in FIG. 12 may be utilized in embodiments of slat beds 400 as described herein. Slat assembly 1200 comprises slat 402 that includes a floating member 1202 that is supported on pressure sensors 219 connected to pressure sensor wires 220. Floating member 1202 is responsive to weight applied by a person on a slat bed 400 and transfers force to pressure sensors 219 so they may provide signals representing pressure or force applied to slat 402 and allow operation of a slat bed 400 as described herein above. The embodiment of floating member 1202 and pressure sensors 219 of FIG. 12 may be configured in some embodiments to allow a slat bed 400 to sense pressure or force on all slat assemblies 1200 in the slat bed 400 at substantially the same time so that pressure profiles 600 or other analysis may occur rapidly. Embodiments of a slat assembly 1200 without a floating member 1202 and that utilize a single piece slat 402 are clearly also possible (i.e. similar to slats 402 as shown in FIG. 4 and several other figures). Multiple floating members 1202 may be applied to each slat 402 with additional pressure sensors 219 so that additional pressure measurements may be collected along the length of slat 402. Slat 402 includes rigid ends 1204 on each end of slat 402. Rigid ends 1204 may benefit some embodiments as they may support bed coverings 218, blankets, slat couplings 1006, or other items that may drape over or add weight to the end of slats 402 in operation of a slat bed 400 so that such items and conditions do not impact pressure readings by pressure sensors 219 and allow pressure sensors 219 to respond primarily to substantially vertical forces applied to them by a bed occupant. Floating member 1202 may simply lay on the top of pressure sensors 219 and be truly free floating, or may be guided by guide pins or other guide structures. In the embodiment of FIG. 12, floating member 1202 is maintained in position by rigid ends 1204 and vertical risers 1208. Vertical risers 1208 transfer motion of threaded plates 1220 acting on rotation of jack screws 1209. That is, threaded plates 1220 have threaded holes in them through which threaded jack screws 1209 engage so that rotation of jack screws 1209 cause vertical motion of threaded plates 1220. Threaded plates 1220 affix to vertical risers 1208 on either side of slat 402 so that vertical motion of threaded plates 1220 then cause vertical motion of slat 402. Vertical risers 1208 may be attached to slat 402 with pins 1210 or with bolts, screws, glue, or other possible techniques. Attaching vertical risers 1208 to slats 402 with pins 1210, bolts, screws, bearings, or other techniques that allow the connection between vertical risers 1208 and slat 402 to pivot may be beneficial for embodiments that include tilting motion of slat 402 as described herein above. Adjacent slats 402 in a slat bed 400 may be configured and shaped so that the facing surfaces 1206 of vertical risers 1208 or structures or features on the facing surfaces 1206 of vertical risers 1208 engage each other and serve to stabilize adjacent slats 402 by sliding action of the facing surfaces 1206 of vertical risers 1208 of adjacent slats 402 against each other. Lugs 420 may also act against vertical risers 1208 in a fashion similar to that described for operation of lugs 420 in other embodiments shown herein to substantially link lateral or horizontal motion of adjacent slats 402 in a slat bed 400 to each other. While no stabilizers are shown in FIG. 12, internal stabilizers 426, external stabilizers 428, or other forms of stabilizers that may couple lateral motion of slats 402 to the bed frame 410 of a slat bed 400 may also clearly be applied to the embodiment of slat 402 shown in FIG. 12. Jack screws 1209 may be affixed to bed frame 410 with bearings 1212, and bushings 1214, or through other techniques to create a substantially freely rotating connection between jack screw 1209 and bed frame 410 so vertical force created through rotation of jack screws 1209 acting on threaded plates 1220 may be transferred to bed frame 410. Those skilled in the art will recognize that many embodiments of rotating connections of jack screws 1209 to bed frame may be fabricated using ball bearings, needle bearings, roller bearings, sleeves, bushings, collars, and other common approaches to create a mounting that allows rotation while providing a secure vertical connection capable of supporting anticipated levels of vertical force on jack screw 1209. In FIG. 12, bed frame 410 is shown as two small portions of the full bed frame 410 as shown in other embodiments herein. This was done to avoid cluttering the view of slat assembly 1200. Yoke 1216 is formed on or affixed to jack screw 1209 so that an electric motor may rotate yoke 1216 and transfer rotating motion to jack screw 1209. Yoke 1216 as shown in FIG. 12 is a simple fork structure that a simple bar or rod mounted substantially at a right angle to a vertically oriented motor shaft may engage so that rotation of such a motor may transfer rotation to yoke 1216 and jack screw 1209. Many alternatives for coupling motion from a motor to a jack screw 1209 are possible for various embodiments. Those skilled in the art will recognize that yoke 1216 or other possible connections/couplings may be used with motors mounted on a gantry 800, motors dedicated to each jack screw 1209, or other possible configurations of motors.

Vertical risers 1208 provide multiple functions including transferring vertical motion, allowing pivoting connections to slat 402, spacing adjacent slats, engaging lugs 420, and maintaining the position of floating member 1202. When a slat bed 400 is assembled for use, jack screws 1209 may be pre-affixed to bed frame 410 (or jack screws 1209 may be affixed and assembled to a structure that attaches to bed frame 410 in some embodiments), so that slats 402 as shown in FIG. 12 may be positioned with threaded plates 1220 in contact with the ends of jack screws 1209 so that electric motors engaging yokes 1216 may be engaged to rotate and substantially rapidly engage jack screws 1209 into and through threaded plates 1220 so that assembly of slat bed may progress rapidly. Common techniques such as use of counter-sunk holes in threaded plates 1220, leaders or tapers on the ends of jack screws 1209, and other common techniques may be applied to reduce the likelihood of cross-threading or other problems that may occur when a threaded shaft first engages a threaded hole. Electronic controls on a slat bed 400 may be configured to instruct or guide a person to engage and assemble each slat 402 to the slat bed 400 in a safe and convenient way. In some embodiments, slat assemblies 1200 may fit tightly together, so there may be benefit in assembling every second slat assembly 1200 in a slat bed 400 as a first step of assembly and following with installing the remaining slat assemblies 1200. Those skilled in the art will recognize many alternatives for how slat assemblies 1200 may be installed into a slat bed 400.

The top surface of rigid ends 1204 and/or floating member 1202 may be rounded as shown in FIG. 5D, and may include any of the top surface enhancements or features shown in FIGS. 5D-5H, or other possible features or enhancements. Floating member 1202 may also be contoured, textured, ridged, or otherwise finished to benefit the comfort of a person using a slat bed 400. Floating member 1202 may rigidly connect and apply pressure to pressure sensors 219 or may be coupled through pliable mountings, spring mountings, or other possible mountings or couplings.

After a certain length of use of a slat bed 400 incorporating slat assembly 1200, spiral threads inside threaded plate 1220 and/or on jack screw 1209 may become worn and eventually strip out. In the event that slat assembly 1200 is loaded with weight when threads are stripped, collapse of slat assembly 1200 is possible. However, in the case of such an event, the presence of slat 402 above jack screw 1209 would protect a bed occupant from jack screw 1209 so that the tip of jack screw 1209 would not puncture bed covering 118 and potentially injure a bed occupant. In some embodiments of slat assembly 1200, vertical risers 1208 may be joined with additional plates, shields, or other members attached to the vertical risers 1208 mounted to the opposite slide of slat 402 so that an enclosed region is formed around jack screw 1209 that further ensures that jack screw 1209 could not emerge from a bed surface in the event of a failure of jack screw 1209 or threaded plate 1220. In some embodiments, such enclosed regions may be formed with round cylinders or with structures of other shapes and formations versus the vertical risers 1208 with additional plates or shields as described herein. In some embodiments, the bottom surface of slat 402 may include a concave surface that may be shaped and formed with sufficient strength that the tip of a jack screw 1209 impacting it would be contained and not able to puncture slat 402 so that a bed occupant is further protected. Those skilled in the art will recognize many ways a slat bed 400 may include safety features so that failed struts 114 would not injure a bed occupant. Some embodiments of beds may monitor the force needed to turn jack screws 1209 and alert an operator or forbid operation if conditions are sensed that indicate a jack screw is faulty or has worn to a point that failure may occur.

The teachings of the present disclosure focused on novel techniques for the construction of beds 103, slat beds 400, and possibly other types of beds that may benefit from the techniques described herein. Those skilled in the art will recognize that these teachings may be similarly applied to the construction of sofas, love seats, chairs, lounges, benches, and other furniture that may benefit from these teachings.

Those skilled in the art to which the present disclosure relates will appreciate that other and further additions, deletions, substitutions, and modifications may be made to the described embodiments.

I claim:
1. A bed, comprising:
a frame;
a plurality of adjustable struts, each coupled to the frame, and each of the plurality of adjustable struts adjustable to individual positions, each of the plurality of adjustable struts, comprising:
a threaded jack screw having a longitudinal axis about its length,
a threaded fixture, the threaded fixture coupled to the threaded jack screw so that rotational motion of the threaded jack screw about the longitudinal axis generates a translational motion between the threaded fixture and the threaded jack screw, and a first coupling element formed on or coupled to the threaded jack screw, the first coupling element configured to slidingly engage with a second coupling element over a pre-determined range in the direction of said longitudinal axis, the second coupling element formed on or coupled to a shaft of an electric motor, wherein rotational motion of the motor is transferred through the second coupling element and is transferred through the first coupling element to rotate the threaded jack screw, and wherein said translational motion is utilized to adjust the each of the plurality of adjustable struts to said individual positions by rotating the threaded jack screw;

one or more sensors coupled to one or more of the plurality of adjustable struts, the one or more sensors configured to sense force applied to the plurality of adjustable struts; and a controller, the controller configured for receiving input from the one or more sensors and determining at least one adjusted surface shape for a bed occupant; and wherein the controller is further configured to control the plurality of adjustable struts and adjust each of the plurality of adjustable struts according to the at least one adjusted surface shape.

2. The bed according to claim 1, wherein the bed further comprises a plurality of slats, each slat coupled to at least one strut, each slat extending laterally across the frame, and wherein the plurality of slats together form at least a portion of a bed surface for supporting the occupant.

3. The bed according to claim 2, wherein at least a subset of the adjustable slats comprise springs to provide additional compliance to the bed surface.

4. The bed according to claim 2, further comprising a bed covering coupled onto the plurality of adjustable slats wherein the bed covering incorporates an identification element that may be electronically sensed by the controller and provides the controller with information about the bed covering.

5. The bed according to claim 2, wherein at least one a of said plurality of slats is further configured to allow a top surface of said at least one of said plurality of slats to rotate relative to said frame.

6. The bed according to claim 1, wherein each said threaded fixture is one of a threaded hub, a threaded plate, or a support with a threaded hole.

7. The bed according to claim 1, wherein at least one of the second coupling elements is coupled to a gantry configured to move such that said at least one second coupling element is configured to engage at least two of the first coupling elements, such engagement occurring at different times.

8. The bed according to claim 2, wherein at least a portion of the slats are each coupled with two or more sensors, wherein the two or more sensors are configured for measuring force applied to the slat such that the controller can compute a center and an equivalent quantity of force for each such slat.

9. The bed according to claim 1, further comprising a covering which extends over and secures to the plurality of adjustable struts.

10. The bed according to claim 1, further comprising a user interface coupled with the controller, wherein the controller is configured to receive inputs from the user interface relating to physical information about the occupant and use said physical information in conjunction with input from the one or more sensors for determining the adjusted surface shape.

11. The bed according to claim 1, wherein the controller is configured for communicating and receiving data from at least one external data source.

12. The bed according to claim 11, wherein the at least one external data source comprises a personal computing device.

13. The bed according to claim 1, wherein the controller is configured to determine additional surface shapes, wherein the plurality of adjustable struts are moved to provide the additional surface shapes while the occupant remains in the bed, so that the occupant is encouraged to change their sleeping position in the course of sleep.

14. The bed according to claim 1, wherein the one or more sensors and controller are configured to detect a defined sequence of one or more momentary applications of force by the occupant to the bed surface, the defined sequence conveying a coded command indicating that the occupant is requesting an adjustment of surface shape, surface motion, or other action by the controller.

15. The bed according to claim 1, wherein the one or more sensors are configured to sense an amount and distribution of weight of the occupant.

16. The bed according to claim 1, further comprising at least one of a head platform or a foot platform.

17. The bed according to claim 1, wherein the controller further determines a time interval in which no bed occupant is detected to be present, and utilizes the readings of the one or more sensors during the time interval in which no bed occupant is detected to be present to calibrate the readings of the one or more sensors.

18. The bed according to claim 1, wherein the torque applied by the electric motor needed to rotate a at least one of said jack screws is monitored and utilized by the controller to at least partially determine the load applied to that jack screw.

19. A method for assembling a bed comprising:
providing, placing, and connecting frame members to form a bed base, said base comprising a bed frame and a plurality of struts, each strut comprising:
a threaded jack screw having a longitudinal axis about its length,
a threaded fixture, the threaded fixture coupled to the threaded jack screw so that rotational motion of the threaded jack screw about the longitudinal axis generates a translational motion between the threaded fixture and the threaded jack screw, and
a first coupling element formed on or coupled to the threaded jack screw, the first coupling element configured to slidingly engage a second coupling element over a pre-determined range in the direction of said longitudinal axis, the second coupling element formed on or coupled to a shaft of an electric motor, wherein rotational motion of the motor is transferred through the second coupling element and the first coupling element to rotate the threaded jack screw;
installing and connecting at least one gantry;
configuring the at least one gantry to engage and adjust the plurality of struts;
installing a plurality of slats atop the plurality of struts, wherein the slats extend laterally across the bed frame;
installing a control system for the bed, the control system comprising a plurality of sensors and a controller, the controller configured to receive input from the plurality of sensors and determine adjusted surface shapes; and
connecting the control system with the gantry for sending signals to the gantry for controlling movement and adjustment of the plurality of struts.

20. The method according to claim 19, wherein each said threaded fixture is one of a threaded hub, a threaded plate, or a support with a threaded hole.

* * * * *